(12) United States Patent
Ellis et al.

(10) Patent No.: US 12,270,561 B2
(45) Date of Patent: Apr. 8, 2025

(54) SYSTEMS AND METHODS FOR AUTOMATED SYSTEM IDENTIFICATION

(71) Applicant: Johnson Controls Technology Company, Auburn Hills, MI (US)

(72) Inventors: Matthew J. Ellis, Milwaukee, WI (US); Mohammad N. Elbsat, Milwaukee, WI (US); Anas W. I. Alanqar, Milwaukee, WI (US); Michael J. Wenzel, Grafton, WI (US); John H. Burroughs, Wauwatosa, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 1029 days.

(21) Appl. No.: 16/513,054

(22) Filed: Jul. 16, 2019

(65) Prior Publication Data

US 2021/0018205 A1 Jan. 21, 2021

(51) Int. Cl.
*G05B 13/04* (2006.01)
*F24F 11/47* (2018.01)
(Continued)

(52) U.S. Cl.
CPC .............. *F24F 11/47* (2018.01); *F24F 11/54* (2018.01); *F24F 11/64* (2018.01); *F24F 11/65* (2018.01);
(Continued)

(58) Field of Classification Search
None
See application file for complete search history.

(56) References Cited

U.S. PATENT DOCUMENTS

| 8,996,141 B1 * | 3/2015 | Alsaleem ............... F25B 49/02 700/37 |
| 9,235,657 B1 | 1/2016 | Wenzel et al. |

(Continued)

FOREIGN PATENT DOCUMENTS

| CA | 2957726 A1 | 3/2016 |
| CA | 3043996 A1 | 2/2018 |

(Continued)

OTHER PUBLICATIONS

Eva Zacekova, Building modeling and control using multi-step ahead error minimization, Jul. 3-6, 2012, Mediterranean Conference on Control & Automation, pp. 421-426 (Year: 2012).*

(Continued)

*Primary Examiner* — Nathan L Laughlin
(74) *Attorney, Agent, or Firm* — Foley & Lardner LLP

(57) ABSTRACT

A controller for performing automated system identification. The controller includes processors and non-transitory computer-readable media storing instructions that, when executed by the processors, cause the processors to perform operations including generating a predictive model to predict system dynamics of a space of a building based on environmental condition inputs and including performing an optimization of a cost function of operating building equipment over a time duration to determine a setpoint for the building equipment. The optimization is performed based on the predictive model. The operations include operating the building equipment based on the setpoint to affect a variable state or condition of the space and include monitoring prediction error metrics over time. The operations include, in response to detecting one of the prediction error metrics exceeds a threshold value, updating the predictive model.

20 Claims, 27 Drawing Sheets

(51) Int. Cl.

| | |
|---|---|
| F24F 11/54 | (2018.01) |
| F24F 11/64 | (2018.01) |
| F24F 11/65 | (2018.01) |
| G05B 13/02 | (2006.01) |
| G06F 17/18 | (2006.01) |
| G06Q 50/163 | (2024.01) |
| F24F 110/10 | (2018.01) |
| F24F 110/20 | (2018.01) |
| F24F 110/50 | (2018.01) |
| F24F 140/50 | (2018.01) |

(52) U.S. Cl.
CPC ............. *G05B 13/02* (2013.01); *G05B 13/04* (2013.01); *G05B 13/048* (2013.01); *G06F 17/18* (2013.01); *G06Q 50/163* (2013.01); *F24F 2110/10* (2018.01); *F24F 2110/20* (2018.01); *F24F 2110/50* (2018.01); *F24F 2140/50* (2018.01)

(56) References Cited

U.S. PATENT DOCUMENTS

| | | | |
|---|---|---|---|
| 9,429,923 B2 | 8/2016 | Ward et al. | |
| 9,447,985 B2 | 9/2016 | Johnson | |
| 10,088,814 B2 | 10/2018 | Wenzel et al. | |
| 10,746,425 B1* | 8/2020 | Frader-Thompson | G05B 17/02 |
| 10,871,756 B2 | 12/2020 | Johnson et al. | |
| 10,908,578 B2 | 2/2021 | Johnson et al. | |
| 10,921,768 B2 | 2/2021 | Johnson et al. | |
| 11,156,978 B2 | 10/2021 | Johnson et al. | |
| 2003/0055798 A1 | 3/2003 | Hittle et al. | |
| 2008/0183311 A1* | 7/2008 | MacArthur | G05B 17/02 700/29 |
| 2009/0210081 A1* | 8/2009 | Sustaeta | H04L 67/125 715/702 |
| 2010/0114383 A1* | 5/2010 | Rosca | H04L 67/12 700/299 |
| 2010/0268353 A1* | 10/2010 | Crisalle | G05B 13/048 700/29 |
| 2012/0065783 A1 | 3/2012 | Fadell et al. | |
| 2015/0316907 A1 | 11/2015 | Elbsat et al. | |
| 2016/0061693 A1* | 3/2016 | Salsbury | F24F 11/62 702/182 |
| 2016/0162779 A1* | 6/2016 | Marcus | G06N 20/10 706/12 |
| 2016/0195866 A1 | 7/2016 | Turney et al. | |
| 2017/0235857 A1* | 8/2017 | Haye | G06F 30/20 703/7 |
| 2018/0180314 A1* | 6/2018 | Brisette | F24F 11/62 |
| 2019/0025774 A1 | 1/2019 | Wenzel et al. | |
| 2019/0205774 A1* | 7/2019 | Ba | G06N 20/20 |
| 2019/0228327 A1* | 7/2019 | Horesh | G05B 19/41865 |
| 2019/0234638 A1* | 8/2019 | Song | F24F 11/62 |
| 2019/0257544 A1 | 8/2019 | Alanqar et al. | |
| 2019/0316802 A1 | 10/2019 | Alanqar et al. | |
| 2020/0006946 A1* | 1/2020 | Fife | G05B 13/042 |
| 2020/0026249 A1 | 1/2020 | Przybylski et al. | |
| 2020/0034665 A1* | 1/2020 | Ghanta | G06F 17/18 |
| 2020/0111188 A1* | 4/2020 | McCallum | G06Q 3/0482 |
| 2020/0218991 A1 | 7/2020 | Alanqar et al. | |
| 2020/0334574 A1 | 10/2020 | Ishida | |
| 2021/0056412 A1* | 2/2021 | Jung | G06N 3/045 |

FOREIGN PATENT DOCUMENTS

| | | |
|---|---|---|
| EP | 1 156 286 A2 | 11/2001 |
| EP | 3 186 687 A4 | 7/2017 |
| EP | 3 497 377 A1 | 6/2019 |
| WO | WO-2012/161804 A1 | 11/2012 |
| WO | WO-2013/130956 A1 | 9/2013 |

OTHER PUBLICATIONS

U.S. Appl. No. 16/513,054, filed Jul. 16, 2019.
U.S. Appl. No. 16/590,783, filed Oct. 2, 2019.
U.S. Appl. No. 15/900,459, filed Feb. 20, 2018.
U.S. Appl. No. 16/240,028, filed Jan. 4, 2019.
Batterman, Stuart, Review and Extension of CO2-Based Methods to Determine Ventilation Rates with Application to School Classrooms. International Journal of Environmental Research and Public Health. Feb. 4, 2017. 22 Pages.
Chen, Xiao; Wang, Qian; Srebric, Jelena. Occupant Feedback Based Model Predictive Control for Thermal Comfort and Energy Optimization: A Chamber Experimental Evaluation. Applied Energy 164. 2016, pp. 341-351.
Kang et al., Novel Modeling and Control Strategies for a HVAC System Including Carbon Dioxide Control. Jun. 2, 2014. 19 Pages.
Lampinen, Markku J. Thermodynamics of Humid Air. Sep. 2015. 39 Pages.
Luo, Xiaoyan. Maximizing Thermal Comfort and International Design. Loughborough University. Jan. 18, 2019. 4 Pages.
Sama Aghniaey et al., The Assumption of Equidistance in the Seven-Point Thermal Sensation Scale and a Comparison between Categorical and Continuous Metrics. University of Georgia College of Engineering, Jan. 18, 2019. 4 Pages.
Sudhakaran, Saurabh; Shaurette Mark. Temperature, Relative Humidity, and CarbonDioxide Modulation in a Near-Zero Energy Efficient Retrofit House. Purdue University. 2016, 11 Pages.
Weekly, Kevin et al., Modeling and Estimation of the Humans' Effect on the CO2 Dynamics Inside a Conference Room. IEEE Transactions on Control Systems Technology, vol. 23, No. 5, Sep. 2015, 12 pages.
Ljung, L. (1999). System Identification: Theory for the User, 2nd ed. (Prentice Hall PTR, Upper Saddle River).
Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-

(56) References Cited

OTHER PUBLICATIONS

Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

Afram et al., "Theory and Application of HVAC Control Systems—A review of Model Predictive Control (MPC)," Building and Environment, Feb. 2014, vol. 72 (pp. 343-355).

Ahn et al., "Optimal Control Development for Chilled Water Plants Using a Quadratic Representation," Energy and Buildings, Apr. 2001, vol. 33, No. 4 (pp. 371-378).

Burer et al., "Non-convex Mixed-Integer Nonlinear Programming: A Survey," Surveys in Operations Research and Management Science, Jul. 2012, vol. 17, No. 2 (pp. 97-106).

Cantoni, A., "Optimal Curve Fitting with Piecewise Linear Functions," IEEE Transactions on Computers, Jan. 1971, vol. 20, No. (pp. 59-67).

Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).

Drgona et al., "All you Need to Know about Model Predictive Control for Buildings," Annual Reviews in Control, 2020, vol. 50 (pp. 190-232).

EPO Notice of Opposition to a European Patent issued in Appl. Ser. No. EP 16165681.4 dated May 2, 2023 (48 pages).

EPO Notice of Opposition to a European Patent issued in Appl. Ser. No. EP 16165681.4 dated May 2, 2023 (51 pages).

EPO Notice of Opposition to a European Patent with Consolidated List issued in EP Appl. Ser. No. 16165681.4 dated May 2, 2023 (4 pages).

EPO Office Action on EP Appl. Ser. No. 16165681.4 dated Apr. 6, 2021 (7 pages).

Extended European Search Report on EP Appl. Ser. No. 16165681.4 dated Oct. 20, 2016 (5 pages).

Extended European Search Report on EP Appl. Ser. No. 22177772.5 dated Sep. 26, 2022 (11 pages).

Hackner, J.R., "HVAC system dynamics and energy use in existing buildings," Doctoral Dissertation, University of Madison, Wisconsin, 1984 (174 pages).

Haves et al., "Model Predictive Control of HVAC Systems: Implementation and Testing at the University of California, Merced," Technical Report, U.S. Department of Energy Office of Scientific and Technical Information, Jun. 29, 2010 (140 pages).

Huang et al., "A New Model Predictive Control Scheme for Energy and Cost Savings in Commercial Buildings: An Airport Terminal Building Case Study," Building and Environment, Jul. 2015, vol. 89 (pp. 203-216).

Kelman et al., "Analysis of Local Optima in Predictive Control for Energy Efficient Buildings," Journal of Building Performance Simulation, Apr. 16, 2012, vol. 6, No. 3 (pp. 236-255).

Koehler et al., "Building Temperature Distributed Control via Explicit MPC and 'Trim and Respond' Methods," European Control Conference (ECC), Jul. 17-19, 2013, Zurich, Switzerland (pp. 4334-4339).

Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).

McKenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).

Mossolly et al., "Optimal Control Strategy for a Multizone Air Conditioning System Using a Genetic Algorithm," Energy, Jan. 2009, vol. 34, No. 1 (pp. 58-66).

(56) References Cited

OTHER PUBLICATIONS

Nassif et al., "Optimization of HVAC Control System Strategy Using Two-Objective genetic Algorithm," International Journal of HVA C&R Research, vol. 11, No. 3 (pp. 459-486).

Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).

Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).

Strurznegger, D., "Model Predictive Building Climate Control, Steps Towards Practice," Doctoral Thesis, Automatic Control Laboratory, Zurich, Switzerland, 2014 (176 pages).

Sun et al., Optimal Control of Building HVAC&R Systems Using Complete Simulation-Based Sequential Quadratic Programming (CSB-SQP), Building and Environment, May 2005, vol. 40, No. 5 (pp. 657-669).

Third Party Observation Report on EP Appl. Ser. No. 16165681.4 dated Jan. 15, 2020 (8 pages).

Third Party Observation Report on EP Appl. Ser. No. 16165681.4 dated Oct. 5, 2018 (6 pages).

Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).

Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).

Wang et al., "Model-Based Optimal Control of VAV Air-Conditioning System Using Genetic Algorithm," Building and Environment, Aug. 2000, vol. 35, No. 6 (pp. 471-487).

Wang et al., "Supervisory and Optimal Control of Building HVAC Systems: A Review," HVAC&R Research, Jan. 2008, vol. 14, No. 1 (pp. 3-32).

Xi et al., "Support Vector Regression Model Predictive Control on a HVAC Plant," Control Engineering Practice, Aug. 2007, vol. 15, No. 8 (pp. 897-908).

Yao et al., "Global Optimization of a Central Air-Conditioning System Using Decomposition-Coordination Method," Energy and Buildings, May 2010, vol. 42, No. 5 (pp. 570-583).

\* cited by examiner

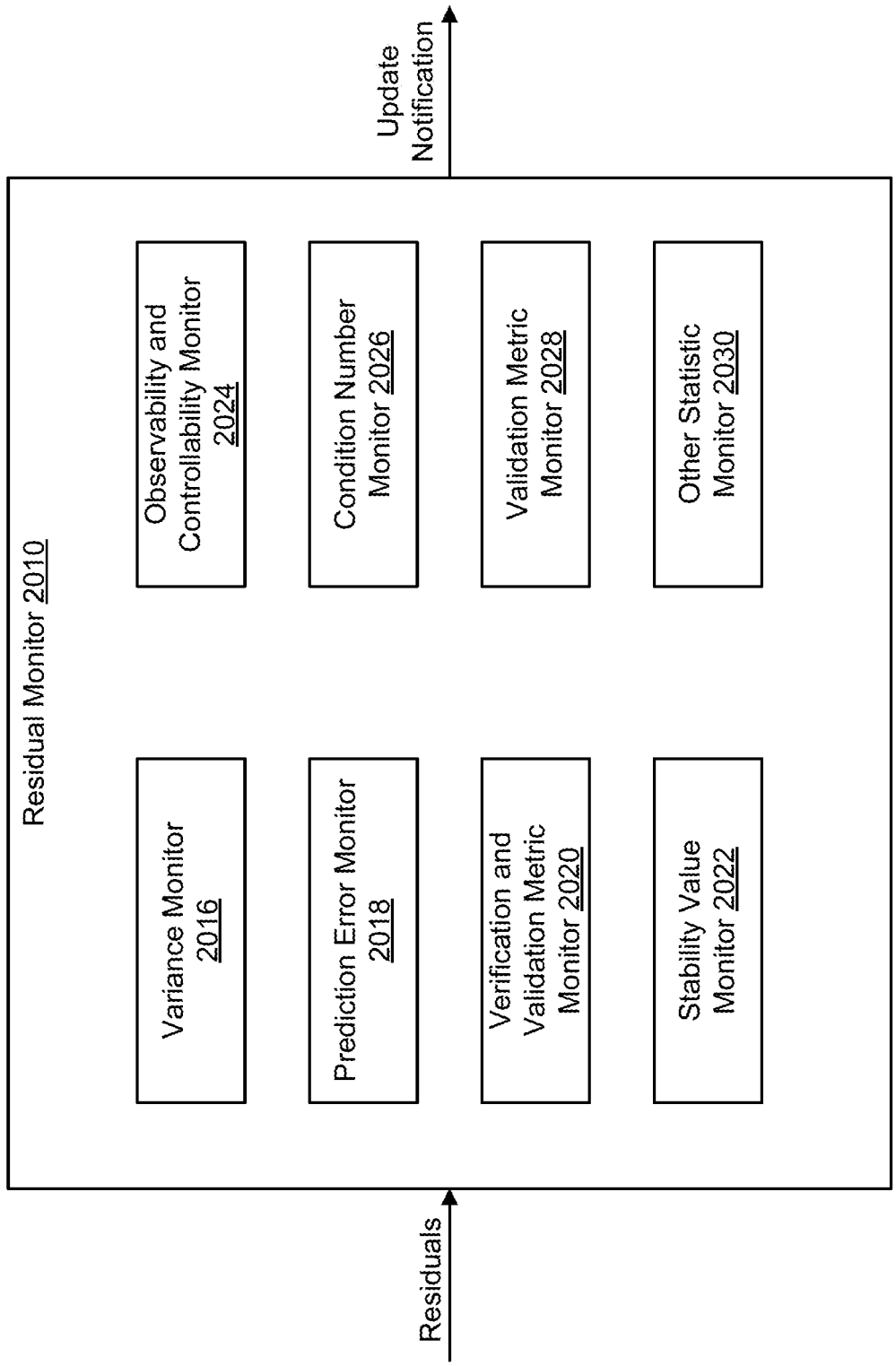

SYSTEMS AND METHODS FOR AUTOMATED SYSTEM IDENTIFICATION

BACKGROUND

The present disclosure relates generally to control systems for a building. The present disclose relates more particularly to system identification for controlling building equipment.

System identification refers to the determination of a model describes a system. For example, system identification may be used to identify a system describing environmental conditions. Because the physical phenomena that govern such systems are often complex, nonlinear, and poorly understood, system identification requires the determination of model parameters based on measured and recorded data from the real system in order to generate an accurate predictive model.

SUMMARY

One implementation of the present disclosure is a controller for performing automated system identification, according to some embodiments. The controller includes one or more processors, according to some embodiments. The controller includes one or more non-transitory computer-readable media storing instructions that, when executed by the one or more processors, cause the one or more processors to perform operations, according to some embodiments. The operations include generating a predictive model to predict one or more system dynamics of a space of a building based on one or more environmental condition inputs, according to some embodiments. The operations include performing an optimization of a cost function of operating building equipment over a time duration to determine a setpoint for the building equipment, according to some embodiments. The optimization is performed based on the predictive model, according to some embodiments. The operations include operating the building equipment based on the setpoint to affect a variable state or condition of the space, according to some embodiments. The operations include monitoring one or more prediction error metrics over time, according to some embodiments. The operations include updating the predictive model in response to one or more of the prediction error metrics exceeding a threshold value, according to some embodiments.

In some embodiments, the one or more prediction error metrics include at least one of a temperature residual, a humidity residual, an air quality residual, one or more environmental condition residuals, or a heat load residual.

In some embodiments, generating the predictive model includes perturbing the setpoint of the space or a heat duty of the building equipment to excite one or more dynamics of the space. Generating the predictive model includes monitoring one or more effects of perturbing the setpoint or the heat duty, according to some embodiments. Generating the predictive model includes generating a set of training data including values of the one or more effects, according to some embodiments.

In some embodiments, generating the predictive model includes generating one or more candidate models. Generating the predictive model includes selecting one of the one or more candidate models based on an estimated accuracy of each of the one or more candidate models, according to some embodiments.

In some embodiments, generating the predictive model includes determining whether the selected candidate model is suitable for use in performing the optimization. Generating the predictive model includes, in response to a determination that the selected candidate model is not suitable, generating one or more new candidate models and selecting a new candidate model of the one or more new candidate models. Generating the predictive model includes, in response to a determination that the selected candidate model is suitable, providing the selected candidate model as the predictive model for use in performing the optimization, according to some embodiments.

In some embodiments, monitoring the one or more prediction error metrics includes calculating one or more statistical characteristics of each of the one or more prediction error metrics. Monitoring the one or more residuals includes determining whether any of the one or more statistical characteristics of each of the one or more prediction error metrics exceeds a predetermined threshold value for each of the one or more statistical characteristics, according to some embodiments. Monitoring the one or more residuals includes triggering a model update process in response to at least one of the one or more statistical characteristics exceeding the predetermined threshold value, according to some embodiments.

In some embodiments, the one or more statistical characteristics include at least one of a variance, a moving average, or a moving standard deviation.

Another implementation of the present disclosure is a controller for performing automated system identification, according to some embodiments. The controller includes one or more processors, according to some embodiments. The controller includes one or more non-transitory computer-readable media storing instructions that, when executed by the one or more processors, cause the one or more processors to perform operations, according to some embodiments. The operations include generating a predictive model to predict one or more system dynamics of a system based on one or more measured inputs, according to some embodiments. The operations include performing an optimization of a function of operating equipment over a time duration to determine a setpoint for the equipment, according to some embodiments. The optimization is performed based on the predictive model, according to some embodiments. The operations include operating the equipment based on the setpoint to affect a variable state or condition of the system, according to some embodiments. The operations include monitoring one or more prediction error metrics over time, according to some embodiments. The operations include, updating the predictive model in response to one or more of the prediction error metrics exceeding a threshold value, according to some embodiments.

In some embodiments, the equipment includes manufacturing equipment for producing one or more products.

In some embodiments, generating the predictive model includes perturbing the setpoint over time to excite the one or more system dynamics. Generating the predictive model includes monitoring one or more effects of perturbing the setpoint, according to some embodiments. Generating the predictive model includes generating a set of training data including values of the one or more effects, according to some embodiments.

In some embodiments, generating the predictive model includes generating one or more candidate models. Generating the predictive model includes selecting one of the one or more candidate models based on an estimated accuracy of each of the one or more candidate models, according to some embodiments.

In some embodiments, monitoring the one or more prediction error metrics includes calculating one or more statistical characteristics of each of the one or more prediction error metrics. Monitoring the one or more prediction error metrics includes determining whether any of the one or more statistical characteristics of each of the one or more prediction error metrics exceeds a predetermined threshold value for each of the one or more statistical characteristics, according to some embodiments. Monitoring the one or more prediction error metrics includes triggering a model update process in response to at least one of the one or more statistical characteristics exceeding the predetermined threshold value, according to some embodiments.

In some embodiments, the one or more statistical characteristics include at least one of a variance, a moving average, or a standard deviation.

Another implementation of the present disclosure is a method for triggering an update of a predictive model for use in performing automated system identification, according to some embodiments. The method includes generating the predictive model to predict one or more system dynamics of a space of a building based on one or more environmental condition inputs, according to some embodiments. The method includes performing an optimization of a cost function of operating building equipment over a time duration to determine a setpoint for the building equipment, according to some embodiments. The optimization is performed based on the predictive model, according to some embodiments. The method includes operating the building equipment based on the setpoint to affect a variable state or condition of the space, according to some embodiments. The method includes monitoring one or more prediction error metrics over time, according to some embodiments. The method includes updating the predictive model in response to one or more of the prediction error metrics exceeding a threshold value, according to some embodiments.

In some embodiments, the one or more prediction error metrics include at least one of a temperature residual, a humidity residual, an air quality residual, one or more environmental condition residuals, or a heat load residual.

In some embodiments, generating the predictive model includes perturbing the setpoint of the space or a heat duty of the building equipment to excite one or more dynamics of the space. Generating the predictive model includes monitoring one or more effects of perturbing the setpoint or the heat duty, according to some embodiments. Generating the predictive model includes generating a set of training data including values of the one or more effects, according to some embodiments.

In some embodiments, generating the predictive model includes generating one or more candidate models. Generating the predictive model includes selecting one of the one or more candidate models based on an estimated accuracy of each of the one or more candidate models, according to some embodiments.

In some embodiments, generating the predictive model includes, determining whether the selected candidate model is suitable for use in performing the optimization. Generating the predictive model includes, in response to a determination that the selected candidate model is not suitable, generating one or more new candidate models and selecting a new candidate model of the one or more new candidate models, according to some embodiments. Generating the predictive model includes, in response to a determination that the selected candidate model is suitable, providing the selected candidate model as the predictive model for use in performing the optimization, according to some embodiments.

In some embodiments, monitoring the one or more prediction error metrics includes calculating one or more statistical characteristics of each of the one or more prediction error metrics. Monitoring the one or more prediction error metrics includes determining whether any of the one or more statistical characteristics of each of the one or more prediction error metrics exceeds a predetermined threshold value for each of the one or more statistical characteristics, according to some embodiments. Monitoring the one or more prediction error metrics includes triggering a model update process in response to at least one of the one or more statistical characteristics exceeding the predetermined threshold value, according to some embodiments.

In some embodiments, the one or more statistical characteristics include at least one of a variance, a moving average, or a moving standard deviation.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 20B is a block diagram of the residual monitor of FIG. 20A in greater detail, according to some embodiments.

DETAILED DESCRIPTION OF THE FIGURES

Overview

Referring generally to the FIGURES, systems and methods for performing automated system identification are shown, according to some embodiments. Models generated by automated system identification can be utilized for performing model predictive control (MPC) of building equipment. Particularly, an MPC process can utilize the models to determine how to operate building equipment to maintain occupant comfort while optimizing (e.g., reducing) costs.

In some embodiments, generating an accurate model through system identification is necessary for MPC to be performed and appropriately maintain occupant comfort/ optimize costs. To perform standard system identification, highly-skilled human interaction and intervention may be necessary to generate an accurate model. However, as described in the FIGURES below, system identification can be performed automatically to reduce and/or eliminate a need for human interaction. Automated system identification can be achieved by automatically scheduling system identification experiments to gather training data to be used in determining new models for use in MPC. Automated system identification can also be achieved by recursively updating models and monitoring residuals to determine when model updating is necessary. These and other features of automated system identification are described in greater detail below.

Building HVAC Systems

Figure 1:
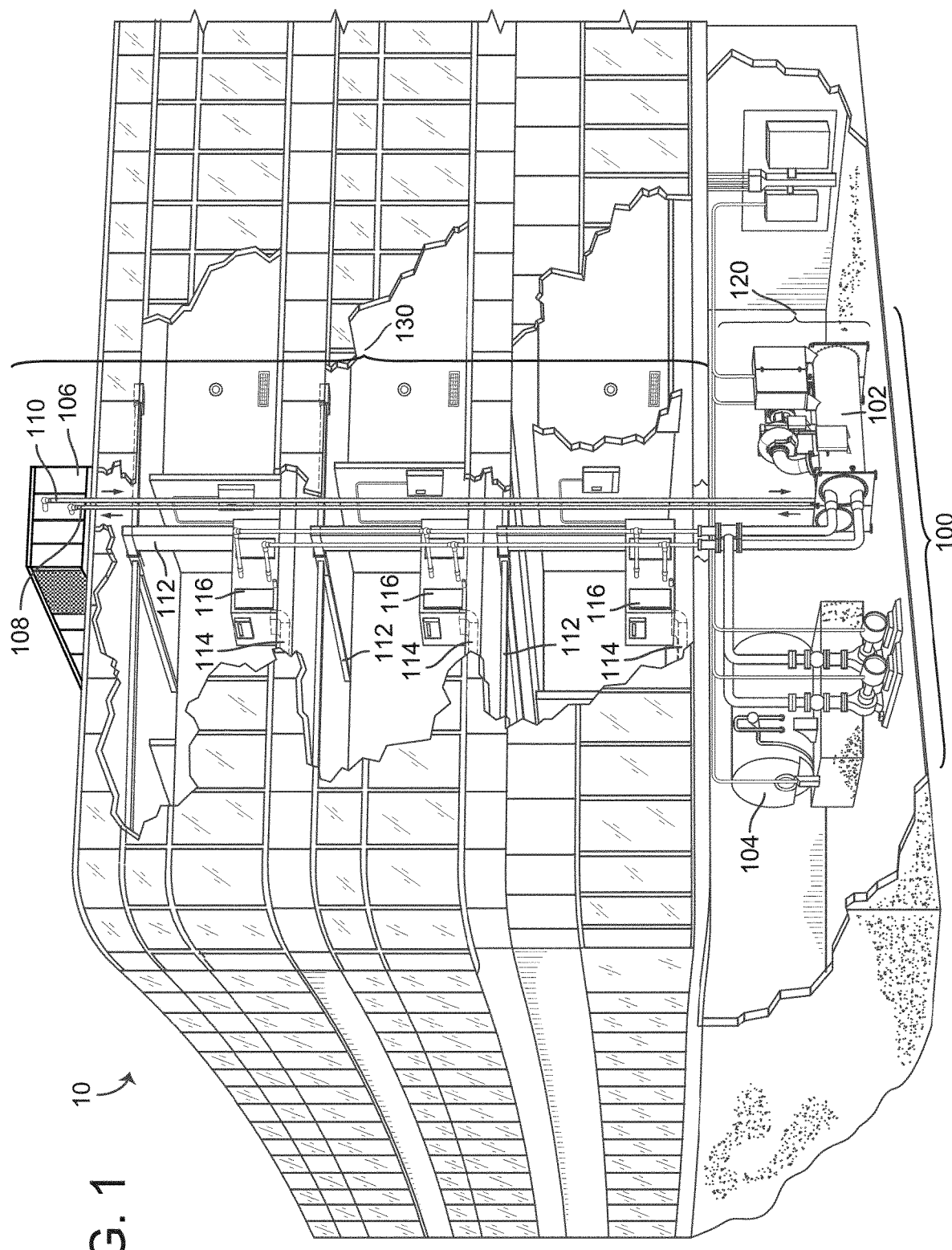
FIG. 1 is a drawing of a building equipped with a HVAC system, according to some embodiments.

Referring to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

HVAC system 100 thereby provides heating and cooling to the building 10. The building 10 also includes other sources of heat transfer that the indoor air temperature in the building 10. The building mass (e.g., walls, floors, furniture) influences the indoor air temperature in building 10 by storing or transferring heat (e.g., if the indoor air temperature is less than the temperature of the building mass, heat transfers from the building mass to the indoor air). People, electronic devices, other appliances, etc. ("heat load") also contribute heat to the building 10 through body heat, electrical resistance, etc. Additionally, the outside air temperature impacts the temperature in the building 10 by providing heat to or drawing heat from the building 10.

HVAC System and Model

Figure 2:
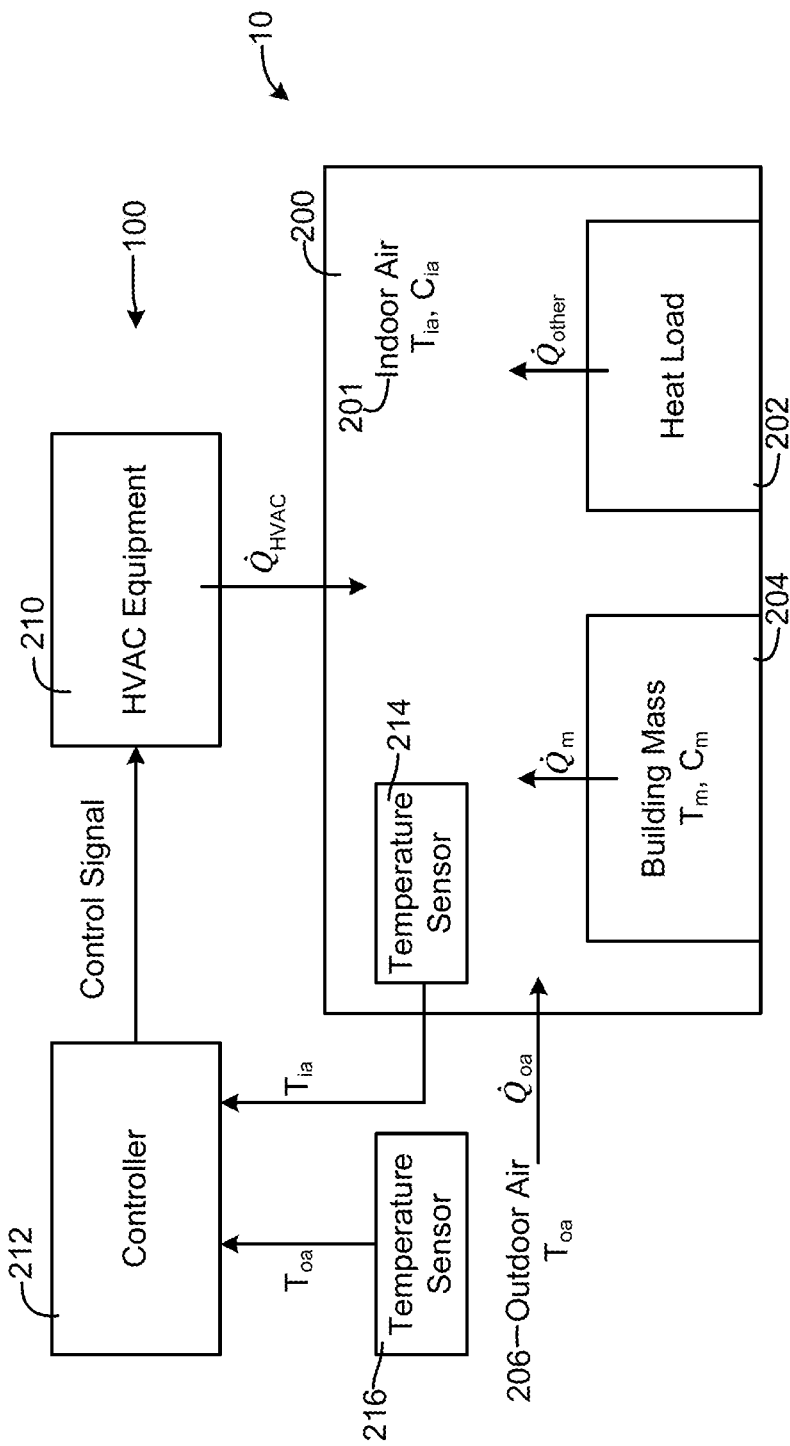
FIG. 2 is a block diagram of the building and HVAC system of FIG. 1, according to some embodiments.

Referring now to FIG. 2, a block diagram of the HVAC system 100 with building 10 is shown, according to an exemplary embodiment. More particularly, FIG. 2 illustrates the variety of heat transfers that affect the indoor air temperature $T_{ia}$ of the indoor air 201 in zone 200 of building 10. Zone 200 is a room, floor, area, etc. of building 10. In general, the primary goal of the HVAC system 100 is to maintain the indoor air temperature $T_{ia}$ in the zone 200 at or around a desired temperature to facilitate the comfort of occupants of the zone 200 or to meet other needs of the zone 200.

As shown in FIG. 2, the indoor air temperature $T_{ia}$ of the zone 200 has a thermal capacitance $C_{ia}$. The indoor air temperature $T_{ia}$ is affected by a variety of heat transfers $\dot{Q}$ into the zone 200, as described in detail below. It should be understood that although all heat transfers $\dot{Q}$ are shown in FIG. 2 as directed into the zone 200, the value of one or more of the heat transfers $\dot{Q}$ may be negative, such that heat flows out of the zone 200.

The heat load 202 contributes other heat transfer $\dot{Q}_{other}$ to the zone 200. The heat load 202 includes the heat added to the zone by occupants (e.g., people, animals) that give off body heat in the zone 200. The heat load 202 also includes computers, lighting, and other electronic devices in the zone 200 that generate heat through electrical resistance, as well as solar irradiance.

The building mass 204 contributes building mass heat transfer $\dot{Q}_m$ to the zone 200. The building mass 204 includes the physical structures in the building, such as walls, floors, ceilings, furniture, etc., all of which can absorb or give off heat. The building mass 204 has a temperature $T_m$ and a lumped mass thermal capacitance $C_m$. The resistance of the building mass 204 to exchange heat with the indoor air 201 (e.g., due to insulation, thickness/layers of materials, etc.) may be characterized as mass thermal resistance $R_{mi}$.

The outdoor air 206 contributes outside air heat transfer $\dot{Q}_{oa}$ to the zone 200. The outdoor air 206 is the air outside of the building 10 with outdoor air temperature $T_{oa}$. The outdoor air temperature $T_{oa}$ fluctuates with the weather and climate. Barriers between the outdoor air 206 and the indoor air 201 (e.g., walls, closed windows, insulation) create an outdoor-indoor thermal resistance $R_{oi}$ to heat exchange between the outdoor air 206 and the indoor air 201.

The HVAC system 100 also contributes heat to the zone 200, denoted as $\dot{Q}_{HVAC}$. The HVAC system 100 includes HVAC equipment 210, controller 212, an indoor air temperature sensor 214 and an outdoor air temperature sensor 216. The HVAC equipment 210 may include the waterside system 120 and airside system 130 of FIG. 1, or other suitable equipment for controllably supplying heating and/or cooling to the zone 200. In general, HVAC equipment 210 is controlled by a controller 212 to provide heating (e.g., positive value of $\dot{Q}_{HVAC}$) or cooling (e.g., a negative value of $\dot{Q}_{HVAC}$) to the zone 200.

The indoor air temperature sensor 214 is located in the zone 200, measures the indoor air temperature $T_{ia}$, and provides the measurement of Ea to the controller 212. The outdoor air temperature sensor 216 is located outside of the building 10, measures the outdoor air temperature $T_{oa}$, and provides the measurement of $T_{oa}$ to the controller 212.

The controller 212 receives the temperature measurements $T_{oa}$ and $T_{ia}$, generates a control signal for the HVAC equipment 210, and transmits the control signal to the HVAC equipment 210. The operation of the controller 212 is discussed in detail below. In general, the controller 212 considers the effects of the heat load 202, building mass 204, and outdoor air 206 on the indoor air 201 in controlling the HVAC equipment 210 to provide a suitable level of $\dot{Q}_{HVAC}$. A model of this system for use by the controller 212 is described with reference to FIG. 3.

In the embodiments described herein, the control signal provide to the HVAC equipment 210 by the controller 110 indicates a temperature setpoint $T_{sp}$ for the zone 200. To determine the temperature setpoint $T_{sp}$, the controller 212 assumes that the relationship between the indoor air temperature $T_{ia}$ and the temperature setpoint $T_{sp}$ follows a proportional-integral control law with saturation, represented as:

$$\dot{Q}_{HVAC,j} = K_{p,j} \varepsilon_{sp} + K_{I,j} \int_0^t \varepsilon_{sp}(s) ds \qquad \text{(Eq. A)}$$

$$\varepsilon_{sp} = T_{sp,j} - T_{ia} \qquad \text{(Eq. B)}$$

where $j \in \{clg, hlg\}$ is the index that is used to denote either heating or cooling mode. Different parameters $K_{p,j}$ and $K_{I,j}$ are needed for the heating and cooling mode. Moreover, the heating and cooling load is constrained to the following set: $\dot{Q}_{HVAC,j} \in [0, \dot{Q}_{clg,max}]$ for cooling mode (j=clg) and $\dot{Q}_{HVAC,j} \in [-\dot{Q}_{htg,max}, 0]$ for heating mode (j=htg). As discussed in detail below with reference to FIG. 4, the controller 212 uses this model in generating a control signal for the HVAC equipment 210.

Figure 3:
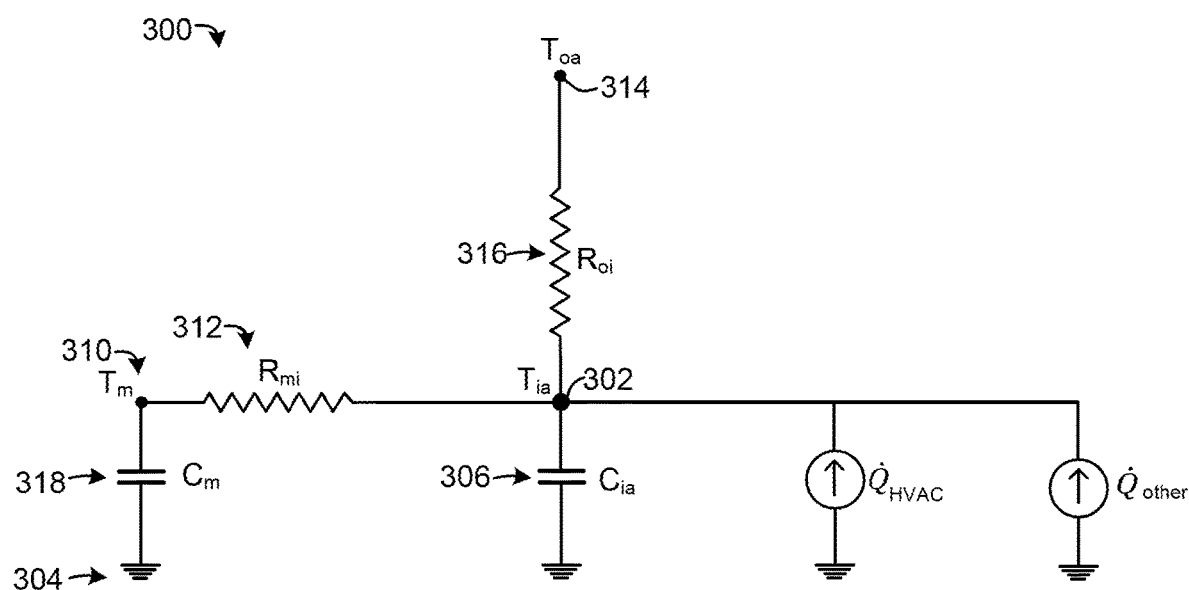
FIG. 3 is a circuit-style diagram of a model of the building and HVAC system of FIG. 1, according to some embodiments.

Referring now to FIG. 3, a circuit-style diagram 300 corresponding to the zone 200 and the various heat transfers $\dot{Q}$ of FIG. 2 is shown, according to an exemplary embodiment. In general, the diagram 300 models the zone 200 as a two thermal resistance, two thermal capacitance, control-oriented thermal mass system. This model can be characterized by the following system of linear differential equations, described with reference to FIG. 3 below:

$$C_{ia}\dot{T}_{ia} = \frac{1}{R_{mi}}(T_m - T_{ia}) + \frac{1}{R_{oi}}(T_{oa} - T_{ia}) - \dot{Q}_{HVAC} + \dot{Q}_{other} \quad \text{(Eq. C)}$$

$$C_m\dot{T}_m = \frac{1}{R_{mi}}(T_{ia} - T_m) \quad \text{(Eq. D)}$$

where the first line (Eq. C) focuses on the indoor air temperature $T_{ia}$, and each term in Eq. C corresponds to a branch of diagram 300 as explained below:

Indoor air node 302 corresponds to the indoor air temperature $T_{ia}$. From indoor air node 302, the model branches in several directions, including down to a ground 304 via a capacitor 306 with a capacitance $C_{ia}$. The capacitor 306 models the ability of the indoor air to absorb or release heat and is associated with the rate of change of the indoor heat transfer $\dot{T}_{ia}$. Accordingly, the capacitor 306 enters Eq. C on the left side of the equation as $C_{ia}\dot{T}_{ia}$.

From indoor air node 302, the diagram 300 also branches left to building mass node 310, which corresponds to the thermal mass temperature $T_m$. A resistor 312 with mass thermal resistance $R_{mi}$ separates the indoor air node 302 and the building mass node 310, modeling the heat transfer $\dot{Q}_m$ from the building mass 204 to the indoor air 201 as $$\frac{1}{R_{mi}}(T_m - T_{ia}).$$

This term is included on the right side of Eq. C above as contributing to the rate of change of the indoor air temperature $\dot{T}_{ia}$.

The diagram 300 also branches up from indoor air node 302 to outdoor air node 314. A resistor 316 with outdoor-indoor thermal resistance $R_{oi}$ separates the indoor air node 302 and the outdoor air node 314, modeling the flow heat from the outdoor air 206 to the indoor air 201 as $$\frac{1}{R_{oi}}(T_{oa} - T_{ia}).$$

This term is also included on the right side of Eq. C above as contributing to the rate of change of the indoor air temperature $\dot{T}_{ia}$.

Also from indoor air node 302, the diagram 300 branches right to two $\dot{Q}$ sources, namely $\dot{Q}_{HVAC}$ and $\dot{Q}_{other}$. As mentioned above, $\dot{Q}_{other}$ corresponds to heat load 202 and to a variety of sources of energy that contribute to the changes in the indoor air temperature $T_{ia}$. $\dot{Q}_{other}$ is not measured or controlled by the HVAC system 100, yet contributes to the rate of change of the indoor air temperature $\dot{T}_{ia}$. $\dot{Q}_{HVAC}$ is generated and controlled by the HVAC system 100 to manage the indoor air temperature $T_{ia}$. Accordingly, $\dot{Q}_{HVAC}$ and $\dot{Q}_{other}$ are included on the right side of Eq. C above.

The second nonlinear differential equation (Eq. D) above focuses on the rate of change $\dot{T}_m$ in the building mass temperature T. The capacity of the building mass to receive or give off heat is modelled by capacitor 318. Capacitor 318 has lumped mass thermal capacitance $C_m$ and is positioned between a ground 304 and the building mass node 310 and regulates the rate of change in the building mass temperature $T_m$. Accordingly, the capacitance $C_m$ is included on left side of Eq. D. Also branching from the building mass node 310 is resistor 312 leading to indoor air node 302. As mentioned above, this branch accounts for heat transfer $\dot{Q}_m$ between the building mass 204 and the indoor air 201. Accordingly, the term $$\frac{1}{R_{mi}}(T_{ia} - T_m)$$

is included on the right side of Eq. D.

As described in detail below, the model represented by diagram 300 is used by the controller 212 in generating a control signal for the HVAC equipment 210. More particularly, the controller 212 uses a state-space representation of the model shown in diagram 300. The state-space representation used by the controller 212 can be derived by incorporating Eq. A and B with Eq. C and D, and writing the resulting system of equations as a linear system of differential equations to get:

$$\begin{bmatrix} \dot{T}_{ia} \\ \dot{T}_m \\ \dot{I} \end{bmatrix} = \begin{bmatrix} \frac{1}{C_{ia}}\left(K_{p,j} - \frac{1}{R_{mi}} - \frac{1}{R_{oi}}\right) & \frac{1}{C_{ia}R_{mi}} & \frac{K_{I,j}}{C_{ia}} \\ \frac{1}{C_m R_{mi}} & -\frac{1}{C_m R_{mi}} & 0 \\ -1 & 0 & 0 \end{bmatrix} \quad \text{(Eq. E)}$$

$$\begin{bmatrix} T_{ia} \\ T_m \\ I \end{bmatrix} + \begin{bmatrix} -\frac{K_{p,j}}{C_{ia}} & \frac{1}{C_{ia}R_{oi}} \\ 0 & 0 \\ 1 & 0 \end{bmatrix}\begin{bmatrix} T_{spj} \\ T_{oa} \end{bmatrix} + \begin{bmatrix} 0 \\ \frac{1}{C_{ia}} \\ 0 \end{bmatrix}\dot{Q}_{other};$$

$$\begin{bmatrix} T_{ia} \\ \dot{Q}_{HVAC,j} \end{bmatrix} = \begin{bmatrix} 1 & 0 & 0 \\ -K_{p,j} & 0 & K_{I,j} \end{bmatrix}\begin{bmatrix} T_{ia} \\ T_m \\ I \end{bmatrix} + \begin{bmatrix} 0 & 0 \\ K_{p,j} & 0 \end{bmatrix}\begin{bmatrix} T_{sp,j} \\ T_{oa} \end{bmatrix}; \quad \text{(Eq. F)}$$

where I represents the integral term $\int_0^t \varepsilon_{sp}(s)\,ds$ from Eq. A. The resulting linear system has three states ($T_{ia}$, $T_m$, I), two inputs ($T_{sp,j}$, $T_{oa}$), two outputs ($T_m$, $\dot{Q}_{HVAC}$), and one disturbance $\dot{Q}_{other}$. Because $\dot{Q}_{other}$ is not measured or controlled, the controller 212 models the disturbance $\dot{Q}_{other}$ using an input disturbance model that adds a forth state d to the state space representation. In a more compact form, this linear system of differential equations can be written as:

$$\dot{x}(t) = A_c(\theta)x(t) + B_c(\theta)u(t); \quad \text{(Eq. G)}$$

$$y(t) = C_c(\theta)x(t) + D_c(\theta)u(t); \quad \text{where} \quad \text{(Eq. H)}$$

$$A_c(\theta) = \begin{bmatrix} -(\theta_1 + \theta_2 + \theta_3\theta_4) & \theta_2 & \theta_3\theta_4\theta_5 \\ \theta_6 & -\theta_6 & 0 \\ -1 & 0 & 0 \end{bmatrix},$$

$$B_c(\theta) = \begin{bmatrix} \theta_3\theta_4 & \theta_1 \\ 0 & 0 \\ 1 & 0 \end{bmatrix},$$

$$C_c(\theta) = \begin{bmatrix} 1 & 0 & 0 \\ -\theta_4 & 0 & \theta_5\theta_4 \end{bmatrix},$$

$$D_c(\theta) = \begin{bmatrix} 0 & 0 \\ \theta_4 & 0 \end{bmatrix};$$

$$\theta_1 = \frac{1}{C_{ia}R_{oi}};$$

$$\theta_2 = \frac{1}{C_{ia}R_{mi}};$$

$$\theta_3 = \frac{1}{C_{ia}};$$

$$\theta_4 = K_p;$$

-continued $$\theta_5 = \frac{1}{\tau};$$

$$\theta_6 = \frac{1}{C_m R_{mi}}; \text{ and}$$

$$\dot{x}(t) = \begin{bmatrix} \dot{T}_{ia} \\ \dot{T}_m \\ \dot{I} \end{bmatrix};$$

$$x(t) = \begin{bmatrix} T_{ia} \\ T_m \\ I \end{bmatrix};$$

$$u(t) = \begin{bmatrix} T_{spj} \\ T_{oa} \end{bmatrix}.$$

As described in detail below, the controller 212 uses a two-step process to parameterize the system. In the first step, the controller 212 identifies the system parameters $\theta = \{\theta_1, \theta_2, \theta_3, \theta_4, \theta_5, \theta_6\}$ (i.e., the values of $C_{ia}$, $C_m$, $R_{mi}$, $R_{oi}$, $K_{p,j}$, $K_{i,j}$). The disturbance state d is then introduced into the model and an Kalman estimator gain is added, such that in the second step the controller 212 identifies the Kalman gain parameters K.

As used herein, the term 'variable' refers to an item/quantity capable of varying in value over time or with respect to change in some other variable. A "value" as used herein is an instance of that variable at a particular time. A value may be measured or predicted. For example, the temperature setpoint $T_{sp}$ is a variable that changes over time, while $T_{sp}(3)$ is a value that denotes the setpoint at time step 3 (e.g., 68 degrees Fahrenheit). The term "predicted value" as used herein describes a quantity for a particular time step that may vary as a function of one or more parameters.

Controller for HVAC Equipment with System Identification

Figure 4:
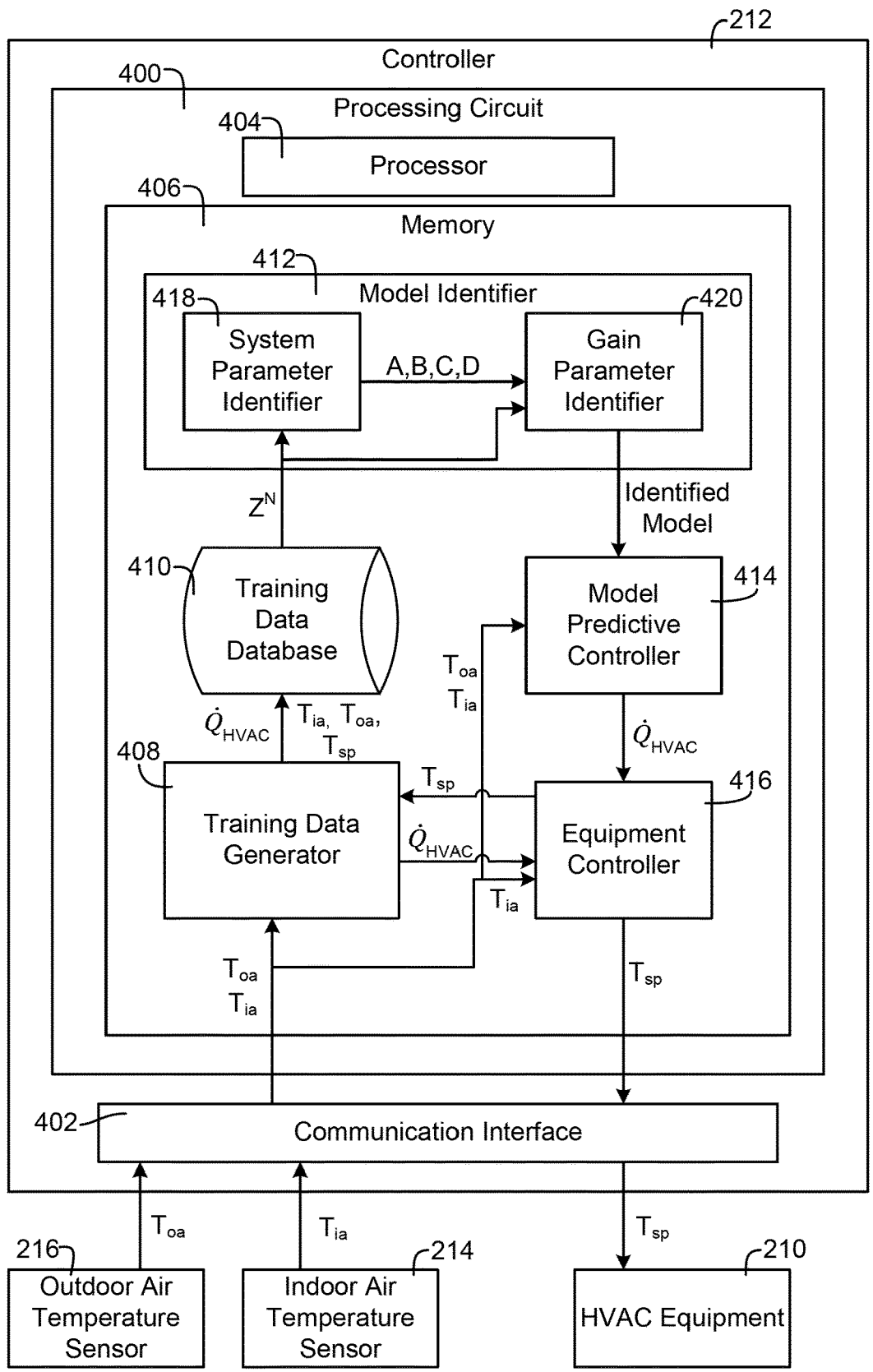
FIG. 4 is a block diagram of a controller for use with the HVAC system of FIG. 1, according to some embodiments.

Referring now to FIG. 4, a detailed diagram of the controller 212 is shown, according to an exemplary embodiment. The controller 212 includes a processing circuit 400 and a communication interface 402. The communication interface 402 is structured to facilitate the exchange of communications (e.g., data, control signals) between the processing circuit 400 and other components of HVAC system 100. As shown in FIG. 4, the communication interface 402 facilitates communication between the processing circuit 400 and the outdoor air temperature sensor 216 and the indoor air temperature sensor 214 to all temperature measurements $T_{oa}$ and $T_{ia}$ to be received by the processing circuit 400. The communication interface 402 also facilitates communication between the processing circuit 400 and the HVAC equipment 210 that allows a control signal (indicated as temperature setpoint $T_{sp}$) to be transmitted from the processing circuit 400 to the HVAC equipment 210.

The processing circuit 400 is structured to carry out the functions of the controller described herein. The processing circuit 400 includes a processor 404 and a memory 406. The processor 404 may be implemented as a general-purpose processor, an application-specific integrated circuit, one or more field programmable gate arrays, a digital signal processor, a group of processing components, or other suitable electronic processing components. The memory 406, described in detail below, includes one or more memory devices (e.g., RAM, ROM, NVRAM, Flash Memory, hard disk storage) that store data and/or computer code for facilitating at least some of the processes described herein. For example, the memory 406 stores programming logic that, when executed by the processor 404, controls the operation of the controller 212. More particularly, the memory 406 includes a training data generator 408, a training data database 410, a model identifier 412, a model predictive controller 414, and an equipment controller 416. The various generators, databases, identifiers, controllers, etc. of memory 406 may be implemented as any combination of hardware components and machine-readable media included with memory 406.

The equipment controller 416 is configured to generate a temperature setpoint $T_{sp}$ that serves as a control signal for the HVAC equipment 210. The equipment controller receives inputs of the indoor air temperature $T_{ia}$ from the indoor air temperature sensor 214 via the communication interface 402 and $\dot{Q}_{HVAC}$ from the model predictive controller 414 (during normal operation) and the training data generator 408 (during a training data generation phase described in detail below). The equipment controller uses $T_{ia}$ and $\dot{Q}_{HVAC}$ to generate $T_{sp}$ by solving Eq. A and Eq. B above for $T_{sp}$. The equipment controller 416 then provides the control signal $T_{sp}$ to the HVAC equipment 210 via the communication interface 402.

The model predictive controller 414 determines $\dot{Q}_{HVAC}$ based on an identified model and the temperature measurements $T_{ia}$, $T_{oa}$, and provides $\dot{Q}_{HVAC}$ to the equipment controller 416. The model predictive controller 414 follows a model predictive control (MPC) approach. The MPC approach involves predicting future system states based on a model of the system, and using those predictions to determine the controllable input to the system (here, $\dot{Q}_{HVAC}$) that bests achieves a control goal (e.g., to maintain the indoor air temperature near a desired temperature). A more accurate model allows the MPC to provide better control based on more accurate predictions. Because the physical phenomena that define the behavior of the system (i.e., of the indoor air 201 in the building 10) are complex, nonlinear, and/or poorly understood, a perfect model derived from first-principles is generally unachievable or unworkable. Thus, the model predictive controller 414 uses a model identified through a system identification process facilitated by the training data generator 408, the training data database 410, and the model identifier 412, described in detail below.

System identification, as facilitated by the training data generator 408, the training data database 410, and the model identifier 412, is a process of constructing mathematical models of dynamic systems. System identification provides a suitable alternative to first-principles-derived model when first principles models are unavailable or too complex for on-line MPC computations. System identification captures the important and relevant system dynamics based on actual input/output data (training data) of the system, in particular by determining model parameters particular to a building or zone to tune the model to the behavior of the building/zone. As described in detail below, the training data generator 408, the training data database 410, and the model identifier 412 each contribute to system identification by the controller 212.

The training data generator 408 is configured to generate training data by providing an excitation signal to the system. That is, the training data generator provides various $\dot{Q}_{HVAC}$ values to the equipment controller 416 for a number N of time steps k, and receives the measured output response of the indoor air temperature $T_{ia}$ at each time step k from the air temperature sensor 214. The various $\dot{Q}_{HVAC}$ values may be chosen by the training data generator 408 to explore the system dynamics as much as possible (e.g., across a full range of possible $\dot{Q}_{HVAC}$ values, different patterns of $\dot{Q}_{HVAC}$ values, etc.).

The equipment controller 416 receives the various $\dot{Q}_{HVAC}$ values and generates various control inputs $T_{sp}$ in response. The temperature setpoint $T_{sp}$ for each time step k is provided to the HVAC equipment 210, which operates accordingly to heat or cool the zone 200 (i.e., to influence $T_{ia}$). The temperature setpoints $T_{sp}$ may also be provided to the training data generator 408 to be included in the training data. The training data generator receives an updated measurement of the indoor air temperature $T_{ia}$ for each time step k and may also receive the outdoor air temperature $T_{oa}$ for each time step k. The training data generator 408 thereby causes the states, inputs, and outputs of the system to vary across the time steps k and generates data corresponding to the inputs and outputs.

The inputs and outputs generated by the training data generator 408 are provided to the training data database 410. More particularly, in the nomenclature of the model of Eq. E and Eq. F above, the training data generator 408 provides inputs $T_{sp}$ and $T_{oa}$ and outputs $\dot{Q}_{HVAC}$ and $T_{ia}$ for each time step k to the training data database 410.

The training data database 410 stores the inputs and outputs for each time step k provided by the training data generator 408. Each input and output is tagged with a time step identifier, so that data for the same time step can be associated together. The training data database 410 thereby collects and stores input and output data for each time step k, k=0, . . . , N, or, more specifically, $T_{sp}(k)$, $T_{oa}(k)$, $T_{ia}(k)$, and $\dot{Q}_{HVAC}(k)$, for k, k=0, . . . , N. This data is grouped together in the training data database 410 in a set of training data $Z^N$. In the notation of Eq. G and Eq. H, $Z^N=[y(1), u(1), y(2), u(2), \ldots, y(N),u(N)]$.

In some embodiments, the training data is refined using a saturation detection and removal process. System and methods for saturation detection and removal suitable for use to refine the training data $Z^N$ are described in U.S. patent application Ser. No. 15/900,459, filed Feb. 20, 2018, incorporated by reference herein in its entirety. For example, as described in detail therein, the training data may be filtered by determining whether the operating capacity is in a non-transient region for a threshold amount of a time period upon determining that an error for the building zone exists for the time period, and in response to a determination that the operating capacity is in the non-transient region for at least the threshold amount of the time period, indicating the time period as a saturation period. Data from the saturation period can then be removed from the training data.

The model identifier 412 accesses the training data database 410 to retrieve the training data $Z^N$ and uses the training data $Z^N$ to identify a model of the system. The model identifier 412 includes a system parameter identifier 418 and a gain parameter identifier 420. As shown in detail in FIG. 5 and discussed in detail with reference thereto, the system parameter identifier 418 carries out a first step of system identification, namely identifying the model parameters, while the gain parameter identifier 420 carries out the second step, namely determining a Kalman gain estimator. The model parameters and the Kalman gain estimator are included in an identified model of the system, and that model is provided to the model predictive controller 414. The model predictive controller can thus facilitate the control of the HVAC equipment 210 as described above.

Figure 5:
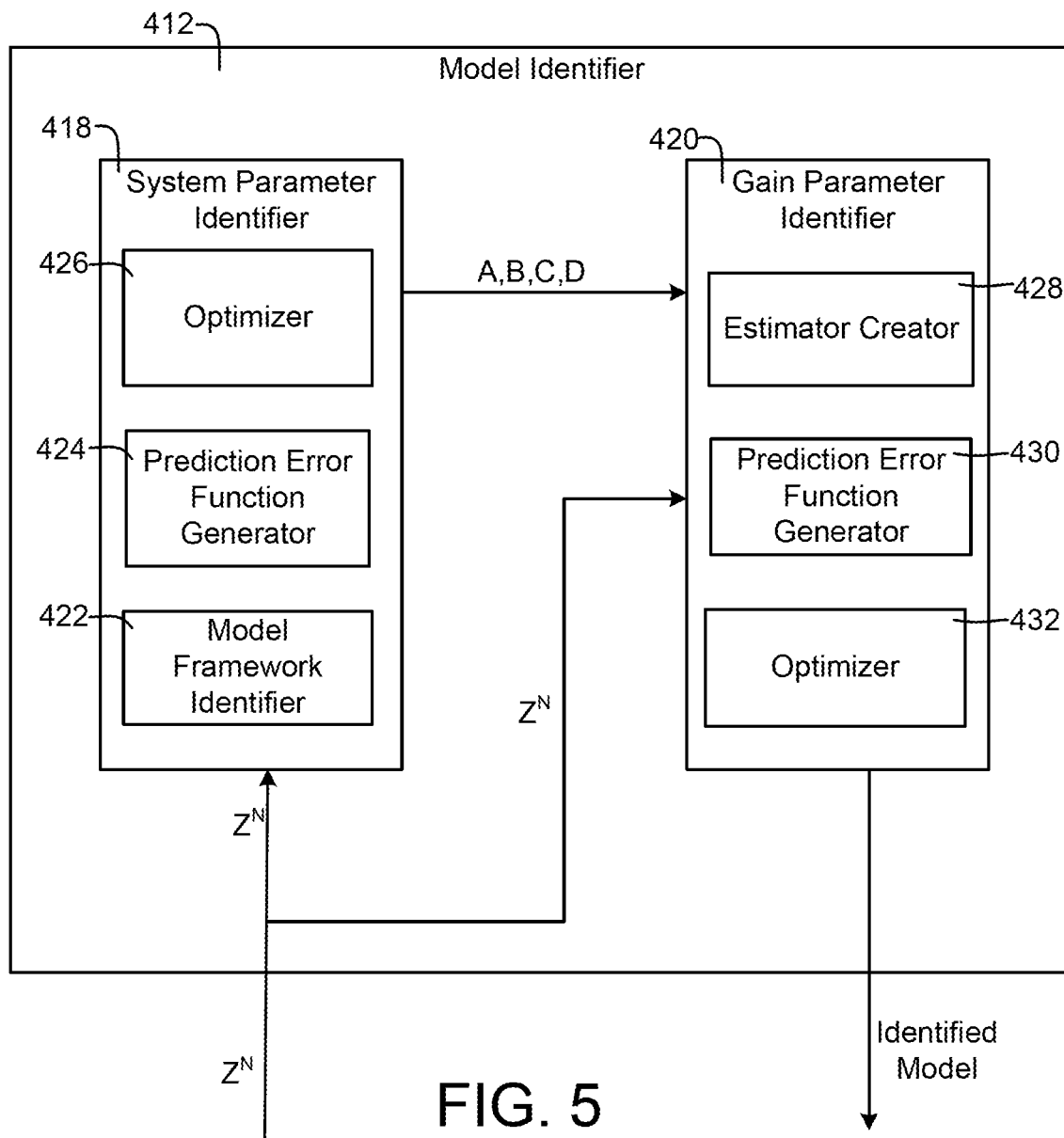
FIG. 5 is a detailed block diagram of a model identifier of the controller of FIG. 4, according to some embodiments.

Referring now to FIG. 5, a detailed view of the model identifier 412 is shown, according to an exemplary embodiment. As mentioned above, the model identifier 412 includes the system parameter identifier 418 and the gain parameter identifier 420. The system parameter identifier 418 is structured to identify the matrices A, B, C, D of Eqs. G and H, i.e., the values of $\theta=\{\theta_1, \theta_2, \theta_3, \theta_4, \theta_5, \theta_6\}$. In the embodiment described herein, this corresponds to finding the values of $C_{ia}$, $C_m$, $R_{mi}$, $R_{oi}$, $K_{p,j}$, and $K_{i,j}$.

The system parameter identifier 418 includes a model framework identifier 422, a prediction error function generator 424, and an optimizer 426. The model framework identifier 422 identifies that the model of the system, denoted as $\mathcal{M}(\theta)$, corresponds to the form described above in Eqs. G and H, i.e., $$\dot{x}(t)=A_c(\theta)x(t)+B_c(\theta)u(t); \quad \text{(Eq. G)}$$

$$y(t)=C_c(\theta)x(t)+D_c(\theta)u(t); \quad \text{(Eq. H)}.$$

The model framework identifier 422 thereby determines that the system parameter identifier 418 has the goal of determining a parameter vector $\hat{\theta}_N$ from the set of $\theta \in D_{\mathcal{M}} \subset \mathbb{R}^d$, where $D_{\mathcal{M}}$ is the set of admissible model parameter values. The resulting possible models are given by the set: $M=\{\mathcal{M}(\theta), \theta \in D_{\mathcal{M}}\}$. The goal of the system parameter identifier 418 is to select a parameter vector $\hat{\theta}_N$ from among possible values of $\theta$ that best matches the model to the physical system (i.e., the vector $\theta$ is a list of variables and the vector $\hat{\theta}_N$ is a list of values), thereby defining matrices A, B, C, and D. The model framework identifier 422 also receives training data $Z^N$ and sorts the training data (i.e., $T_{sp}(k)$, $T_{oa}(k)$, $T_{ia}(k)$, and $\dot{Q}_{HVAC}(k)$, for k, k=0, . . . , N) into the notation of Eq. G-H as input/output data $Z^N=[y(1), u(1), y(2), u(2), \ldots, y(N), u(N)]$.

The prediction error function generator 424 receives the model framework $M=\{\mathcal{M}(\theta), \theta \in D_{\mathcal{M}}\}$ and the training data $Z^N$ from the model framework identifier 422. The prediction error function generator 424 applies a prediction error method to determine the optimal parameter vector $\hat{\theta}_N$. In general, prediction error methods determine the optimal parameter vector $\hat{\theta}_N$ by minimizing some prediction performance function $V_N(\theta, Z^N)$ that is based in some way on the difference between predicted outputs and the observed/measured outputs included in the training data $Z^N$. That is, the parameter estimation $\hat{\theta}_N$ is determined as:

$$\hat{\theta}_N=\hat{\theta}_N(Z^N)=\arg\min_{\theta \in D_{\mathcal{M}}} V_N(\theta, Z^N).$$

The prediction error function generator 424 use one or more of several possible prediction error approaches to generate a prediction performance function $V_N(\theta, Z^N)$. In the embodiment shown, the prediction error function generator applies a simulation approach. In the simulation approach, the prediction error function generator 424 uses the model $\mathcal{M}(\theta)$, the input trajectory $[u(1), u(2), \ldots, u(N)]$, and an initial state $x(0)$ to produce predicted outputs in terms of $\theta$. That is, the prediction error function generator 424 predicts:

$$[\hat{y}(1|0,\theta), \hat{y}(2|0,\theta) \ldots \hat{y}(k|0,\theta) \ldots \hat{y}(N|0,\theta)],$$

where $\hat{y}(k|0, \theta)$ denotes the predicted output at time step k given the training data from time 0 and the model $\mathcal{M}(\theta)$. The prediction error function generator 424 then calculates a prediction error at each time step k is given by $\varepsilon(k, \theta):=y(k)-\hat{y}(k|0, \theta)$. The prediction error function generator 424 then squares the two-norm of each prediction error $\varepsilon(k, \theta)$ and sums the results to determine the prediction performance function, which can be written as:

$$V_N(\theta, Z^N)=\Sigma_{k=1}^N \|y(k)-\hat{y}(k|0,\theta)\|_2^2 \quad \text{(Eq. I)}.$$

In an alternative embodiment, the prediction error function generator 424 applies a one-step-ahead prediction error method to generate the prediction performance function $V_N(\theta, Z^N)$. In the one-step-ahead prediction error method, the prediction error function generator 424 uses past input-output data and the model $\mathcal{M}(\theta)$ the model to predict the output one step ahead in terms of $\theta$. That is, in the one-step ahead prediction error method, the prediction error function generator 424 generates one-step ahead predictions $\hat{y}(k|k-1, \theta)$, which denotes the predicted output at time step k given the past input-output sequence $Z^{k-1}$ and using parameters $\theta$. The one-step ahead prediction $\hat{y}(k|k-1, \theta)$ is then compared to the measured output y(k) by the prediction error function generator 424 to determine the prediction error at k, defined as $\varepsilon(k, \theta):=y(k)-\hat{y}(k|k-1, \theta)$. The prediction error function generator 424 then squares the two-norm of the prediction errors for each k and sums the results, generating a prediction performance function that can be expressed in a condensed form as:

$$V_N(\theta, Z^N) = \frac{1}{N}\sum_{k=1}^{N}\|y(k) - \hat{y}(k \mid k-1, \theta)\|_2^2. \quad \text{(Eq. J)}$$

In other alternative embodiments, the prediction error function generator 424 uses a multi-step ahead prediction error approach to generate the prediction performance function. The multi-step ahead prediction error approach is described in detail below with reference to the gain parameter identifier 420 and FIGS. 7-8.

The prediction error function generator 424 then provides the performance function $V_N(\theta, Z^N)$ (i.e., from Eq. I or Eq. J in various embodiments) to the optimizer 426.

The optimizer 426 receives the prediction error function generated by the prediction error function generator 424 and optimizes the prediction error function in $\theta$ to determine $\hat{\theta}_N$. More specifically, the optimizer 426 finds the minimum value of the prediction error function $V_N(\theta, Z^N)$ as $\theta$ is varied throughout the allowable values of $\theta \in D_{\mathcal{M}}$. That is, the optimizer 426 determines $\hat{\theta}_N$ based on:

$$\hat{\theta}_N = \hat{\theta}_N(Z^N) = \arg\min_{\theta \in D_{\mathcal{M}}} V_N(\theta, Z^N).$$

The optimizer 426 then uses $\hat{\theta}_N$ to calculate the matrices A, B, C, and D. The system parameter identifier 418 then provides the identified matrices A, B, C, D to the gain parameter identifier 420.

The gain parameter identifier 420 receives the model with the matrices A, B, C, D (i.e., the model parameters) from system parameter identifier 418, as well as the training data $Z^N$ from the training data database 410, and uses that information to identify the gain parameters. The gain parameter identifier 420 includes an estimator creator 428, a prediction error function generator 430, and an optimizer 432.

The estimator creator 428 adds a disturbance model and introduces a Kalman estimator gain to account for thermal dynamics of the system, for example for the influence of $\dot{Q}_{other}$ on the system. The estimator creator 428 generates an augmented model with disturbance state d, given by:

$$\begin{bmatrix} \dot{x}(t) \\ \dot{d}(t) \end{bmatrix} = \begin{bmatrix} A_c & B_d \\ 0 & 0 \end{bmatrix}\begin{bmatrix} x(t) \\ d(t) \end{bmatrix} + \begin{bmatrix} B_c \\ 0 \end{bmatrix}u(t);$$

$$y(t) = \begin{bmatrix} C_c & C_d \end{bmatrix}\begin{bmatrix} x(t) \\ d(t) \end{bmatrix} + D_c u(t)$$

where the parameters $A_c$, $B_c$, $C_c$, and $D_c$ are the matrices A, B, C, D received from the system parameter identifier 418 and the disturbance model is selected with $$B_d = \frac{1}{C_{ia}} \text{ and } C_d = 0.$$

The estimator creator 428 then converts the model to a discrete time model, for example using 5-minute sampling periods, resulting in the matrices $A_{dis}$, $B_{dis}$, $C_{dis}$, $D_{dis}$ and the disturbance model discrete time matrix $B_{d_{dis}}$. The estimator creator 428 then adds a parameterized estimator gain, resulting in the following model:

$$\begin{bmatrix} \hat{x}(t+1 \mid t) \\ \hat{d}(t+1 \mid t) \end{bmatrix} = \begin{bmatrix} A_{dis} & B_{d_{dis}} \\ 0 & I \end{bmatrix}\begin{bmatrix} \hat{x}(t \mid t-1) \\ \hat{d}(t \mid t-1) \end{bmatrix} + \begin{bmatrix} B_{dis} \\ 0 \end{bmatrix}u(t) + \quad \text{(Eq. K)}$$

$$\underbrace{\begin{bmatrix} K_x(\phi) \\ K_d(\phi) \end{bmatrix}}_{=:K(\phi)}(y(t) - \hat{y}(t \mid t-1));$$

$$\hat{y}(t \mid t-1) = \begin{bmatrix} C_{dis} & 0 \end{bmatrix}\begin{bmatrix} \hat{x}(t \mid t-1) \\ \hat{d}(t \mid t-1) \end{bmatrix} + D_{dis}u(t). \quad \text{(Eq. L)}$$

The matrix $K(\phi)$ is the estimator gain parameterized with the parameter vector $\phi$ where:

$$K_x(\phi) = \begin{bmatrix} \phi_1 & \phi_2 \\ \phi_3 & \phi_4 \\ \phi_5 & \phi_6 \end{bmatrix};$$

$$K_d(\phi) = \begin{bmatrix} \phi_7 & \phi_8 \end{bmatrix}.$$

In this notation, $\hat{x}(t+1|t)$ is an estimate of the state at time t+1 obtained using the Kalman filter and made utilizing information at sampling time t. For example, with a sampling time of five minutes, $\hat{x}(t+1|t)$ is an estimate of the state five minutes after the collection of the data that the estimate is based on. The goal of the gain parameter identifier is to identify parameters $\hat{\phi}_N$ (i.e., a vector of for each of $\phi_1 \ldots \phi_8$) that make the model best match the physical system.

The estimator creator 428 then provides the discrete time model with estimator gain (i.e., Eqs. K-L) to the prediction error function generator 430. The prediction error function generator receives the model from the estimator creator 428 as well as the training data $Z^N$ from the training data database 410, and uses the model (with the estimator gain) and the training data $Z^N$ to generate a prediction performance function.

Figure 7:
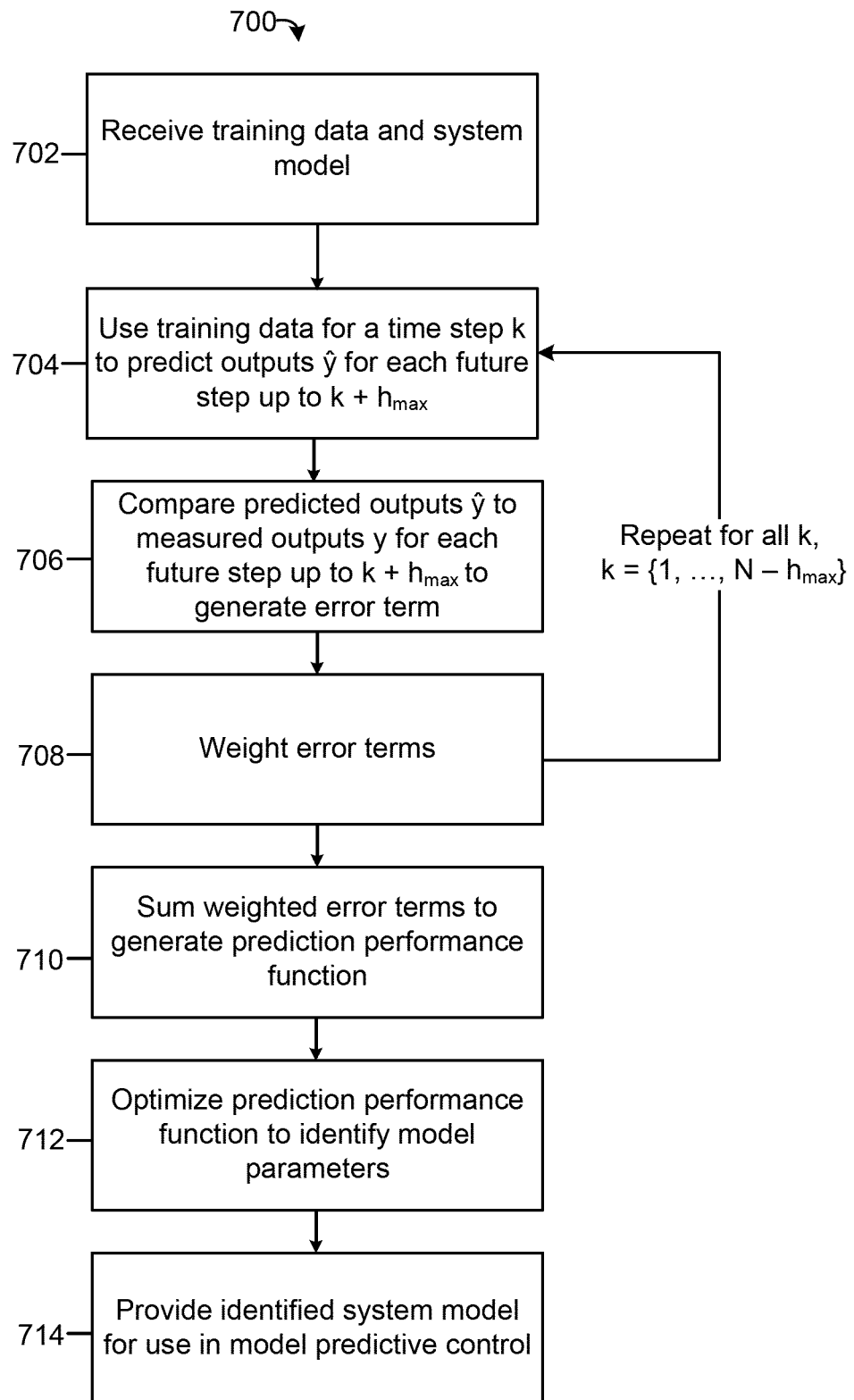
FIG. 7 is a flowchart of a multi-step ahead prediction error method for use in system identification, according to some embodiments.
Figure 8:
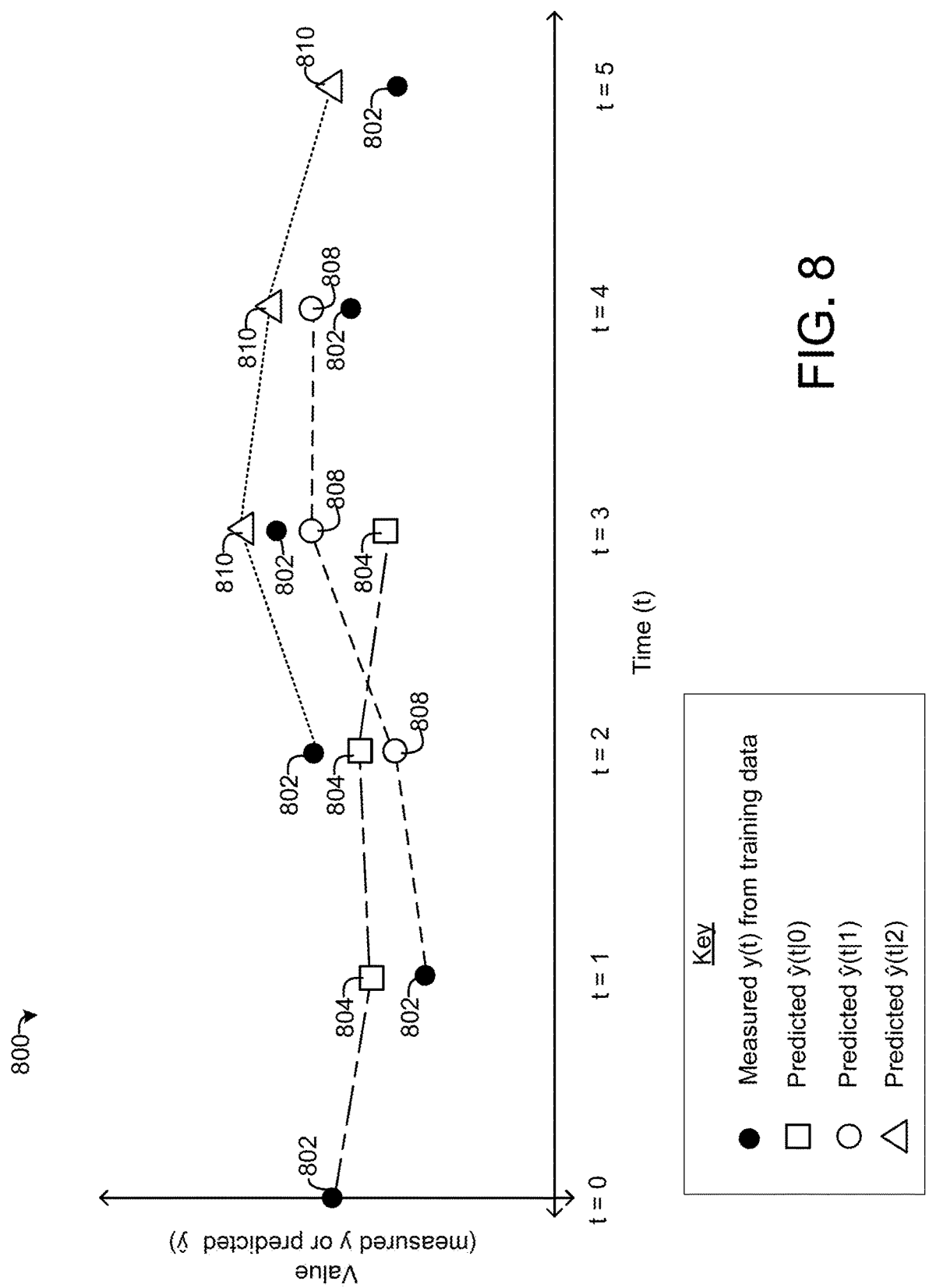
FIG. 8 is a visualization useful in illustrating the multi-step ahead prediction error method of FIG. 7, according to some embodiments.
Figure 9:
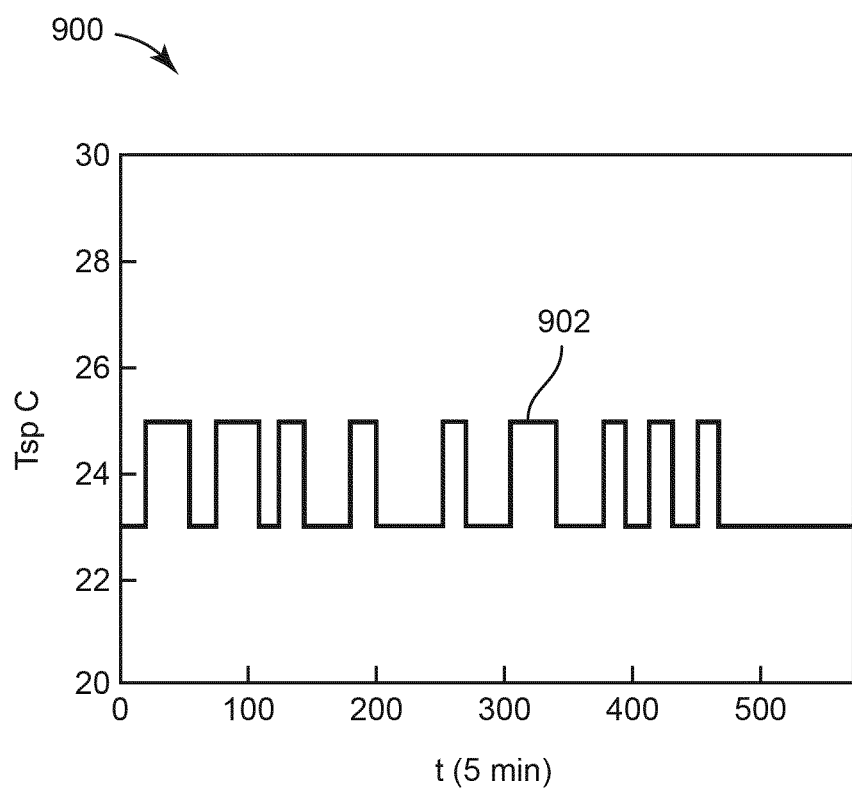
FIG. 9 is graph of an excitation signal used in a cooling experiment to test the controller of FIG. 4, according to some embodiments.

The prediction error function generator 430 follows a multi-step ahead prediction error method to generate a predication performance function $V_N(\phi, Z^N)$. The multi-step ahead prediction error method is illustrated in FIGS. 7-8 and described in detail with reference thereto. As an overview, in the multi-step-ahead prediction error method, the prediction error function generator 430 uses past input-output data and the model $\mathcal{M}(\theta)$ the model to predict the output multiple step ahead in terms of $\phi$. That is, in the multi-step ahead prediction error method, the prediction error function generator 430 generates multi-step ahead predictions $\hat{y}(k+h|k-1, \phi)$, which denotes the predicted output at time step k+h given the past input-output sequence $Z^{k-1}$ and using parameters $\phi$. The index h corresponds the number of steps ahead the prediction is made, and for each time step k predictions are made for h=0, ..., $h_{max}$ (i.e., when h=2, the prediction is three steps ahead because h is indexed from zero).

Each multiple multi-step ahead prediction ŷ(k+h|k−1, φ) is then compared to the corresponding measured output y(k) by the prediction error function generator 430 to determine the prediction error at k, defined as ε(k, θ):=y(k)−ŷ(k+h|k−1, φ). The prediction error function generator 430 then squares the two-norm of the prediction errors for each k and sums the results, in some embodiments using an weighting function w(h). The prediction error function generator 430 thereby generates a prediction performance function that can be expressed in a condensed form as:

$$V_N(\phi, Z^N) = \sum_{k=1}^{N-h_{max}+1} \sum_{h=0}^{h_{max}} w(h) \|y(k+h) - \hat{y}(k+h \mid k-1, \phi)\|_2^2. \quad \text{(Eq. M)}$$

The multi-step ahead prediction error method is described in more detail below with reference to FIGS. 7-8. In alternative embodiments, the prediction error function generator 430 follows the simulation approach or the one-step ahead prediction error approach discussed above with reference to the prediction error function generator 424.

The prediction error function generator 430 then provides the prediction performance function (i.e., Eq. M) to the optimizer 432. The optimizer 432 receives the prediction error function $V_N(\phi, Z^N)$ generated by the prediction error function generator 430 and optimizes the prediction error function in φ to determine $\hat{\phi}_N$. More specifically, the optimizer 426 finds the minimum value of the prediction error function $V_N(\phi, Z^N)$ as φ is varied throughout the allowable values of φ. In some cases, all real values of φ are allowable. That is, the optimizer 426 determines $\hat{\phi}_N$ based on:

$$\hat{\phi}_N = \hat{\phi}_N(Z^N) = \arg\min_\phi V_N(\phi, Z^N).$$

The optimizer 432 then uses $\hat{\phi}_N$ to calculate the matrices $K_x(\phi)$ and $K_d(\phi)$, resulting in a fully identified model. The gain parameter identifier 420 provides the identified model to the model predictive controller 414.

In some embodiments, the prediction error function generator 430 reconfigures the multi-step ahead prediction problem by defining augmented vectors that allow the multi-step ahead prediction performance function (Eq. M) to be recast in an identical structure to the single-step ahead prediction performance function (Eq. J). Existing software toolboxes and programs (e.g., Matlab system identification toolbox) configured to handle the single-step ahead prediction error approach can then be used to carry out the multi-step ahead prediction error approach. To reconfigure the problem for that purpose, the prediction error function generator 430 considers, the system model of the form:

x(k+1)=Ax(k)+Bu(k);

y(k)=Cx(k)+Du(k).

where the one-step prediction of x̂(k+1|k) using a steady-state Kalman gain is:

x̂(k+1|k)=Ax̂(k|k−1)+Bu(k)+K(y(k)−Cx̂(k|k−1)−Du(k));

ŷ(k|k−1)=Cx̂(k|k−1)+Du(k).

In the multi-step prediction Kalman gain system identification problem, the complete pattern of the algebraic manipulations is shown by the 4-step prediction. The prediction error function generator 430 considers a case with four input data points and four output data-points starting from time h=0 to time h=3, so that $h_{max}$=3. The one-step prediction (with the prediction error function generator 430 given x0) is given by the equation:

x̂(1|0)=Ax0+Bu(0)+K(y(0)−Cx0−Du(0));

ŷ(0|0)=Cx0+Du(0).

The prediction of the second step is x̂(2|0)=Ax̂(1|0)+Bu(1)=A(Ax0+Bu(0)+K(y(0)−Cx0−Du(0)))+Bu(1);

ŷ(1|0)=Cx̂(1|0)+Du(1)=C(Ax0+Bu(0)+K(y(0)−Cx0−Du(0)))+Du(1).

The prediction of the third step is $$\hat{x}(3 \mid 0) = A\hat{x}(2 \mid 0) + Bu(2) =$$
$$A(A(Ax0 + Bu(0) + K(y(0) - Cx0 - Du(0))) + Bu(1)) + Bu(2);$$
$$\hat{y}(2 \mid 0) = C\hat{x}(2 \mid 0) + Du(2) =$$
$$C(A(Ax0 + Bu(0) + K(y(0) - Cx0 - Du(0))) + Bu(1)) + Du(2).$$

The forth step prediction is $$\hat{x}(4 \mid 0) = A\hat{x}(3 \mid 0) + Bu(3) =$$
$$A(A(A(Ax0 + Bu(0) + K(y(0) - Cx0 - Du(0))) + Bu(1)) + Bu(2)) + Bu(3);$$
$$\hat{y}(3 \mid 0) = C\hat{x}(3 \mid 0) + Du(3) =$$
$$C(A(A(Ax0 + Bu(0) + K(y(0) - Cx0 - Du(0))) + Bu(1)) + Bu(2)) + Du(3).$$

With these 4-step predictions, the pattern needed to cast the multi-step prediction problem as a 1-step prediction is revealed. By aggregating the matrices multiplying x0, y(0), u(0), u(1),u(2),and u(3), the pattern revealed is:

x̂(1|0)=Ax0+Bu(0)+K(y(0)−Cx0−Du(0));

x̂(2|0)=($A^2$−AKC)x0+(AB−AKD)u(0)+Bu(1)+AKy(0);

x̂(3|0)=($A^3$−$A^2$KC)x0+($A^2$B−$A^2$KD)u(0)+ABu(1)+Bu(2)+$A^2$Ky(0);

x̂(4|0)=($A^4$−$A^3$KC)x0+($A^3$B−$A^3$KD)u(0)+$A^2$Bu(1)ABu(2)+Bu(3)+$A^3$Ky(0);

ŷ(0)=Cx0+Du(0);

ŷ(1|0)=(CA−CKC)x0+(CB−CKD)u(0)+Du(1)+CKy(0);

ŷ(2|0)=($CA^2$−CAKC)x0+(CAB−CAKD)u(0)+CBu(1)+Du(2)+CAKy(0);

ŷ(3|0)=($CA^3$−$CA^2$KC)x0+($CA^2$B−$CA^2$KD)u(0)+CABu(1)+CBu(2)+Du(3)+$CA^2$Ky(0).

Based on that pattern, the prediction error function generator 430 defines the following vectors:

$$\tilde{u}(0) = \begin{bmatrix} u(0) \\ u(1) \\ u(2) \\ u(3) \\ y(0) \end{bmatrix}, \tilde{y}(0) = \begin{bmatrix} \hat{y}(0) \\ \hat{y}(1 \mid 0) \\ \hat{y}(2 \mid 0) \\ \hat{y}(3 \mid 0) \end{bmatrix}, \tilde{y}(0) = \begin{bmatrix} y(0) \\ y(1) \\ y(2) \\ y(3) \end{bmatrix},$$

x̂(1|0) and x0 remain unchanged.

The new system that has the 4-step prediction casted into a one-step prediction which can be analyzed by the prediction error function generator 430 using an existing system identification software product as:

$$\hat{x}(1\mid 0) = Ax0 + [B\ 0\ 0\ 0\ 0]\tilde{u}(0) + [k\ 0\ 0\ 0](\tilde{y}(0) - \hat{\tilde{y}}(0));$$

$$\hat{\tilde{y}}(0) = \begin{bmatrix} C \\ (CA-CKC) \\ (CA^2-CAKC) \\ (CA^3-CA^2KC) \end{bmatrix} x0 + \begin{bmatrix} D & 0 & 0 & 0 & 0 \\ (CB-CKD) & D & 0 & 0 & CK \\ (CAB-CAKD) & CB & D & 0 & CAK \\ (CA^2B-CA^2KD) & CAB & CB & D & CA^2K \end{bmatrix} \tilde{y}(0).$$

In order to have the general formulation at time k for predicting $h_{max}$ step ahead in time, this four-step example can be extrapolated to define the general augmented input and output vectors as:

$$\hat{\tilde{y}}(k) = \begin{bmatrix} C \\ (CA-CKC) \\ (CA^2-CAKC) \\ \vdots \\ (CA^{h_{max}}-CA^{h_{max}-1}KC) \end{bmatrix} \hat{x}(k\mid k-1) + \begin{bmatrix} D & 0 & 0 & 0 & 0 & 0 \\ (CB-CKD) & D & 0 & 0 & 0 & CK \\ (CAB-CAKD) & CB & D & 0 & 0 & CAK \\ (CA^2B-CA^2KD) & CAB & \ddots & \ddots & 0 & 0 & CA^2K \\ \vdots & \vdots & & \ddots & CB & D & 0 & \vdots \\ (CA^{h_{max}-1}B-CA^{h_{max}-1}KD) & CA^{h_{max}-2}B & \cdots & CAB & CB & D & CA^{h_{max}-1}K \end{bmatrix} \tilde{u}(k);$$

$$\tilde{u}(k) = \begin{bmatrix} u(k) \\ u(k+1) \\ \vdots \\ u(k+h_{max}) \\ y(k) \end{bmatrix}, \hat{\tilde{y}}(k) = \begin{bmatrix} \hat{y}(k\mid k-1) \\ \hat{y}(k+1\mid k-1) \\ \vdots \\ \hat{y}(k+h_{max}\mid k-1) \end{bmatrix}, \tilde{y}(k) = \begin{bmatrix} y(k) \\ y(k+1) \\ \vdots \\ y(k+h_{max}) \end{bmatrix}$$

With these definition, the general formulation at time k for predicting $h_{max}$ steps ahead in time is:

$$\hat{x}(k+1\mid k) = A\hat{x}(k\mid k-1) + [B\ 0\ \ldots\ 0]\tilde{u}(k) + [K\ 0\ \ldots\ 0](\tilde{y}(k) - \hat{\tilde{y}}(k)).$$

As described above, in the multi-step ahead prediction error method the prediction error function generator 430 generates a function of the form:

$$V_N(\phi, Z^N) = \sum_{k=1}^{N-h_{max}+1} \sum_{h=0}^{h_{max}} w(h)\|y(k+h) - \hat{y}(k+h\mid k-1, \phi)\|_2^2. \qquad \text{(Eq. M)}$$

If $w(h) \equiv 1$ for all h, and using the augmented input and output vectors defined above, the multi-step ahead prediction performance function can be reconfigured into the following one-step ahead prediction performance function by the prediction error function generator 430:

$$V_N(\theta, Z^N) = V_N(\theta, Z^N) = \sum_{k=1}^{N-h_{max}+1} \|\tilde{y}(k) - \hat{\tilde{y}}(k, \theta)\|_2^2$$

The prediction error function generator 430 then uses this reconfigured format of the prediction performance function with existing software toolboxes suited for the one-step ahead prediction error approach. The prediction error function generator 430 may include machine-readable media storing computer code executable to apply such software.

System Identification Methods

Figure 6:
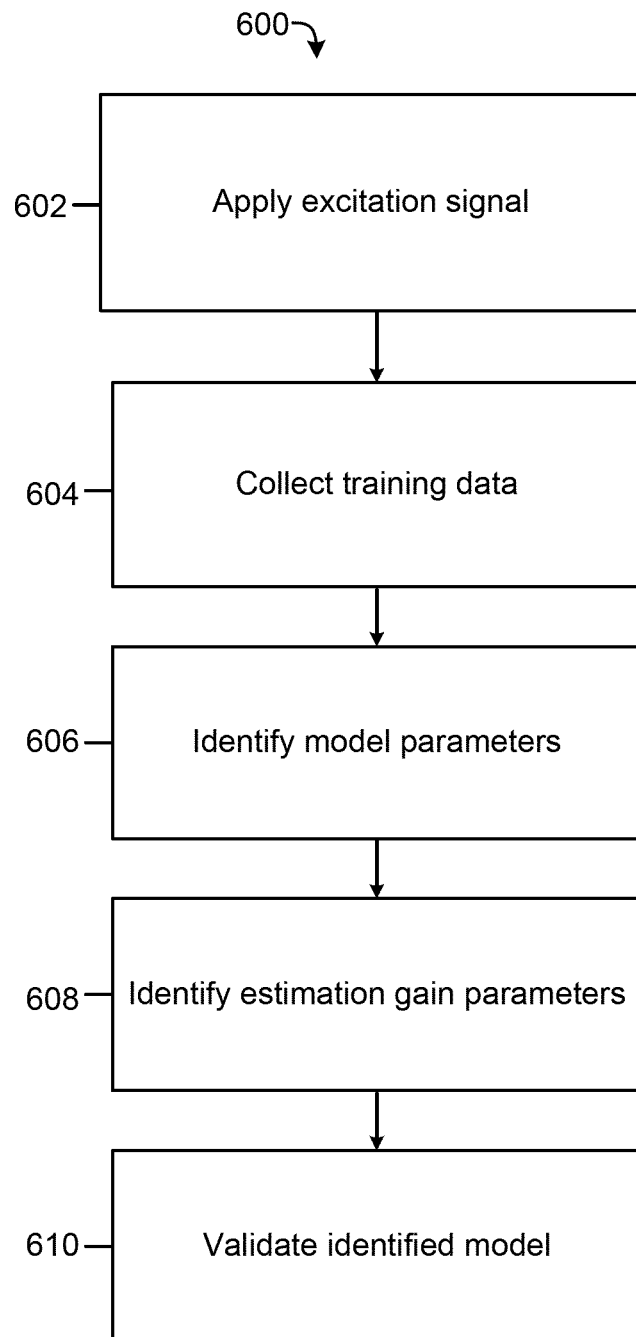
FIG. 6 is flowchart of a process for system identification, according to some embodiments.

Referring now to FIG. 6, a flowchart of a process 600 for system identification is shown, according to an exemplary embodiment. The process 600 can be carried out by the controller 212 of FIGS. 2 and 4.

At step 602, the controller 212 applies an excitation signal to the HVAC equipment 210. For example, the training data generator 408 may vary the $\dot{Q}_{HVAC}$ values supplied to the equipment controller 416, causing an excitation signal to be generated in the temperature setpoint $T_{sp}$ inputs provided to the HVAC equipment 210. In general, the excitation signal is designed to test the system in a way to provide robust data for use in system identification.

At step 604, training data is collected and stored by the controller 212. Training data includes measureable temperature readings, i.e., $T_{oa}$ and $T_{ia}$, controller-determined values $\dot{Q}_{HVAC}$ and $T_{sp}$ for each of a plurality of time steps k, k=0, ..., N. The training data therefore includes inputs u(k) and the outputs y(k) for the time period. The training data is received from temperature sensors 214, 216, training data generator 408, and/or equipment controller 416 and stored in training data database 410.

At step 606, the controller 212 identifies the model parameters for the system. That is, as discussed in detail above, the controller 212 determines the matrices A(θ), B(θ), C(θ), and D(θ) that minimize a prediction performance function $V_N(Z^N, \theta)$ for the model:

$$\dot{x}(t) = A_c(\theta)x(t) + B_c(\theta)u(t); \qquad \text{(Eq. G)}$$

$$y(t) = C_c(\theta)x(t) + D_c(\theta)u(t); \qquad \text{(Eq. H)}.$$

In identifying the model parameters, a simulation approach or a one-step-ahead prediction error approach is followed in some embodiments. These approaches are described in detail above with reference to the prediction error function generator 424 of FIG. 5. In other embodiments, the model parameters are determined at step 606 using a multi-step ahead prediction error method, described in detail with reference to FIGS. 7-8.

At step 608, the controller 212 identifies the gain estimator parameters. That is, the controller 212 determines the matrices $K_x$ and $K_d$ of Eq. K above. In preferred embodiments, the controller 212 uses the multi-step ahead prediction error method to find the matrices $K_x$ and $K_d$. The multi-step ahead prediction error method is described in detail below with reference to FIGS. 7-8. In alternative embodiments, a simulation approach or a one-step-ahead prediction error approach is followed to find the matrices $K_x$ and $K_d$.

At step 610, the identified model is validated by the controller 212. The controller 212 uses the identified model to generate control signal inputs $T_{sp}$ for the HVAC equipment 210 using model predictive control. The controller then monitors the temperature measurements $T_{oa}$ and $T_{ia}$ from temperature sensors 214, 216, the input $T_{sp}$, and the value $\dot{Q}_{HVAC}$ to determine how well the model matches system behavior in normal operation. For example, the training data database 410 may collect and store an addition set of training data that can be used by the model identifier 412 to validate the model. If some discrepancy is determined, the identified model may be updated. The identified model can thereby be dynamically adjusted to adjust for changes in the physical system.

Referring now to FIGS. 7-8 the multi-step ahead prediction error approach for use in system identification is illustrated, according to an exemplary embodiment. In FIG. 7, a flowchart of a process 700 for identifying system parameters using the multi-step ahead prediction error approach is shown, according to an exemplary embodiment. FIG. 8 shows an example visualization useful in explaining process 700. Process 700 can be carried out by the system parameter identifier 418 and/or the gain parameter identifier 420 of FIG. 5. In the embodiment described herein, the process 700 is implemented with the gain parameter identifier 420.

Process 700 begins at step 702, where the gain parameter identifier 420 receives training data $Z^N=[y(1), u(1), y(2), u(2), \ldots, y(N), u(N)]$ from the training data database 410. The training data includes measured outputs y(k) (i.e., $T_{ia}(k)$ and $\dot{Q}_{HVAC}(k)$) and inputs u(k) (i.e., $T_{oa}(k)$ and $T_{sp}(k)$) for each time step k, k=1, ..., N. N is the number of samples in the training data. The gain parameter identifier 420 also receives the system model from the system parameter identifier 418.

At step 704, the prediction error function generator 430 uses the training data for a time step k to predict outputs ŷ for each subsequent time step up to k+$h_{max}$. The value $h_{max}$ corresponds to the number of steps ahead the predictions are made, referred to herein as the prediction horizon. Because $h_{max}$ is indexed from zero in Eq. M above, the prediction horizon is one more than the value of $h_{max}$. For example, in the case shown in FIG. 8 and described below, predictions are made three steps ahead, corresponding to $h_{max}=2$ in the notation of Eq. D and a prediction horizon of three. The prediction horizon may be any integer greater than one, for example four or eight. The prediction horizon can be tuned experimentally, to determine an ideal prediction horizon. For example, too long of a prediction horizon may lead to poor prediction while too short of a prediction horizon may suffer the same limitations as the one-step ahead prediction error method mentioned above. In some cases, a prediction horizon of eight is preferred.

More specifically, at each step 704 the predicted outputs [ŷ(k|k−1), ŷ(k+1|k−1), ... ŷ(k+$h_{max}$|k−1)] are predicted based on the past training data (i.e., through step k−1), denoted as $Z^{k-1}$, along with future inputs [u(k), u(k+1) ... u(k+$h_{max}$)]. These predictions are made using the model $\mathcal{M}(\theta)$, such that predicted outputs ŷ depend on φ.

To illustrate the predictions of step 704, FIG. 8 shows a simplified visualization in which y(k) and ŷ(k) are depicted as scalar values for the sake of simplified explanation. In FIG. 8, the graph 800 plots the values of y and ŷ over time t for five time steps past a starting time t=0. The solid circles 802 represent measured outputs y(t) from the training data. The unfilled boxes 804 represent predicted outputs ŷ(t|0), that is, the outputs predicted for each time step based on the input/output data available at time t=0 (e.g., y(0)). The dashed lines represent the propagation of the predictions; for example, graph 800 includes three unfilled boxes 804 connected by a dashed line to the solid circle 802 corresponding to y(0). This shows that the predictions ŷ(t|0), 1≤t≤3, represented by the unfilled boxes 804 were based on the measured value of y(0).

At step 706, the prediction error function generator 430 compares the predicted outputs ŷ to the measured outputs y for each future step up to k+$h_{max}$ (i.e., for all predicted outputs ŷ generated at step 704). More specifically, an error term for each step may be defined as y(k+h)−ŷ(k+h|k−1,φ). Because y and ŷ are vectors, the two-norm of this error term may be taken and squared to facilitate comparison between prediction errors as scalars, such that the error term becomes $\|y(k+h)-\hat{y}(k+h|k-1,\phi)\|_2^2$. This term appears in Eq. M above.

As shown in FIG. 8, step 706 can be understood as measuring the distance between, for example, each unfilled box 804 and the corresponding solid circle 802 (i.e., the unfilled box 804 and the solid circle 802 at the same time t). Thus, in the example of FIG. 8, step 706 includes calculating three error terms.

At step 708, the error terms are weighted based on a weighting function w(h). The weighting function w(h) allows the prediction errors to be given more or less weight depending on how many steps ahead the prediction is. The weighting function w(h) is preferably a monotonically decreasing function of h, so that farther-out-in-time predictions have less influence on the prediction error. In some embodiments, the weighting function w(h)=1. Step 708 thereby corresponds the w(h) term in Eq. M above.

The process 700 then returns to step 704 to repeat steps 704-706 for each value of k, k=1, N−$h_{max}$. As illustrated in FIG. 8, repeating step 704 corresponds to generating the predictions represented by the unfilled circles 808 and the unfilled triangles 810. The unfilled circles 808 chart the predictions based on the output data available at time t=1, i.e., ŷ(t|1), for t=2, 3, 4. The unfilled triangles chart the predictions based on the output data available at time t=2, i.e., ŷ(t|2), for t=3, 4, 5. Process 700 therefore involves making multiple predictions for most time steps: for example, FIG. 8 shows three separate predictions for time t=3.

At step 706, the prediction error function generator 430 again compares the predicted outputs ŷ for the new value of k to the measured outputs y for each future step up to k+$h_{max}$ to define the error term $\|y(k+h)-\hat{y}(k+h|k-1, \theta z)\|_2^2$ as included in Eq. M. At step 708, the terms are again weighted by the weighting function w(h). The weighting function w(h) may be the same for each k.

In the notation of Eq. M, each iteration of steps 704-708 thus corresponds to steps necessary to generate the values used by the inner (right) summation indexed in h, while repetition of the steps 704-708 corresponds to the iteration through k represented in the outer (left) summation. At step 710, then, these summations are executed. In other words, the system identification circuit 108 sums the weighted error terms generated by steps 704-708 to generate a prediction performance function as:

$$V_N(\theta, Z^N) = \sum_{k=1}^{N-h_{max}+1} \sum_{h=0}^{h_{max}} w(h)\|y(k+h) - \hat{y}(k+h \mid k-1, \phi)\|_2^2. \quad \text{(Eq. M)}$$

The prediction performance function is a function of the input data $Z^N$ and the parameter variable φ. Typically, the input data $Z^N$ is given (i.e., received by the model identifier 412 and used in the calculation of error terms as described above). Thus, the prediction performance function is primarily a function of ϕ.

At step 712, the prediction performance function $V_N(\phi, Z^N)$ is minimized to find an optimal parameter vector $\theta_N$=arg min min$_{\theta \in D_M}$ $V_N(\phi, Z^N)$. Any minimization procedure may be followed. The result of step 712 is a vector $\hat{\phi}_N$ of identified model parameters that tune the model $\mathcal{M}(\hat{\phi}_N)$ to accurately predict system evolution multiple steps ahead. At step 714, the model identifier 412 provides the identified system model (i.e., $\mathcal{M}(\hat{\phi}_N)$) to the model predictive controller 414 for use in generating control inputs for the HVAC equipment 210.

According to various embodiments, process 700 is run once at set-up to establish the system model, run periodically to update the system model, or run repeatedly/continuously to dynamically update the system model in real time.

Experimental Results

To illustrates the advantages of the systems and methods described above, the following experimental results are included and shown in FIGS. 9-18. The HVAC system 100 and the building 10 were put through two experiments: a heating and a cooling experiment.

Heating Experiment

In the heating experiment, a simulated HVAC system 100 is in a heating mode to heat a simulated building 10. Because the system is simulated the actual values of the system parameters and the unmeasured time-varying disturbances ($\dot{Q}_{other}$) are known in the experiment for sake of comparison to the identified model.

To start, the controller 212 provides excitation signal to the HVAC equipment 210. The excitation signal 902 illustrated on graph 900 in FIG. 9 varies the temperature setpoint $T_{sp}$ using a pseudorandom binary signal that varies between the maximum and minimum allowable temperatures in the comfort zone (Tmax=25° C., Tmin=23° C.).

While the excitation signal is applied to the HVAC equipment 210, training data is collected and stored in the controller 212 for each time step k as described above. Each time step k in the heating experiment corresponds to five minutes of time (i.e., a data sample is recorded every five minutes). The training data is used by the system parameter identifier 418 to identify the model parameters as described above. In the heating experiment, the following results were found:

| Identified Parameters | Actual Parameters |
|---|---|
| Cia_id = 2.287037e+003 | Cia = 1.0448e+04 |
| Cs_id = 3.2507187e+03 | Cs = 3.4369e+05 |
| Rsi_id = 0.57426198230 | Rsi = 0.0863 |
| Roi_id = 0.69936 | Roi = 0.3302 |
| τI_ID = 182.74 | τI = 180 |
| Kc_id = 2.637 | Kc = 12 |

The first step of model parameterization, carried out by the system parameter identifier 418, thereby determined the parameters to the correct order of magnitude, but some differences are present due to the time-varying disturbances (i.e., $\dot{Q}_{other}$).

Figure 10:
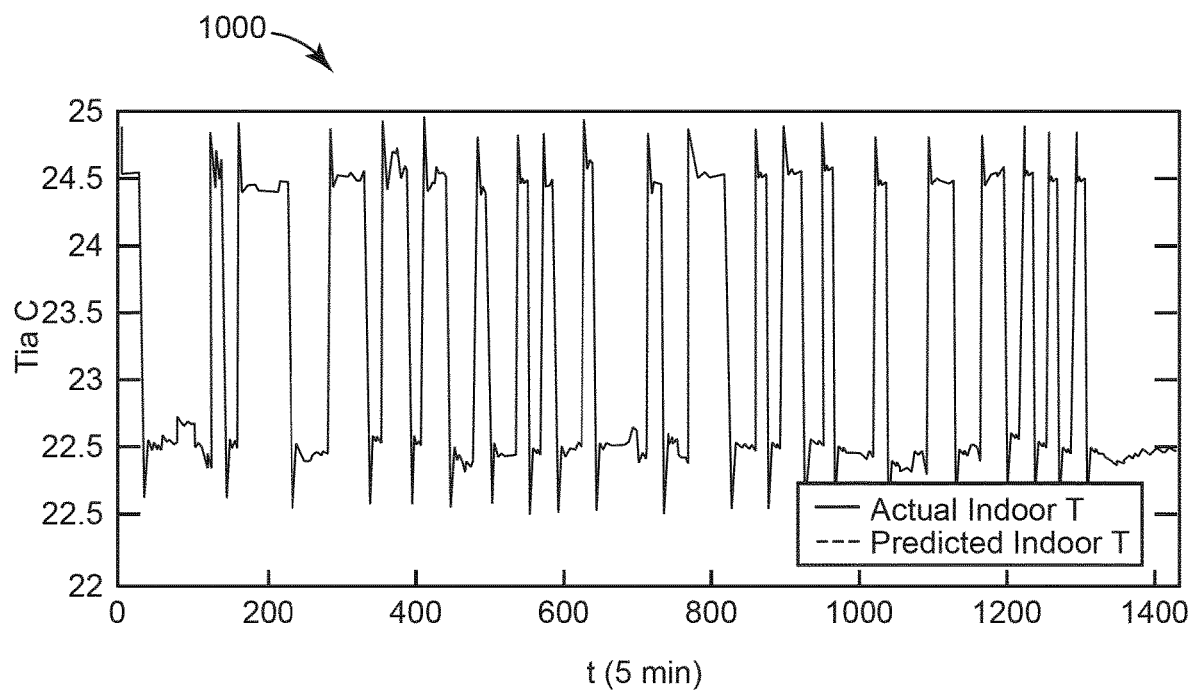
FIG. 10 is a first graph of results of the cooling experiment of FIG. 9, according to some embodiments.
Figure 11:
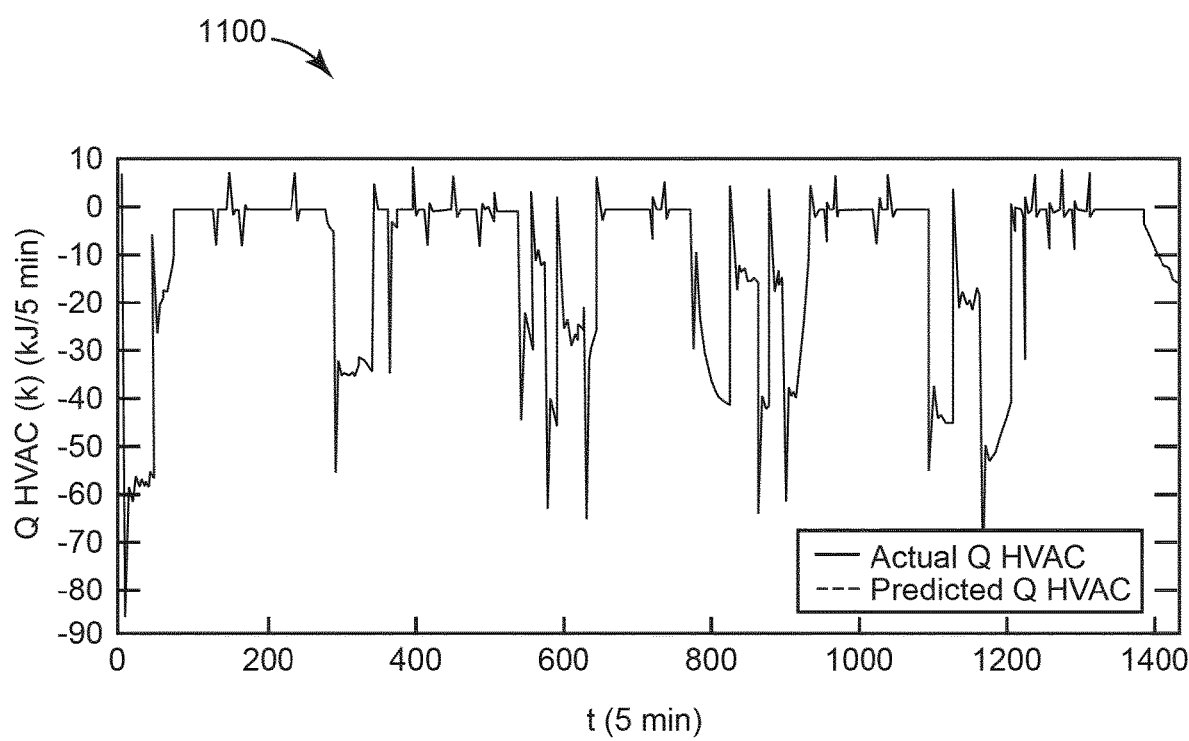
FIG. 11 is a second graph of results of the cooling experiment of FIG. 9, according to some embodiments.

Next, the Kalman gain parameters are identified by the gain parameter identifier 420. In the experiment, the gain parameters are identified using a one-step ahead prediction error method, a two-step ahead prediction error method, a five-step ahead prediction error method, a ten-step ahead prediction error method, and a fifty-step ahead prediction error method. As an example of the results, FIG. 10 shows a graph 1000 of the actual indoor temperature and the predicted indoor temperature over time as generated by the five-step ahead prediction error method. FIG. 11 shows a graph 1100 of the actual $\dot{Q}_{HVAC}$ and the predicted $\dot{Q}_{HVAC}$ over time as generated by the five-step ahead prediction error method. As shown in FIGS. 10 and 11, the predicted values of $T_{ia}$ and $\dot{Q}_{HVAC}$ consistently track the actual values.

The different number of steps (i.e., $h_{max}$ values) were included to allow comparison between the parameters identified using different numbers of steps. The Kalman gains identified using the various numbers of steps are presented in the following table:

|  | 1-Step Kalman | | 2-Step Kalman | | 5-step Kalman | | 10-Step Kalman | | 50-Step Kalman | |
|---|---|---|---|---|---|---|---|---|---|---|
|  | Tia | QHAVC | Tia | QHAVC | Tia | QHAVC | Tia | QHAVC | Tia | QHAVC |
| Tm | 4.4287 | 0.3367 | 3.570 | 0.5273 | 3.2643 | 0.3119 | 1.1435 | 0.4487 | −0.4660 | 0.1126 |
| Tia | 1.3442 | −0.0007 | 0.908 | −0.0098 | 0.6599 | −0.0128 | 0.4876 | −0.0188 | 0.1696 | −0.0826 |
| I | −125.5 | −110.8 | 62.25 | −105.345 | 73.984 | −110.048 | 172.649 | −105.768 | 78.550 | −74.3589 |
| d | −0.0008 | 0.0005 | −0.01 | 0.0003 | −0.0015 | 0.0004 | −0.0014 | 0.0003 | −0.0003 | 0.0001 |

Figure 12:
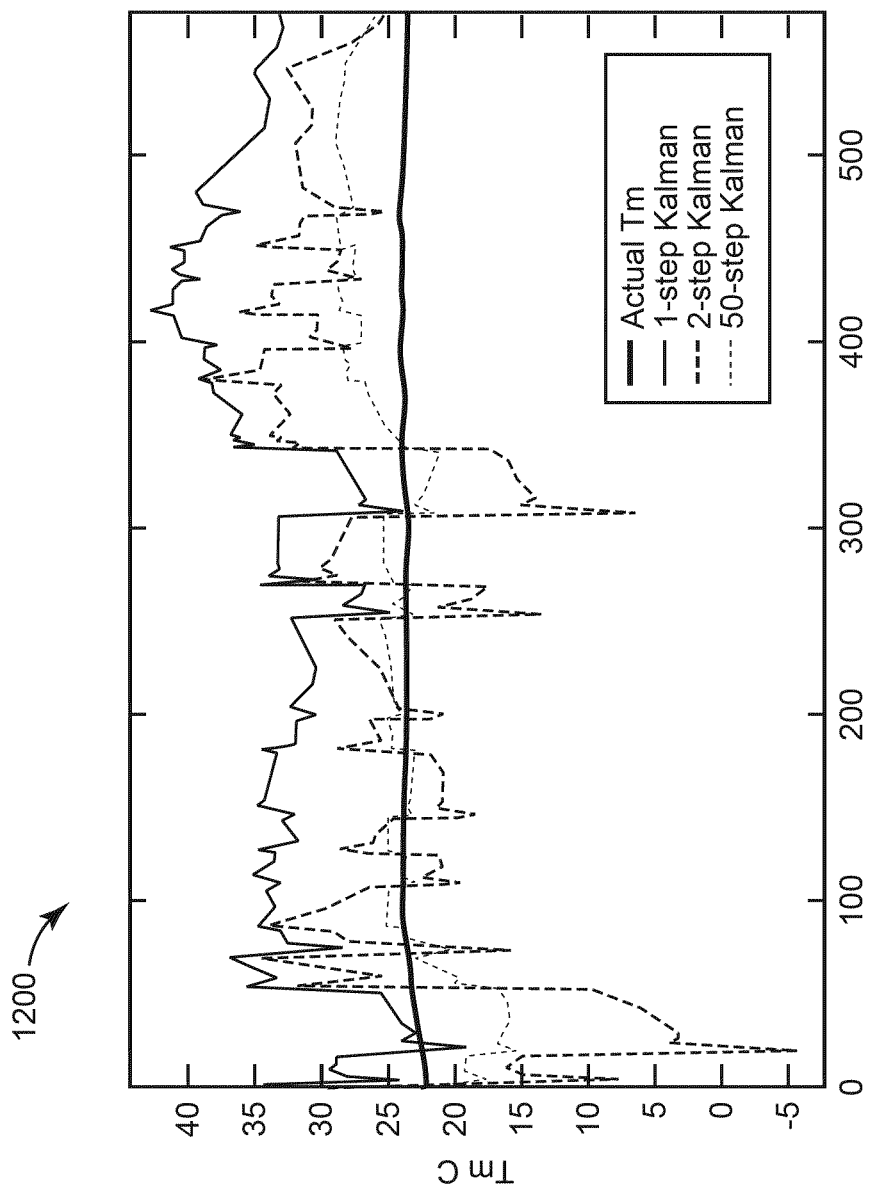
FIG. 12 is a third graph of results of the cooling experiment of FIG. 9, according to some embodiments.

FIG. 12 shows a graph 1200 of the estimated building mass temperature $T_m$ over time for the one-step prediction error method, the two-step prediction error method, and the fifty-step prediction error method, as well as the actual $T_m$ of the simulated building 10. As the number of steps increase, the $T_m$ estimates improve, following the actual $T_m$ line on graph 1200 closer.

Cooling Experiment

In the cooling experiment, a simulated HVAC system 100 is in a cooling mode to cool a simulated building 10. As above, because the system is simulated the actual values of the system parameters and the unmeasured time-varying disturbances ($\dot{Q}_{other}$) are known in the experiment for sake of comparison to the identified model.

Figure 13:
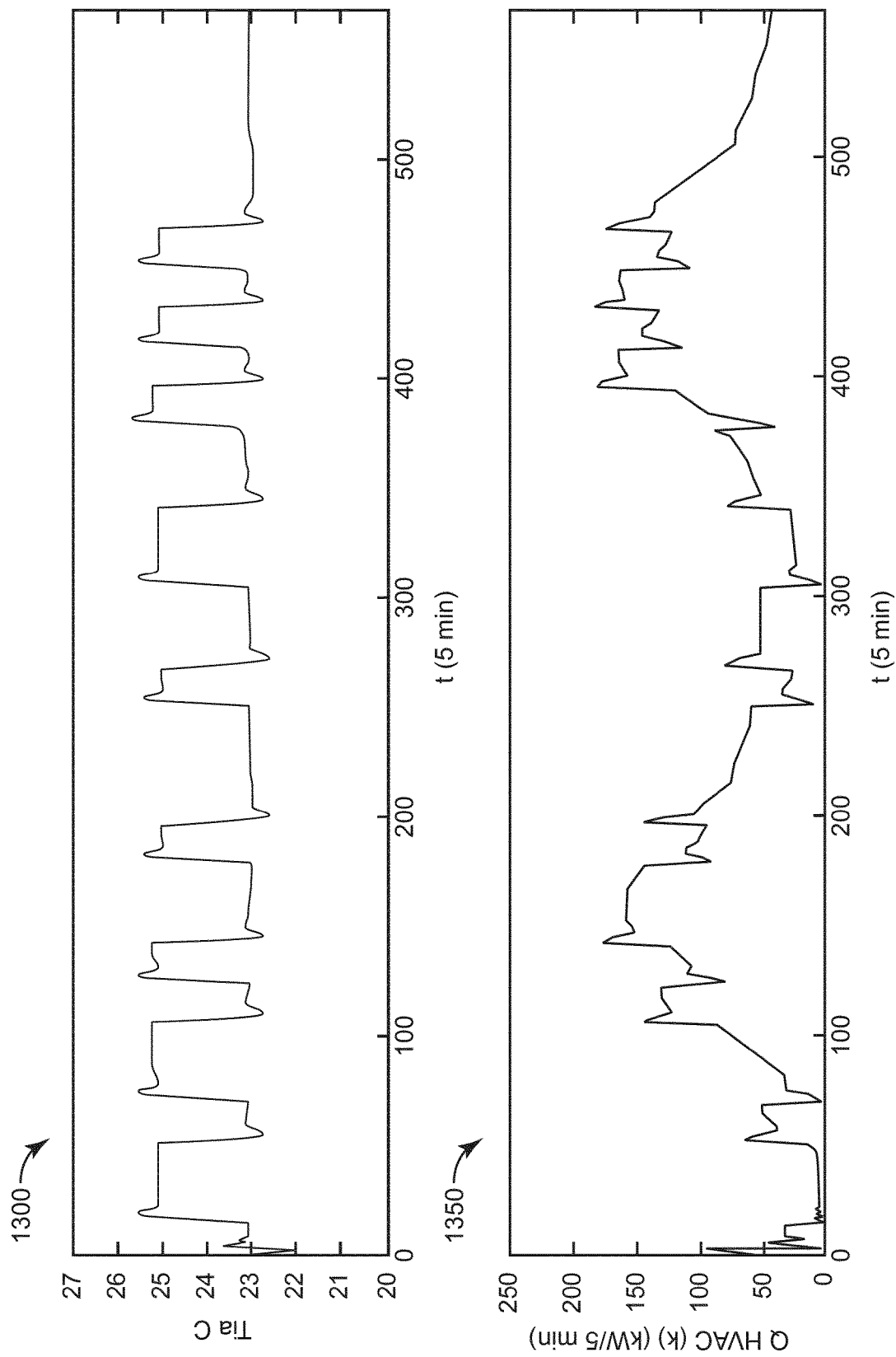
FIG. 13 is a first pair of graphs of results of a heating experiment that tests the controller of FIG. 4, according to some embodiments.
Figure 14:
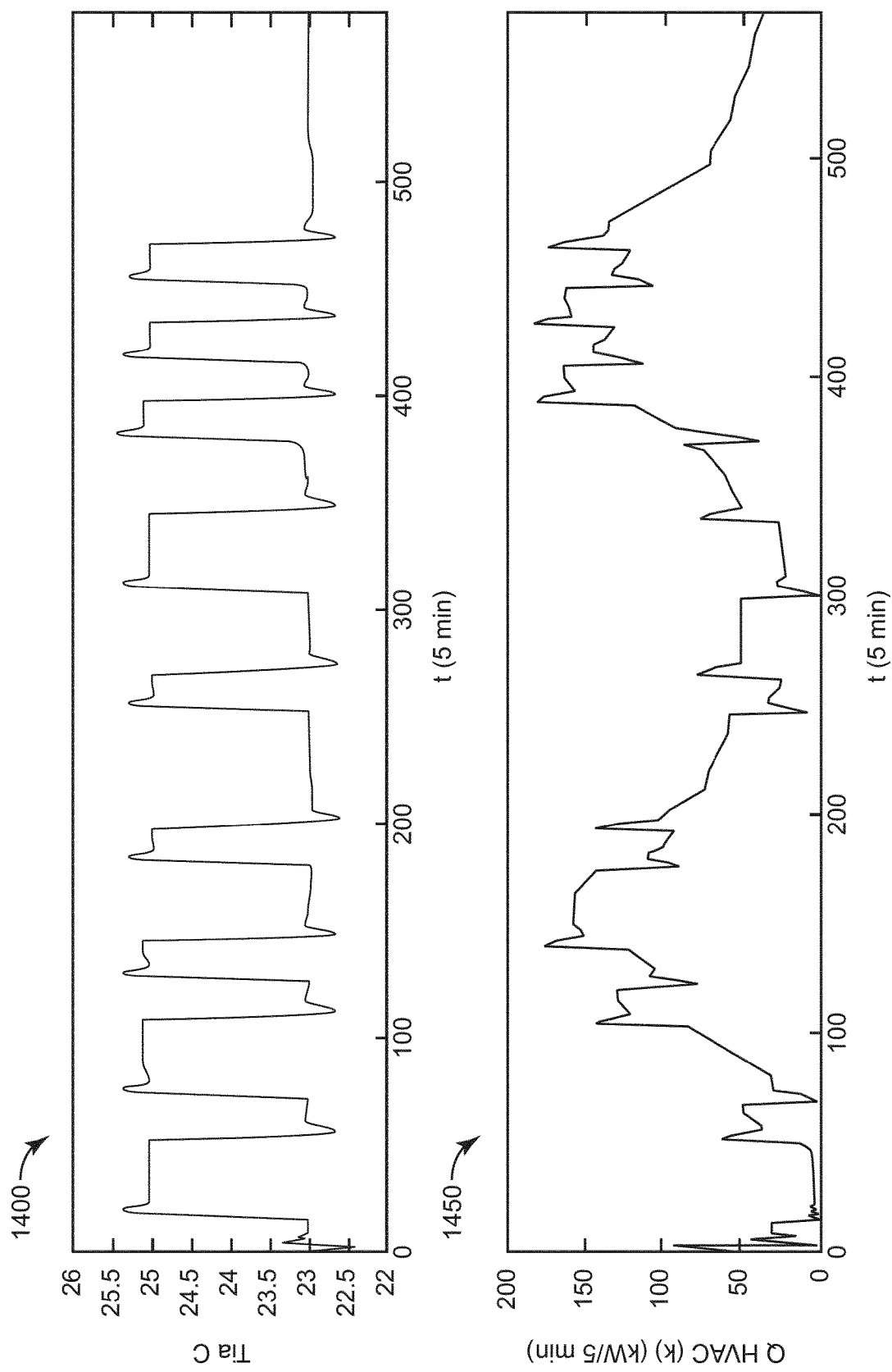
FIG. 14 is a second pair of graphs of results of the heating experiment of FIG. 13, according to some embodiments.

A similar procedure as the heating experiment is followed to generate models, with the Kalman gain generated using the multi-step prediction error method with a variety of number of steps (i.e., various prediction horizons $h_{max}$) (e.g., one step, two steps, eight steps, twelve steps, twenty steps). FIG. 13 shows output predictions generated using the one-step prediction error method compared to actual outputs, with $T_{ia}$ graphed over time on graph 1300 and $\dot{Q}_{HVAC}$ graphed over time on graph 1350. Similarly, FIG. 14 shows output predictions generated using the two-step prediction error method compared to actual outputs, with $T_{ia}$ graphed over time on graph 1400 and $\dot{Q}_{HVAC}$ graphed over time on graph 1450.

Figure 15:
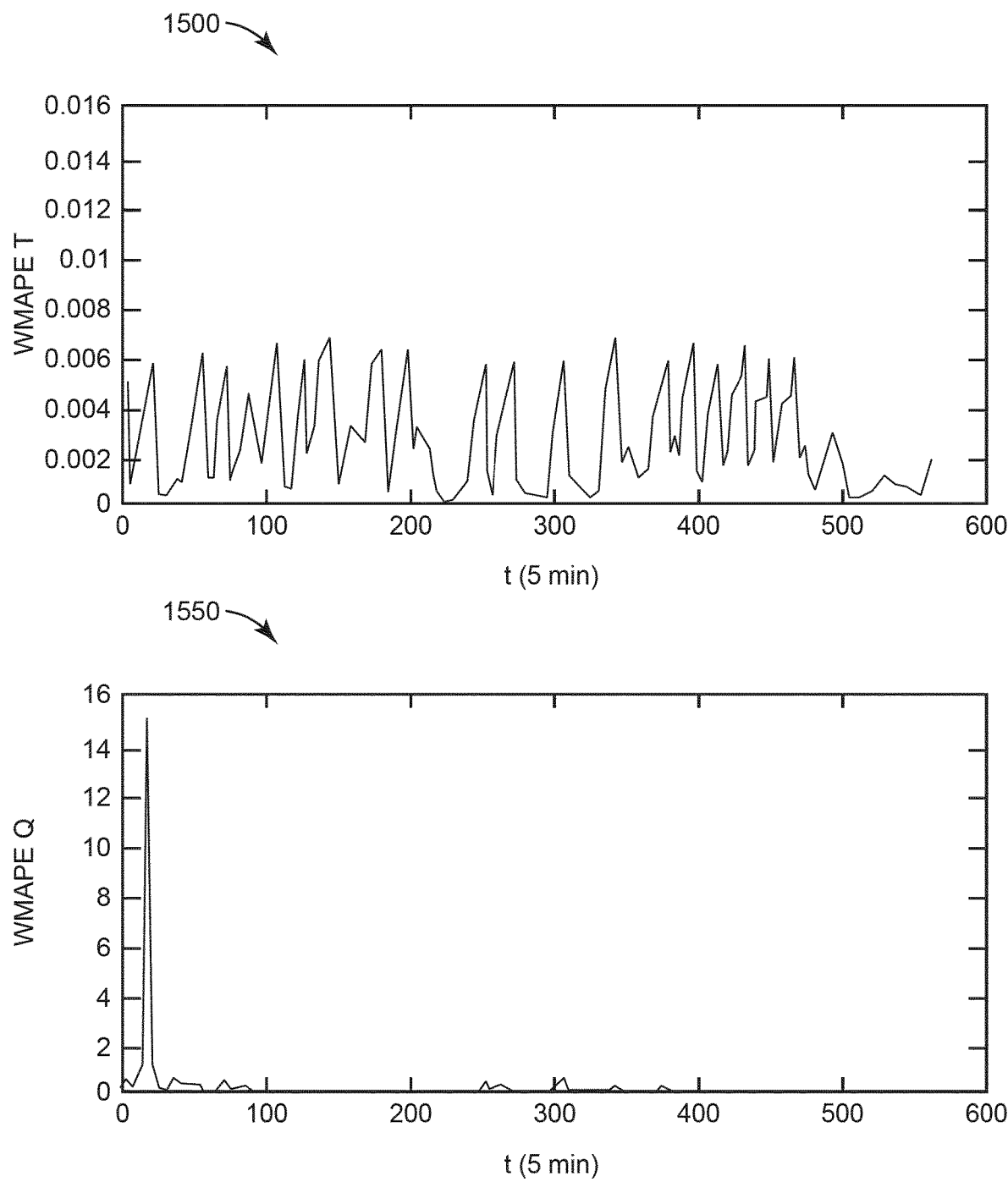
FIG. 15 is a third pair of graphs of results of the heating experiment of FIG. 13, according to some embodiments.

To compare the results of the various multi-step prediction error methods (i.e., various number of steps), several metrics are used. First, a weighted mean absolute prediction error (WMAPE) metric is an is an exponentially weighted average of the absolute prediction error at each time step and given by:

$$WMAPE(k) = \frac{\sum_{i=k}^{k+N_h-1} e^{-i/N_h}|y(i) - \hat{y}(i \mid k)|}{\sum_{i=k}^{k+N_h-1} e^{-i/N_h}}, k = 0, 1, 2, \ldots.$$

where $N_h \in \mathbb{I}_{>0}$ is the prediction horizon, y(i) is the actual output at time step i and ŷ(i|k) is the predicted output with the identified model given a measurement at time step k and the input sequence u(k), u(k+1), ..., u(i−1). In the WMAPE equation, y is used to refer to a scalar (i.e., one of the two outputs), and the WMAPE is computed separately for both outputs. The horizon used to calculate the WMAPE in the cooling experiment was twelve. FIG. 15 shows a graph 1500 of the WMAPE for Tia for the one-step ahead prediction error method and a 12-step ahead prediction error method for comparison. FIG. 15 also shows a graph 1550 of the WMAPE for $\dot{Q}_{HVAC}$ for the one-step ahead prediction error method and a 12-step ahead prediction error method for comparison.

Figure 16:
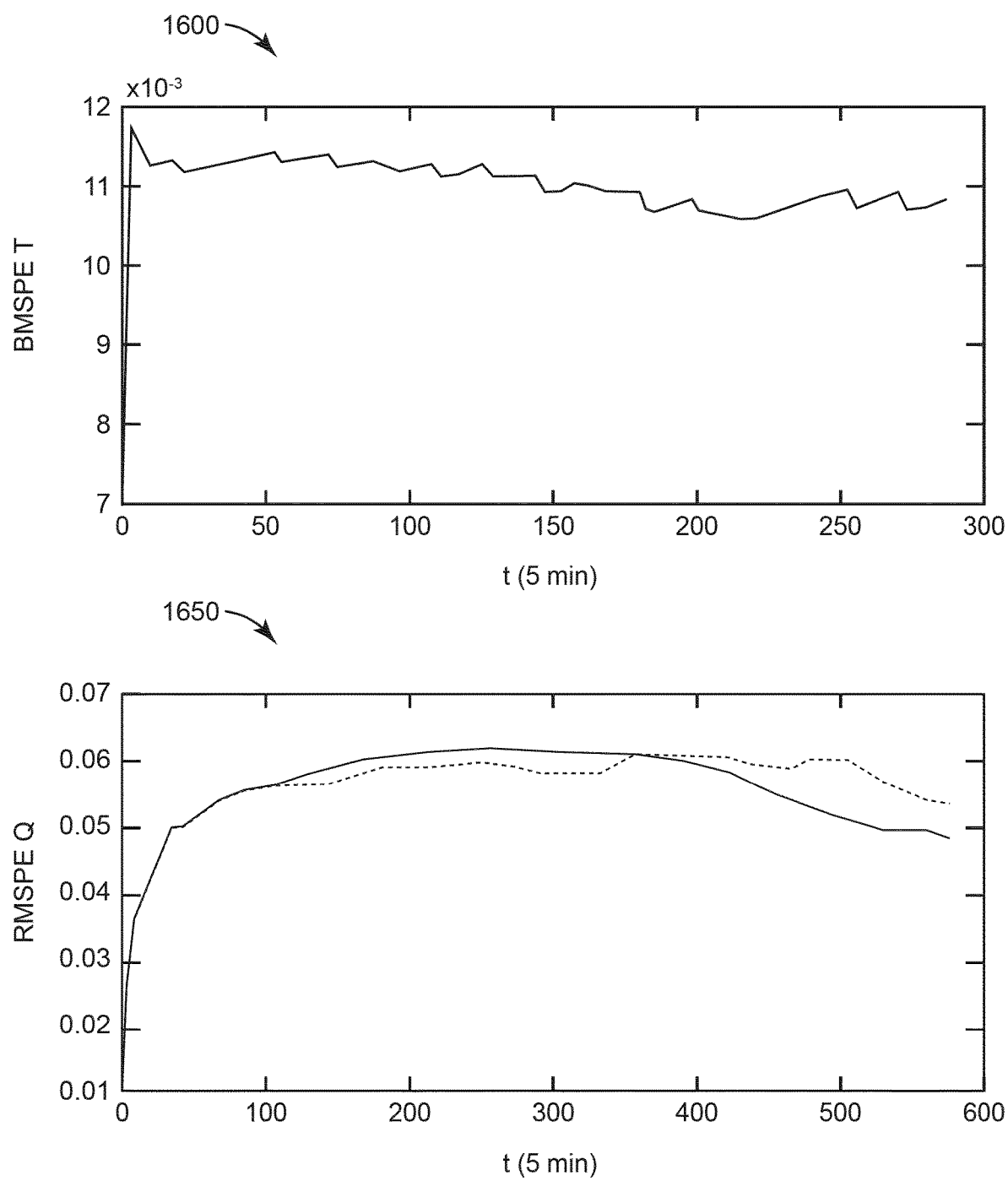
FIG. 16 is a fourth pair of graphs of results of the heating experiment of FIG. 13, according to some embodiments.

Another metric that can be used to evaluate the results of the cooling experiment is the root mean squared prediction error (RMSPE). RMSOE is calculated for a range of values of q from zero-step ahead prediction up to $N_h$-step ahead prediction. That is, given a set of measured output values {y(0), ..., y(M)} for $M \in \mathbb{I}_{\geq 0}$, the RMSPE is given by:

$$RMSPE(q) = \sqrt{\frac{\sum_{i=q+1}^{M}(y(i) - \hat{y}(i \mid i - q))}{M - q}}$$

for all q∈ {0, ..., $N_h$−1}. The RMSPE helps identify the prediction error over the prediction horizon. In the example here, the RMPSE is calculated for 288 steps (i.e., $N_h$=288). FIG. 16 shows a graph 1600 of the RMPSE for $T_{ia}$ for the one-step ahead prediction error method and a two-step ahead prediction error method for comparison. FIG. 16 also shows a graph 1650 of the WMAPE for $\dot{Q}_{HVAC}$ for the one-step ahead prediction error method and the two-step ahead prediction error method for comparison.

Figure 17:
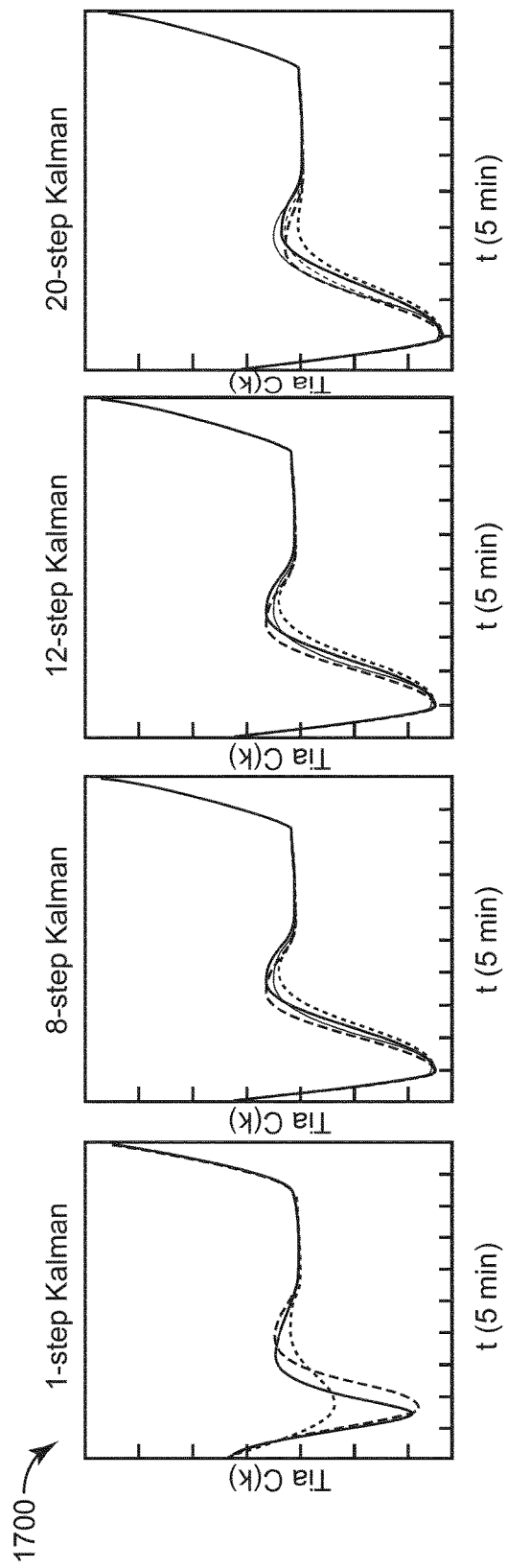
FIG. 17 is a first visualization comparing various results of the heating experiment of FIG. 13, according to some embodiments.
Figure 18:
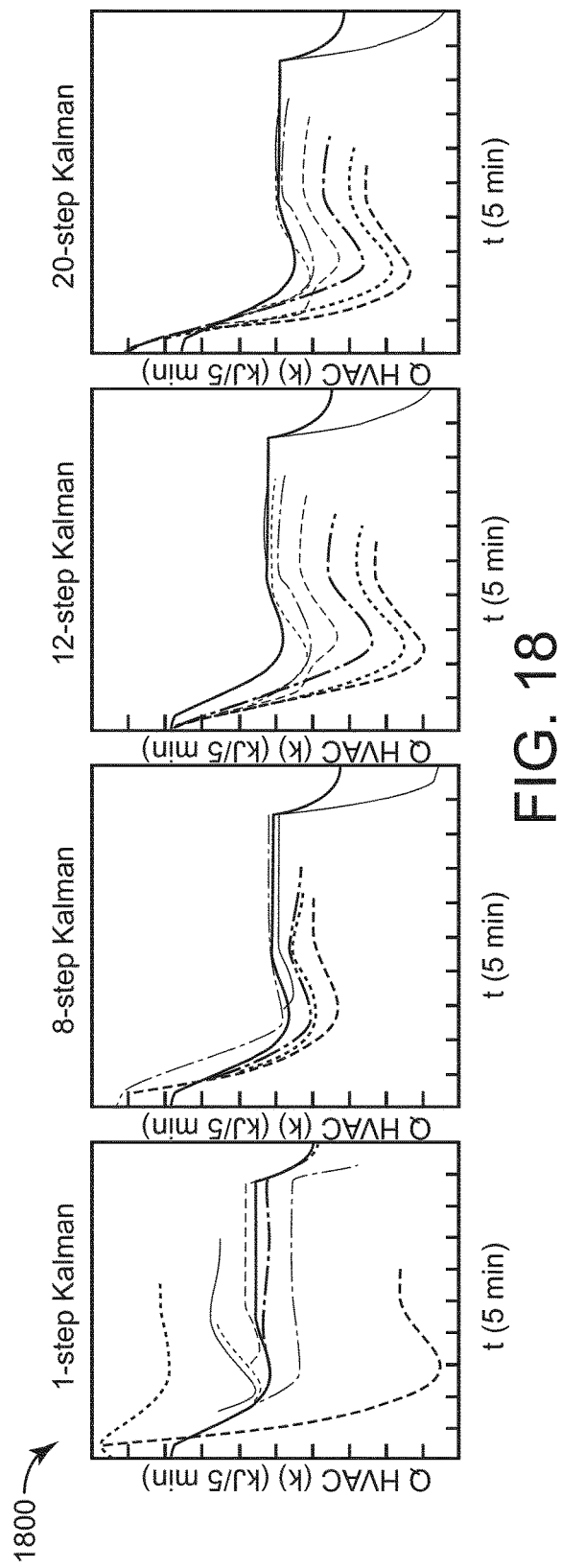
FIG. 18 is a second visualization comparing various results of the heating experiment of FIG. 13, according to some embodiments.

A third way to compare across different numbers of steps is to visualize the power of prediction. FIG. 17 and FIG. 18 shows examples visualizations 1700 and 1800 of this third metric. To generate the visualizations 1700, 1800, ten lines of N-steps-ahead predictions are plotted using the Kalman gain generated by each multi-step ahead prediction method. That is, a first line starts x0 (i.e., an initial state) and plots the N step ahead prediction, from x̂(1|0) all the way to x̂(N|0). The second line takes x̂(1|0) and plots N steps ahead, and so on, until ten lines are plotted. The closer the lines are to being on top of each other, the better the output multi-step prediction. In the examples of FIGS. 15 and 16, the lines are plotted for twelve steps ahead (N=12).

The visualization 1700 of FIG. 17 is thereby generated for each of the one-step ahead prediction error method, the eight-step ahead prediction error method, the twelve-step ahead prediction error method, the twenty-step ahead prediction error method for the output $T_{ia}$. The visualization 1800 of FIG. 18 is generated in the same way for each of the one-step ahead prediction error method, the eight-step ahead prediction error method, the twelve-step ahead prediction error method, the twenty-step ahead prediction error method for the output $\dot{Q}_{HVAC}$.

In both visualization 1700 and visualization 1800, the eight-step prediction error method is shown to have the best results (i.e., the lines are plotted closest together), even though the lines were plotted twelve steps ahead. Thus, in some embodiments, an eight-step ahead prediction error method may be preferred (i.e., $h_{max}$=7). Because each time step is five minutes in the experiment, this implies that a prediction horizon of forty minutes in the Kalman gain identification is well suited for generating a model that predicts one hour (12 steps) into the future.

Automated System Identification

Overview

Referring generally to FIGS. 19-27, systems and methods for performing automated system identification are shown, according to some embodiments. In some embodiments, MPC requires a system identification (SI) process to be performed in order to generate a predictive model that can be used in MPC. Automating the SI process can allow MPC to be operated for extended durations of time with little to no human interaction. Automated SI can allow MPC to be used in a variety of contexts without a highly-skilled human being required for various steps of the SI process.

In automated SI, predictive models can be updated automatically with little to no human interaction. Updating the predictive model can include either retraining a current predictive model and/or generating a new predictive model. Updating the predictive model can improve accuracy of MPC predictions by providing a suitable model for use in MPC. Generation of new predictive models may occur if, for example, a predictive model does not exist, an existing predictive model is determined to be too inaccurate to provide cost optimization, etc. However, generating new predictive models may be a computationally expensive process. As such, retraining a current predictive model can extend a lifetime in which the current predictive models can be utilized for MPC. By automatically updating the current predictive model, an amount of required human interaction can be reduced/eliminated. Likewise, computational complexity of MPC can be reduced, resulting in increased processing performance.

Controllers for Performing Automated System Identification

Figure 19:
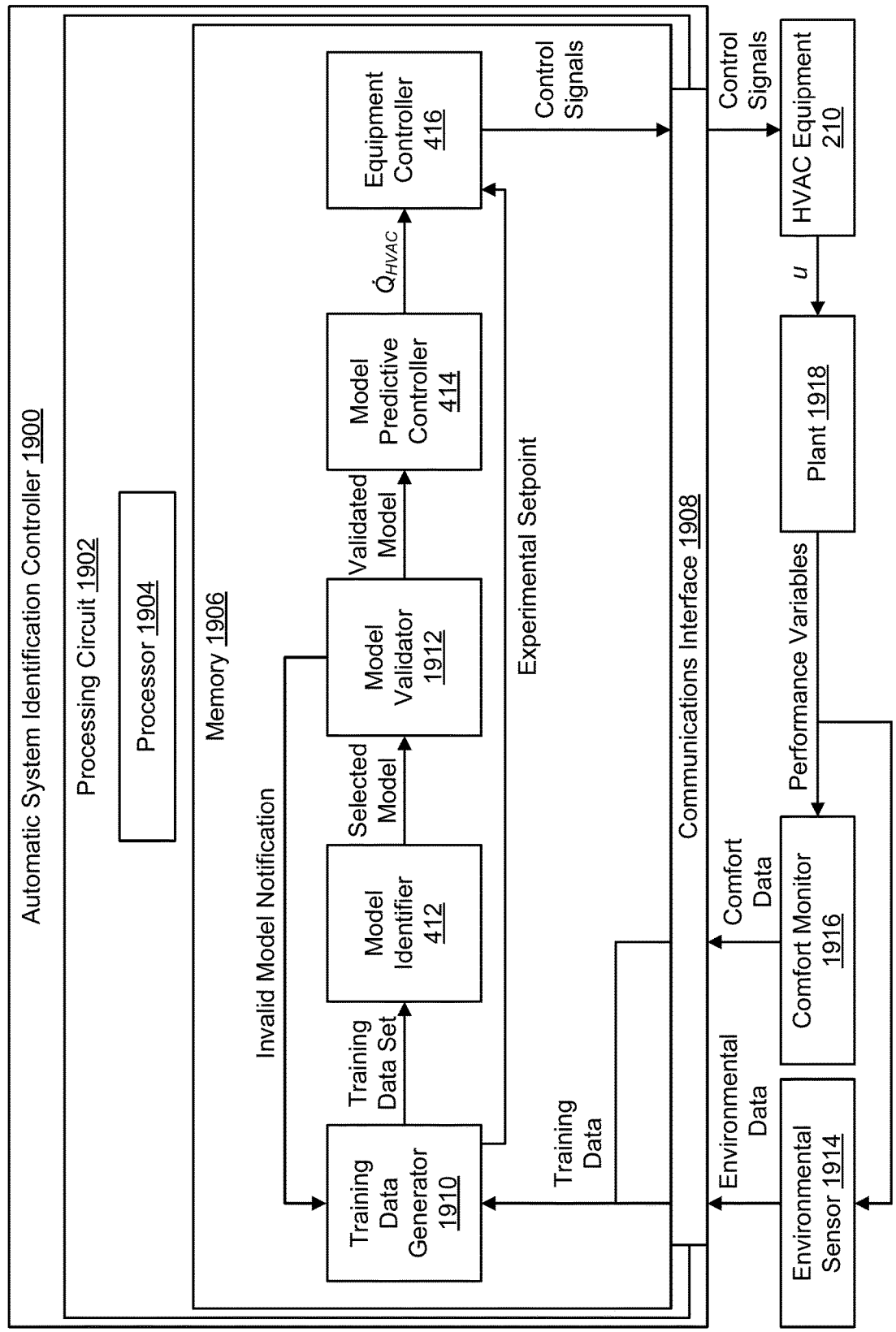
FIG. 19 is a block diagram of an automatic system identification controller, according to some embodiments.

Referring now to FIG. 19, an automatic system identification controller 1900 is shown, according to some embodiments. Automatic system identification controller 1900 can automate an SI process for generating new predictive models that can be utilized in MPC and/or other control frameworks. In some embodiments, automatic system identification controller 1900 is similar to and/or the same as controller 212 as described above with reference to FIGS. 2 and 4. As such, automatic system identification controller 1900 can include any of the functionality or components of controller 212 as shown by identical reference numbers.

Automatic system identification controller 1900 is shown to include a communications interface 1908 and a processing circuit 1902. Communications interface 1908 may include wired or wireless interfaces (e.g., jacks, antennas, transmitters, receivers, transceivers, wire terminals, etc.) for conducting data communications with various systems, devices, or networks. For example, communications interface 1908 may include an Ethernet card and port for sending and receiving data via an Ethernet-based communications network and/or a Wi-Fi transceiver for communicating via a wireless communications network. Communications interface 1908 may be configured to communicate via local area networks or wide area networks (e.g., the Internet, a building WAN, etc.) and may use a variety of communications protocols (e.g., BACnet, IP, LON, etc.).

Communications interface 1908 may be a network interface configured to facilitate electronic data communications between automatic system identification controller 1900 and various external systems or devices (e.g., an environmental sensor 1914, HVAC equipment 210, etc.). For example, automatic system identification controller 1900 may receive environmental data from environmental sensor 1914 indicating one or more environmental conditions (e.g., temperature, humidity, air quality, etc.) via communications interface 1908. In some embodiments, communications interface 1908 is configured to provide control signals to HVAC equipment 210.

Still referring to FIG. 19, processing circuit 1902 is shown to include a processor 1904 and memory 1906. Processor 1904 may be a general purpose or specific purpose processor, an application specific integrated circuit (ASIC), one or more field programmable gate arrays (FPGAs), a group of processing components, or other suitable processing components. Processor 1904 may be configured to execute computer code or instructions stored in memory 1906 or received from other computer readable media (e.g., CDROM, network storage, a remote server, etc.).

Memory 1906 may include one or more devices (e.g., memory units, memory devices, storage devices, etc.) for storing data and/or computer code for completing and/or facilitating the various processes described in the present disclosure. Memory 1906 may include random access memory (RAM), read-only memory (ROM), hard drive storage, temporary storage, non-volatile memory, flash memory, optical memory, or any other suitable memory for storing software objects and/or computer instructions. Memory 1906 may include database components, object code components, script components, or any other type of information structure for supporting the various activities and information structures described in the present disclosure. Memory 1906 may be communicably connected to processor 1904 via processing circuit 1902 and may include computer code for executing (e.g., by processor 1904) one or more processes described herein. In some embodiments, one or more components of memory 1906 are part of a singular component. However, each component of memory 1906 is shown independently for ease of explanation.

Memory 1906 is shown to include a training data generator 1910. In some embodiments, training data generator 1910 is similar to and/or the same as training data generator 408 as described above with reference to FIG. 4. In some embodiments, training data generator 1910 includes some and/or all of the functionality of training data database 410.

In some embodiments, training data generator 1910 automatically schedules an SI process. The SI process can be scheduled in response to a determination that a new/retrained predictive model is required. Said determination can occur based on, for example, no predictive model existing, an existing predictive model being determined to not be suitable for MPC, etc. The determination may be made based on other factors such as, for example, an occupancy schedule or weather forecasts. For example, if an occupancy schedule indicates a space has many meetings scheduled over a time period, performing the SI process prior to the meetings may ensure the predictive model is accurate for the time period. As another example, if a weather forecast indicates a large cold front is approaching, the SI process can be automatically scheduled prior to the cold front to ensure the predictive model is suitable for MPC when the cold front is present or nearby. In some embodiments, automatically scheduling the SI process is performed by another component of automatic system identification controller 1900 (e.g., model predictive controller 414, equipment controller 416, a separate scheduling component, etc.), an external controller/device, etc.

Training data generator 1910 is shown to receive environmental data from environmental sensor 1914 via communications interface 1908. Environmental sensor 1914 can include any sensor capable of measuring and communicating data regarding an environmental condition (e.g., temperature, humidity, air quality, lighting, etc.). For example, environmental sensor 1914 can include outdoor air temperature sensor 216 and/or indoor air temperature 214. As another example, environmental sensor 1914 can be an external weather service that communicates environmental data to automatic system identification controller 1900. In some embodiments, environmental sensor 1914 includes multiple environmental sensors 1914.

Training data generator 1910 is also shown to receive comfort data from a comfort monitor 1916 via communications interface 1908. Comfort monitor 1916 may be any device, sensor, controller, user input device, etc. that can obtain and communicate the comfort data. For example, comfort monitor 1916 can be a user device via which an occupant can rate their comfort, a visible light camera for monitoring occupants for one or more signs of occupant discomfort (e.g., shivering, using fans, etc.), or a thermostat via which occupants can adjust a current setpoint. In some embodiments, comfort monitor 1916 includes multiple comfort monitors 1916, each used to gather various comfort data. The comfort data can include indications of how comfortable an occupant is in a space of a building (e.g., zone 200). For example, the comfort data may include information describing occupant adjustments to a setpoint of the space. An occupant setpoint adjustment can indicate an occupant is uncomfortable given current environmental conditions of the space. For example, if an occupant increases a temperature setpoint of the space from 68° F. to 72° F., the occupant comfort data can include said increase indicating the temperature setpoint was too cold prior to the occupant setpoint adjustment.

In some embodiments, training data generator 1910 determines whether a suitable amount of training data is available for use in an SI process. If training data generator 1910 determines that not enough training data is available, training data generator 1910 can gather additional training data to use in the SI process. To gather the additional training data, training data generator 1910 can, for example, perform an experiment on a space of a building (e.g., zone 200) to gather more training data. An experiment can consist of training data generator 1910 determining an experimental setpoint (i.e., an experimental value of $\dot{Q}_{HVAC}$) to provide to equipment controller 416. The experimental setpoint can be determined by training data generator 1910 to gather additional training data for conditions that training data generator 1910 lacks information. For example, training data generator 1910 may perform experiments for all possible values of $\dot{Q}_{HVAC}$. As another example, training data generator 1910 may determine a particular number of values (e.g., 1, 2, 5, etc.) of $\dot{Q}_{HVAC}$ for which training data generator 1910 does not have associated data. Based on the experimental setpoints provided to equipment controller 416, equipment controller 416 can generate control signals to provide to HVAC equipment 210 (or other building equipment) via communications interface 1908. The control signals can be generated as to operate HVAC equipment 210 to affect a variable state or condition of the space. Based on operation of HVAC equipment 210, various dynamics (e.g., temperature dynamics) of the space can be excited. Based on excitation of the various dynamics, training data generator 1910 can collect additional training data as needed.

Equipment controller 416 can provide a step input, a ramp input, multiple step inputs, etc., to HVAC equipment 210. In some embodiments, equipment controller 416 generates a value of a manipulated variable u (e.g., a step input), generates control signals for HVAC equipment 210 to operate HVAC equipment 210 according to the value of the manipulated variable u and provides the control signals to HVAC equipment 210. Values of the manipulated variable u can be generated by equipment controller 416 based on experimental setpoints provided by training data generator 1910. In some embodiments, the control signals provided to HVAC equipment 210 excite a plant 1918 that includes HVAC equipment 210. The control signals can, for example, perturb a heat duty (i.e., an amount of energy transfer) of plant 1918 to excite one or more dynamics of a space of building 10. Plant 1918 may be/include any plants (e.g., a chiller plant, a steam plant, a heat plant, etc.), equipment, etc. to affect conditions of a building. Further, plant 1918 can include various building equipment to convert resources provided by various suppliers into those needed to affect conditions of the building. For example, plant 1918 can include a heating sub-plant to convert electricity into heat for the building. A dynamic response of plant 1918 to the manipulated variable u can be monitored and collected by automatic SI controller 1900. Automatic SI controller 1900 can receive values of a performance variable y or a set of performance variables (e.g., zone temperature) from environmental sensor 1914 and/or comfort monitor 1916 as the dynamic response of plant 1918.

In some embodiments, plant 1918 is affected by various external conditions in addition to changes caused by operation of HVAC equipment 210. Particular, plant 1918 can be affected by one or more disturbances beyond control of automatic system identification controller 1900. For example, plant 1918 may be affected by external weather conditions, heat generated by operation of electrical equipment (e.g., computers, phones, screens, etc.), body heat emitted by people, etc. The various disturbances affecting plant 1918 can be captured in the performance variables provided to environmental sensor 1914 and/or comfort monitor 1916 such that a predictive model can be generated to capture said disturbances that affect system dynamics.

In some embodiments, HVAC equipment 210 provides performance variables $y_{equipment}$ to environmental sensor 1914 and/or comfort monitor 1916. The performance variables $y_{equipment}$ can include various information regarding HVAC equipment 210 such as, for example, temperatures, relative humidity, fan commands, HVAC mode, etc. The performance variables $y_{equipment}$ can be used by automatic system identification controller 1900 to properly generate models.

If training data generator 1910 determines enough training data is available, training data generator 1910 can generate a training data set to provide to model identifier 412. The training data set can include information that training data generator 1910 determines to be applicable for an SI process. For example, the training data set may include all training data received during data gathering and experimentation (e.g., all values of the performance variable(s) y received due to excitation of plant 1918). However, training data generator 1910 limit an amount of training data included in the training data set. For instance, training data generator 1910 may determine certain indications of occupant comfort included in the comfort data are inaccurate and do not include the certain indications of occupant comfort in the training data set. For example, occupant comfort data indicating an occupant is comfortable in a space with a current temperature of 52° F. may be determined by training data generator 1910 to be inaccurate and can be discarded. In some embodiments, training data generator 1910 verifies or checks the received training data by applying a filter to the received training data. The filtered training data can be provided by training data generator 1910 to model identifier 412 as the training data set.

Based on the training data set, model identifier 412 can perform an SI process with the training data set to generate a predictive model. If executing the SI process, model identifier 412 can fit model parameters to one or more parameterized models. As discussed in greater detail above with reference to FIGS. 4 and 5, the model parameters can include the system matrices A, B, C, D to be included in the one or more parameterized models. Each parameterized model fitted with the model parameters can be referred to as a candidate model. The candidate models may include several linear state space time invariant models whereby an $i^{th}$ model has the following form:

$$\hat{x}(+1)=A(\theta_i)\hat{x}(k)+B(\theta_i)u(k)+K(\theta_i)(y(k)-\hat{y}(k))$$

$$\hat{y}(k)=C(\theta_i)\hat{x}(k)+D(\theta_i)u(k)$$

where $\theta_i$ is a vector containing all model parameters for the $i^{th}$ model. Based on all candidate models generated, model identifier 412 can select a candidate model expected to be most accurate. In some embodiments, the accuracy of candidate models can be determined based on outputs of each candidate model. For example, the outputs of each candidate model can be used to predict a response of plants to various inputs. In some embodiments, other metrics of each candidate model are determined to select a best fitting candidate model.

The selected model is shown to be provided by model identifier 412 to a model validator 1912. In some embodiments, model validator 1912 is a part of model identifier 412; however, model validator 1912 is shown separate from model identifier 412 for ease of explanation. Based on the selected model, model validator 1912 can determine if the selected model is suitable for use in MPC. To validate the selected model, model validator 1912 may utilize a validation data set to compare versus the selected model. In some embodiments, the validation data set is generated by training data generator 1910 and provided to model validator 1912. The validation data set, even if generated by training data generator 1910, may be different from the training data set provided to model identifier 412. The validation data set can be different from the training data set as using the training data set to validate the selected model may be redundant.

To validate the selected model, model validator 1912 can utilize the validation data set to determine if the selected model models system behavior similar to system behavior in normal operation. If model validator 1912 determines that the selected model adequately matches system behavior (i.e., model validator 1912 determines the selected model is valid), the selected model can be provided to model predictive controller 414 to utilize in performing MPC. If model validator 1912 determines that the selected model is not valid, model validator 1912 can adjust the selected model to make the selected model valid. However, if the selected model is invalid and cannot be sufficiently adjusted by model validator 1912, model validator 1912 can communicate an invalid model notification to training data generator 1910. The invalid model notification may be an indication that the selected model is not suitable for MPC and can be discarded. As the selected model is determined to be the most accurate model of the candidate models, the invalid model notification may also imply that all candidate models generated by model identifier 412 are similarly invalid.

Based on the invalid model notification, training data generator 1910 may determine that the training data set originally provided to model identifier 412 is inaccurate. As such, in response to receiving the invalid model notification, training data generator 1910 may determine that new training data should be collected. To collect the new training data, training data generator 1910 can gather new environmental data, new comfort data, conduct new experiments, provide new inputs to HVAC equipment 210 to excite plant 1918 (e.g., by perturbing a heat duty of plant 1918), monitor the dynamic response of plant 1918 over time, etc. In some embodiments, training data generator 1910 may utilize some and/or all of the original training data in combination with the new training data to include in a new training data set. As described, the invalid model notification may effectively indicate the SI process should be repeated as to attempt to generate new predictive models suitable for use in MPC. In some embodiments, the SI process repeats until a selected model generated by model identifier 412 is validated.

If model validator 1912 validates a selected model provided by model identifier 412, model validator 1912 can provide the validated model to model predictive controller 414. Based on the validated model, model predictive controller 414 can perform MPC for a space of a building (e.g., zone 200 of building 10). By utilizing the validated model, model predictive controller 414 can generate values of $\dot{Q}_{HVAC}$ to provide to equipment controller 416. As the validated model is expected to accurately match system dynamics (e.g., accurately models the dynamic response of plant 1918), values of $\dot{Q}_{HVAC}$ generated based on the validated model can be used to maintain occupant comfort in the space and optimize (e.g., reduce) costs related to operating building equipment (e.g., HVAC equipment 210) for the space. Model predictive controller 414 is described in greater detail above with reference to FIG. 4.

Based on received values of $\dot{Q}_{HVAC}$, equipment controller 416 can generate control signals to operate to HVAC equipment 210 (or other building equipment). In some embodiments, the control signals are generated for each device that equipment controller 416 determines should be operated to achieve a received value of $\dot{Q}_{HVAC}$. To operate the specific devices properly, one or more control signals may be provided to the specific devices indicating what operations the specific devices should perform. For example, if a desired temperature of the space should be 72° F. and a current temperature of the space is 70° F., a positive value of $\dot{Q}_{HVAC}$ may be determined indicating the current temperature is to be increased. Based on the positive value of $\dot{Q}_{HVAC}$, a heating device of HVAC equipment 210 may receive control signals indicating the heating device should operate to raise the current temperature of the space. As another example, if a current humidity level in the space should be between 45% humidity to 55% humidity (as determined by model predictive controller 414) and the current humidity level is 60% humidity, a negative value of $\dot{Q}_{HVAC}$ may be determined to lower the current humidity level. Based on the negative value of $\dot{Q}_{HVAC}$, a dehumidifier of HVAC equipment 210 may receive control signals to reduce the current humidity level. As described above, based on operation of HVAC equipment 210, a dynamic response of plant 1918 can be monitored and collected to be provided to automatic SI controller 1900. Automatic SI controller 1900 can receive values of a performance variable y or a set of performance variables (e.g., zone temperature) from environmental sensor 1914 and/or comfort monitor 1916 as the dynamic response of plant 1918. Said values can be used to generate/update additional predictive model as a current predictive model degrades in accuracy.

Figure 20A:
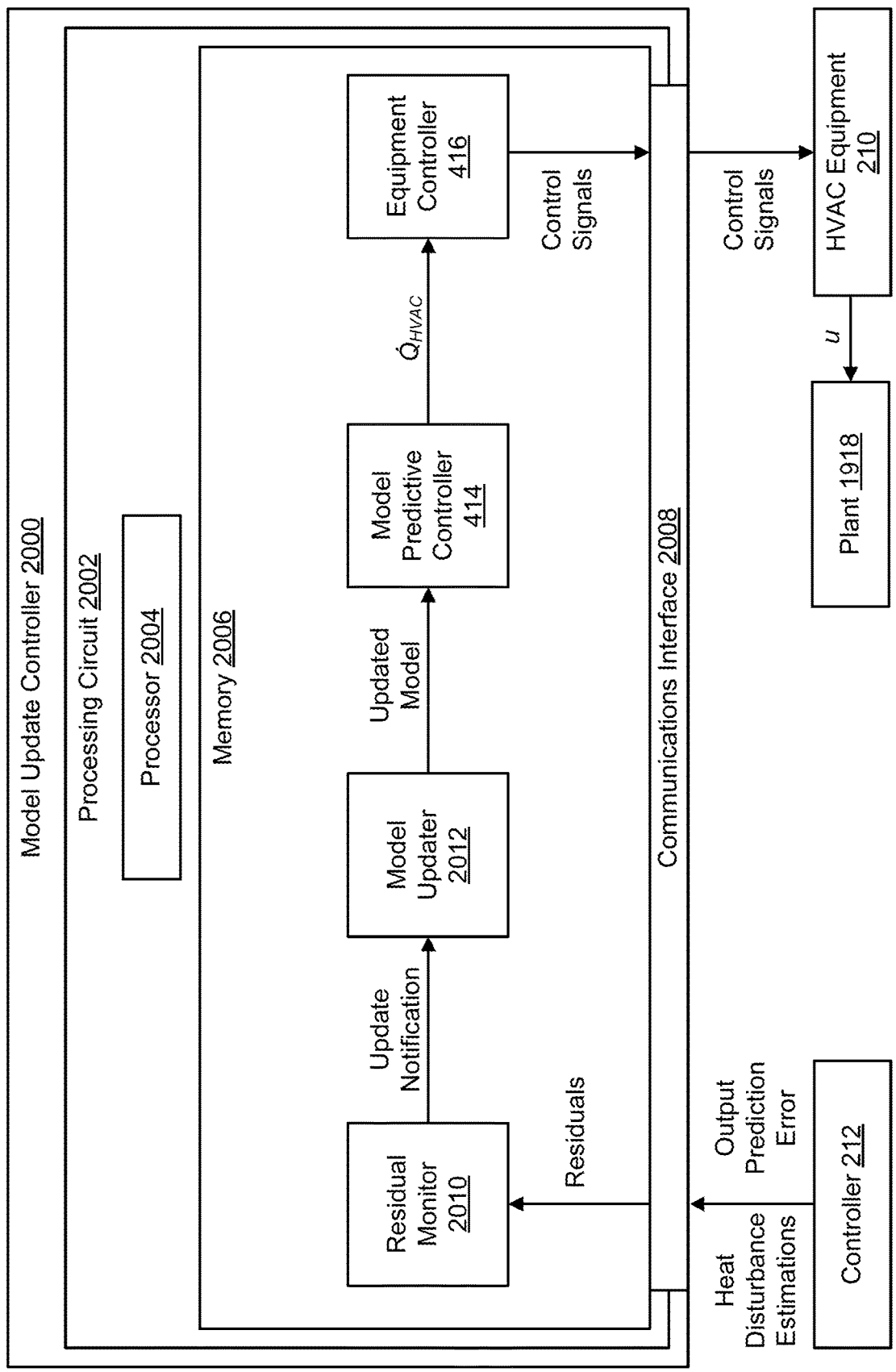
FIG. 20A is a block diagram of a model update controller including a residual monitor, according to some embodiments.

Referring now to FIG. 20A, a model update controller 2000 is shown, according to some embodiments. Model update controller 2000 can initiate a model update process for a model used in MPC. For example, model update controller 2000 may initiate a model update process on the validated model used by model predictive controller 414 as described with reference to FIG. 19. In some embodiments, components of model update controller 2000 may be similar to and/or the same as components of automatic system identification controller 1900 and/or controller 212. In some embodiments, some and/or all of the functionality of model update controller 2000 described below is included in automatic system identification controller 1900 and/or controller 212. In some embodiments, any of the functionality of model update controller 200 is included in automatic SI controller 1900 or vice versa.

Model update controller 2000 is shown to include a communications interface 2008. Communications interface 2008 may include wired or wireless interfaces (e.g., jacks, antennas, transmitters, receivers, transceivers, wire terminals, etc.) for conducting data communications with various systems, devices, or networks. For example, communications interface 2008 may include an Ethernet card and port for sending and receiving data via an Ethernet-based communications network and/or a Wi-Fi transceiver for communicating via a wireless communications network. Communications interface 2008 may be configured to communicate via local area networks or wide area networks (e.g., the Internet, a building WAN, etc.) and may use a variety of communications protocols (e.g., BACnet, IP, LON, etc.).

Communications interface 2008 may be a network interface configured to facilitate electronic data communications between model update controller 2000 and various external systems or devices (e.g., controller 212, HVAC equipment 210, etc.). For example, model update controller 2000 may receive heat disturbance estimations and multi-step ahead output prediction error from controller 212 via communications interface 2008. In some embodiments, communications interface 2008 is configured to provide control signals to HVAC equipment 210.

Still referring to FIG. 20A, processing circuit 2002 is shown to include a processor 2004 and memory 2006. Processor 2004 may be a general purpose or specific purpose processor, an application specific integrated circuit (ASIC), one or more field programmable gate arrays (FPGAs), a group of processing components, or other suitable processing components. Processor 2004 may be configured to execute computer code or instructions stored in memory 2006 or received from other computer readable media (e.g., CDROM, network storage, a remote server, etc.).

Memory 2006 may include one or more devices (e.g., memory units, memory devices, storage devices, etc.) for storing data and/or computer code for completing and/or facilitating the various processes described in the present disclosure. Memory 2006 may include random access memory (RAM), read-only memory (ROM), hard drive storage, temporary storage, non-volatile memory, flash memory, optical memory, or any other suitable memory for storing software objects and/or computer instructions. Memory 2006 may include database components, object code components, script components, or any other type of information structure for supporting the various activities and information structures described in the present disclosure. Memory 2006 may be communicably connected to processor 2004 via processing circuit 2002 and may include computer code for executing (e.g., by processor 2004) one or more processes described herein. In some embodiments, one or more components of memory 2006 are part of a singular component. However, each component of memory 2006 is shown independently for ease of explanation.

Memory 2006 is shown to include a residual monitor 2010. Residual monitor 2010 is shown to receive measurements from controller 212 including heat disturbance estimations and output prediction error. The measurements provided by controller 212 can be used by residual monitor 2010 to determine values of residuals. In some embodiments, a residual refers to a difference between an estimated heat load disturbance and a deterministically predicted heat load disturbance as described in greater detail below with reference to FIGS. 23-25. In some embodiments, a residual refers to a multi-step output prediction error as calculated using a function generated by prediction error function generator 430. Various statistical characteristics (e.g., variance, covariance, moving standard deviation, moving average, etc.) can be calculated based on values of the residuals to determine accuracy of MPC decisions. Calculation of statistical characteristics of residuals is described in greater detail below. In some embodiments, controller 212 provides more or less information to residual monitor 2010 than as shown in FIG. 20A. In some embodiments, residual monitor 2010 receives measurements from other devices, sensors, controllers, etc. in order to determine values of the residuals. Residual monitor 2010 can monitor values of residuals applicable in determining whether a predictive model is suitable for MPC. For example, residual monitor 2010 may monitor heat disturbance residuals and/or prediction error residuals based on inputs received form controller 212 to determine if the predictive model is suitable. However, it should be understood that residual monitor 2010 may monitor any residuals that can be used to determine whether the predictive model is suitable for use in MPC.

In some embodiments, residual monitor 2010 utilizes values of heat disturbance estimations to determine heat disturbance residuals. To determine the heat disturbance residuals, residual monitor 2010 can determine a difference between an estimated heat disturbance at a current time and a predicted heat disturbance for the current time. In some embodiments, the estimated heat disturbance is estimated based on a difference between a total temperature change since a previous time step and an estimated temperature change due to operation of building equipment. In other words, the estimated heat disturbance is based on a temperature change not due to operation of building equipment. For example, if operation of building equipment normally would result in an increase of 2° F. from a previous time step, but an actual temperature increase is 3° F., the estimated heat disturbance can be based on the additional 1° F. temperature increase. In some embodiments, the predicted heat disturbance is based on predicted values of a deterministic heat disturbance and a stochastic heat disturbance for the current time step. The deterministic heat disturbance and the stochastic heat disturbance can be calculated by controller 212 as described in greater detail below with reference to FIGS. 23-25. As conditions change in a zone (e.g., zone 200) over time, an accuracy of predictions made by a predictive model may degrade. If the accuracy of predictions degrades, statistical characteristics (e.g., a moving average, moving standard deviation, variance, etc.) of the heat disturbance residuals may change. If the statistical characteristics of the heat disturbance residuals exceed some statistical threshold as described in greater detail below, a model update can be triggered.

In some embodiments, residual monitor 2010 utilizes values of the multi-step ahead output prediction error to determine prediction error residuals. As described above, as conditions in the zone change over time, the predictive model may degrade. Based on degradation of the predictive model, statistical characteristics of the prediction error residuals may fluctuate. The multi-step ahead output prediction error used to determine the prediction error residuals is described in greater detail above.

Referring now to FIG. 20B residual monitor 2010 is shown in greater detail, according to some embodiments. Residual monitor 2010 as shown in FIG. 20B includes various components to monitor characteristics of residuals (e.g., heat disturbance residuals, prediction error residuals, etc.) to determine if a model update needs to occur. In some embodiments, if a single component indicates a characteristic of a residual exceeds some threshold value, a model update is triggered. In some embodiments, multiple components of residual monitor 2010 must indicate a characteristic of a residual exceeds some threshold value for a model update to be triggered. In some embodiments, residual monitor 2010 includes greater or fewer components than as shown in FIG. 20B. The components of residual monitor 2010 as shown in FIG. 20B are for illustrative purposes only.

Residual monitor 2010 is shown to include a variance monitor 2016 to monitor a variance of the residuals to determine the accuracy of the predictive model. To determine the variance of the residuals, variance monitor 2016 can utilize the following equation:

$$\sigma_i = \frac{\sum_{i=1}^{n}(x_i - \overline{x})^2}{n}$$

where $\sigma_i$ is the variance of the residuals, n is a total number of residuals gathered, $x_i$ is an $i^{th}$ residual, and $\overline{x}$ is a mean of all residuals. As the accuracy of the predictive model degrades, the variance of the residuals may increase. If the variance of the residuals exceeds a predetermined threshold value (e.g., 1.0, 2.4, 10.1, etc.), variance monitor 2016 can trigger a model update.

Residual monitor 2010 is also shown to include a prediction error monitor 2018 that can utilize multi-step ahead prediction errors to determine prediction error residuals. In some embodiments, results determined by prediction error monitor 2018 are utilized by other components of residual monitor 2010. A predictive model for a one-step-ahead prediction is given by the following:

$x(k+1|k)=A(\theta)x(k|k)+B(\theta)u(k)+K(\theta)(Cx(k|k-1)+Du(k)-y_m(k))$ $y(k)=C(\theta)x(k|k-1)+D(\theta)u(k)$ where $A(\theta)$, $B(\theta)$, $C(\theta)$, $D(\theta)$, and $K(\theta)$ are parameterized matrices as described above, $y_m(k)$ is a measured output for time step k, $x(k|k-1)$ is a predicted/estimated state at time step k computed using data up until time step k−1, and u(k) is a control input at time step k.

For multi-step ahead predictions (i.e., predictions greater than one-step), the Kalman correction term may be omitted. For example, a two-step ahead prediction can be given by the following:

$$y(k+1|k)=C(\theta)x(k+1|k)+D(\theta)u(k+1)$$

Likewise, a three-step ahead prediction can be given by further propagating the model. For example, the three-step ahead prediction can be given by the following:

$$x(k+2|k)=A(\theta)x(k+1|k)+B(\theta)u(k+1)$$

$$y(k+2|k)=C(\theta)x(k+2|k)+D(\theta)u(k+2)$$

Based on results of the multi-step (or one-step) ahead predictions, verification and/or validation metrics can be measured by a verification and validation metric monitor 2020 of residual monitor 2010. The above models may be required to adhere to parameter bounds set by the following:

$$\theta_{lb,i} \le \theta_i \le \theta_{ub,i}$$

where $\theta_{lb,i}$ and $\theta_{ub,i}$ are a lower bound and an upper bound of a vector $\theta_i$ for an $i^{th}$ model respectively. As described above, $\theta_i$ may include all model parameters for the $i^{th}$ model. By ensuring $\theta_i$ adheres to $\theta_{lb,i}$ and $\theta_{ub,i}$, an accurate multi-step (or single-step) ahead prediction can be made. Based on a determined value of $\theta_i$ and a calculated variance $\sigma_i$, a normalized parameter variance can be calculated and adhere to the following:

$$\frac{\sigma_i}{|\theta_i|} \le \overline{\sigma}_{ub,i}$$

where $$\frac{\sigma_i}{|\theta_i|}$$

is the normalized parameter variance and $\overline{\sigma}_{ub,i}$ is a normalized parameter variance upper bound. If the normalized parameter variance is determined to exceed $\overline{\sigma}_{ub,i}$, verification and validation metric monitor 2020 may initiate an update of the predictive model.

In some embodiments, a stability value monitor 2022 of residual monitor 2010 monitors a stability value of the predictions to determine whether the predictive model is still accurate. To determine if the predictions are still accurate, stability value monitor 2022 can determine whether the following conditions are adhered to:

$$|\lambda_i(A(\theta))|<1 \text{ and } |\lambda_i(A(\theta)-K(\theta)C(\theta))|<1$$

for all $i=1, \ldots, n_x$ where $\lambda_i$ is an eigenvalue. In some embodiments, stability value monitor 2022 checks to ensure that eigenvalues (i.e., $\lambda_i$) of A–KC are real values.

In some embodiments, an observability and controllability monitor 2024 of residual monitor 2010 determines whether an observability matrix and a controllability matrix are full rank. The observability matrix can act as a measure of how well internal states of the system identified by system identification can be inferred based on outputs. Similarly, the controllability matrix denotes an ability to move the system around in its entire configuration space using only certain admissible manipulations. If either the observability matrix and the controllability matrix are not full rank (i.e., each row and column of the matrix are linearly independent), observ-ability and controllability monitor 2024 may determine that the predictive model requires updating.

In some embodiments, a condition number monitor 2026 of residual monitor 2010 monitors a condition number of the predictive model to determine how much an output of the predictive model may change for a small change in input. As the condition number grows, condition number monitor 2026 may determine that the predictive model is less accurate. If the condition number exceeds a particular threshold value, condition number monitor 2026 may determine the predictive model should be updated. In particular, condition number monitor 2026 may determine whether the condition number adheres to the following bounds:

$$\kappa(A(\theta)) < A_{\kappa,max} \text{ and } \kappa(A(\theta)-K(\theta)C(\theta)) < AKC_{\kappa,max}$$

where $\kappa$ is the condition number. The condition number exceeding either of the above bounds may indicate that the predictive model may respond too drastically to small change in inputs. For example, if the condition number is too high, a small increase in solar radiation (i.e., a small increase in heat load) inputted to the predictive model may result in the predictive model estimating a large change in a temperature of a space.

In some embodiments, a validation metric monitor 2028 of residual monitor 2010 utilizes a multi-step quality of fit metric for determining an overall validation metric. The multi-step quality of fit metric can be defined by the following:

$$FitPercent_i(j) = 100\left(1 - \frac{\|y_{i,m} - y_{i,j}\|_2}{\|y_{i,m} - \overline{y}_{i,m}\|_2}\right)$$

for all $i=1, \ldots, n_y$ and all $j=1, \ldots, N_{pred}$ where $N_{pred} \ge 1$ is the predictive horizon, $y_{i,m}^T=[y_{i,m}(0), y_{i,m}(1), \ldots, y_{i,m}(N)]$ (i.e., a transpose of $y_{i,m}$) is a vector of all measurements of $i^{th}$ output, N is an amount of data that is collected, $\overline{y}_{i,m}$ is the mean over all elements in the vector $y_{i,m}$, and the vector $y_j$ contains the predicted output j steps into the future (i.e., $y_{i,j}^T=[y_i(j-1|-1), y_i(j|0), \ldots, y_i(N|N-j)]$). In some embodiments, the $j^{th}$-step ahead predictions at time step k (i.e., $y(k+j-1|k-1)$) are generated by recursively solving the predictive model above. As such, the one-step ahead model shown above can be initialized with an initial condition of $x(0|-1)=x_0(\theta)$ where $x_0(\theta)$ may be the one-step ahead prediction estimated by the system identification and/or some user-supplied guess of a current state of the system. However, for multi-step ahead predictions (i.e., predictions greater than one-step ahead), the Kalman correction term may be omitted as shown above.

Based on the multi-step quality of fit metric, the overall validation metric can be determined by validation metric monitor 2028. The overall validation metric can be given by the following:

$$OverallQualityOfFit = \sum_{i=1}^{n_y} \sum_{j=1}^{N_{pred}} v_i w_j FitPercent_i(j)$$

where $v_i$ and $w_j$ are weights. Values of $v_i$ can be determined such that $\sum_{i=1}^{n_y} v_i=1$, which may be chosen to emphasize a particular output error. In some embodiments, a default weight is $v_i=1/n_y$. Values of $w_j$ can be determined such that $\sum_{j=1}^{N_{pred}} w_j=1$ and where $w_j \ge w_{j+1}$ such that near term prediction errors are penalized more heavily than far term prediction errors. A determined value of OverallQualityOf Fit can indicate how accurate the predictive model is. In some embodiments, as a value of OverallQualityOf Fit grows, validation metric monitor 2028 determines that accuracy of the predictive model is increasing. As such, a small value of OverallQualityOf Fit may indicate the predictive model is inaccurate and may require updating.

Residual monitor 2010 is also shown to include an other statistic monitor 2030. Other statistic monitor 2030 can monitor any other statistics of any residuals to determine an accuracy of the predictive model. For example, other statistic monitor 2030 can monitor a moving average of the residuals and/or a standard deviation of the residuals. To determine the moving average of the residuals, other statistic monitor 2030 may, for example, monitor an average of residuals for the previous x time steps (i.e., 3 time steps, 4 time steps, 10 time steps, etc.). To determine the standard deviation of the residuals, other statistic monitor 2030 can utilize the following equation:

$$\text{Standard Deviation} = \sqrt{\frac{\sum_{i=1}^{n}(\text{residual}_i - \overline{\text{residual}})^2}{n-1}}$$

where $\text{residual}_i$ is a residual for a time step i, n is a total number of time steps, and residual is a mean of all residuals. If the standard deviation and/or the moving averages exceed some predetermined threshold, other statistic monitor 2030 can trigger an update of the predictive model. Other statistic monitor 2030 may also utilize control charts such as, for example, an exponential weighted moving average control chart in order to monitor and subsequently detect that the predictive model needs to be updated.

Referring again to FIG. 20A, based on a determination by residual monitor 2010 that the predictive model should be updated, residual monitor 2010 can communicate an update notification to a model updater 2012. In some embodiments, residual monitor 2010 can make a determination regarding how the predictive model is to be updated. If statistics of the residuals indicate the predictive model has deviated too far from being suitable for MPC, residual monitor 2010 may determine that a new predictive model should be generated as to ensure MPC can utilize an adequate predictive model. As described above, updating the predictive model may refer to retraining a current predictive model with new training data and/or generating a new predictive model. If the update notification provided to model updater 2012 indicates a new predictive model is to be generated, model updater 2012 can generate the new predictive model instead of retraining the current predictive model. In some embodiments, model updater 2012 includes some and/or all of the functionality of training data generator 1910, model identifier 412, and/or model validator 1912 in order to generate the new predictive model. In some embodiments, the new predictive model is generated by or by implementing the functionality of automatic system identification controller 1900 as described in greater detail above with reference to FIG. 19.

If the update notification provided to model updater 2012 indicates the current predictive model requires retraining, model updater 2012 can trigger a retraining process. Retraining the predictive model can account for changes in building 10, zone 200, occupant preferences, etc. Advantageously, by retraining the predictive model, the number of computationally intensive model generation processes can be reduced, thereby increasing efficiency of MPC.

To retrain the predictive model, model updater 2012 can receive new training data to reflect changes applicable to MPC. For example, model updater 2012 may receive new training data indicating information regarding new building equipment added to building 10. As another example, model updater 2012 may receive new training data indicating information regarding new occupant preferences that should be reflected when performing MPC to ensure occupant comfort is maintained. By retraining the predictive model based on the new training data, the predictive model can better reflect actual dynamics of a space. For example, if the predictive model is a neural network model, model updater 2012 may retrain the predictive model to change relationships between neurons of the predictive model. By changing relationships between neurons, the predictive model may be able to be used in MPC to generate more cost-optimal decisions that maintain occupant comfort. As another example, if the predictive model can be represented by a linear equation (e.g., in the form y=mx+b), model updater 2012 can update a value of the slope and/or a value of the offset to more accurately reflect the new training data.

Model updater 2012 can provide the updated predictive model to model predictive controller 414. In response to receiving the updated predictive model, model predictive controller 414 can replace a current predictive model with the updated predictive model. If the updated predictive model replaces the current predictive model, model predictive controller 414 can determine values of $\dot{Q}_{HVAC}$ based on or using the updated predictive model. As such, control signals determined by equipment controller 416 and provided to HVAC equipment 210 can reflect the updated predictive model. A dynamic response of plant 1918 to the manipulated variable u can occur in response to operation of HVAC equipment 210 as shown in greater detail below with reference to FIG. 21. In some embodiments, model update controller 2000 requires performance variables due to the dynamic response in order to update the predictive model. In some embodiments, controller 212 provides all information necessary for model update controller 2000 to update the predictive model.

In some embodiments, model predictive controller 414 discards a current predictive model if implementing an updated predictive model. In some embodiments, model predictive controller 414 stores the current predictive model temporarily/permanently. By storing predictive models, model predictive controller 414 can revert to a stored predictive model to base MPC decision on if a current predictive model becomes too inaccurate and a new/retrained predictive model is not received soon enough. As such, model predictive controller 414 may determine if a stored predictive model can provide more accurate MPC decisions over a current predictive model until a new predictive model is received. If the stored predictive model is determined to provide more accurate MPC decision, model predictive controller 414 can rely on the stored predictive model temporarily until model updater 2012 provides a newly updated predictive model.

Figure 21:
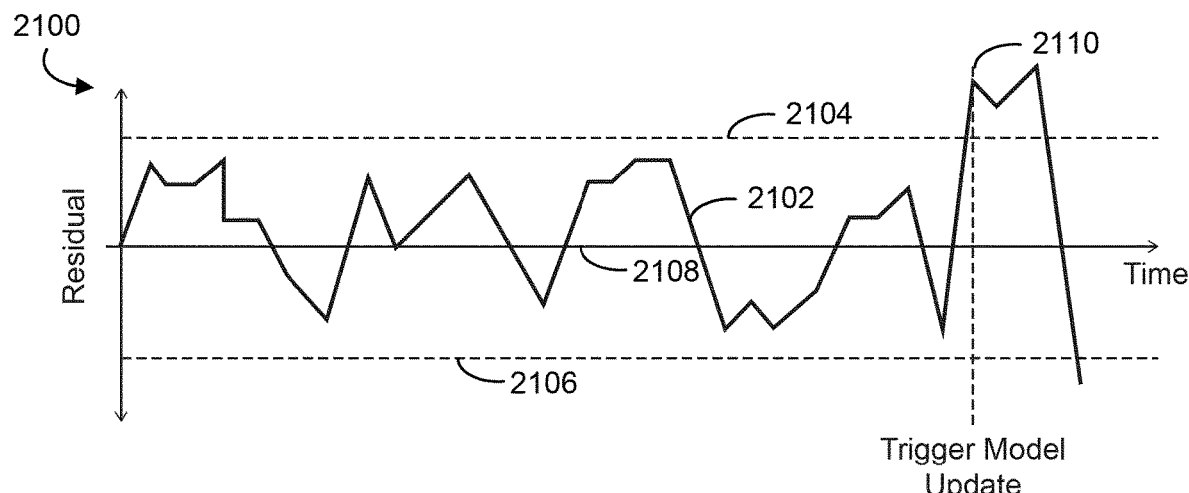
FIG. 21 is a graph illustrating when a predictive model is updated based on values of a residual over time, according to some embodiments.

Referring now to FIG. 21, a graph 2100 illustrating when a predictive model is updated based on values of a residual over time is shown, according to some embodiments. Graph 2100 is shown to include a series 2102 illustrating values of a residual over time. For example, series 2102 may represent values of multi-step ahead prediction error. As another example, series 2102 may represent values of heat disturbance residuals. Residual monitor 2010 can utilize series 2102 to determine whether a predictive model needs to be updated.

Graph 2100 is also shown to include an upper bound 2104 and a lower bound 2106.

Upper bound 2104 and lower bound 2106 can illustrate a maximum allowable residual threshold and a minimum allowable residual threshold for values of series 2102 respectively. Graph 2100 is also shown to include an ideal residual line 2108. Ideal residual line 2108 can indicate an ideal value (e.g., 0) of the residual indicated by series 2102. In some embodiments, upper bound 2104 and lower bound 2106 are equidistant from ideal residual line 2108. In some embodiments, upper bound 2104 and lower bound 2106 are not equidistant from ideal residual line 2108 depending on permissible values of the residual. For example, upper bound 2108 may be further from ideal residual line 2108 as compared to lower bound 2106 if large positive values of the residual are more permissible as compared to large negative values. For example, if series 2102 illustrates values of a heat disturbance residual, positive values of the heat disturbance residual (i.e., an estimated heat disturbance is larger than a predicted heat disturbance) may result in adequate decisions in MPC as compared to negative values of the heat disturbance residual. In any case, a model update can be triggered if series 2102 exceeds upper bound 2104 or lower bound 2106.

In graph 2100, series 2102 is shown to exceed upper bound 2104. After series 2102 exceeds upper bound 2104, a model update is triggered at a trigger time 2110 by residual monitor 2010. Trigger time 2110 is shown to occur slightly after series 2102 first exceeds upper bound 2104. In some embodiments, residual monitor 2010 does not immediately detect a value of the residual exceeds upper bound 2104 or lower bound 2106. For example, residual monitor 2010 may measure a value of the residual at certain time intervals (e.g., every 10 seconds, every minute, every hour, etc.). As such, residual monitor 2010 may trigger the model update after series 2102 occurs. In some embodiments, the model update is triggered as series 2102 exceeds upper bound 2104. For example, residual monitor 2010 may constantly monitor a value of the residual and immediately (or after a very short about of time) determine a model update is required.

In graph 2100, series 2102 is shown to move back within bounds set by upper bound 2104 and lower bound 2106 after the model update is triggered. Even though values of the residuals are temporarily admissible, residual monitor 2010 may nonetheless update the predictive model, as the predictive model may still be inaccurate.

Figure 22:
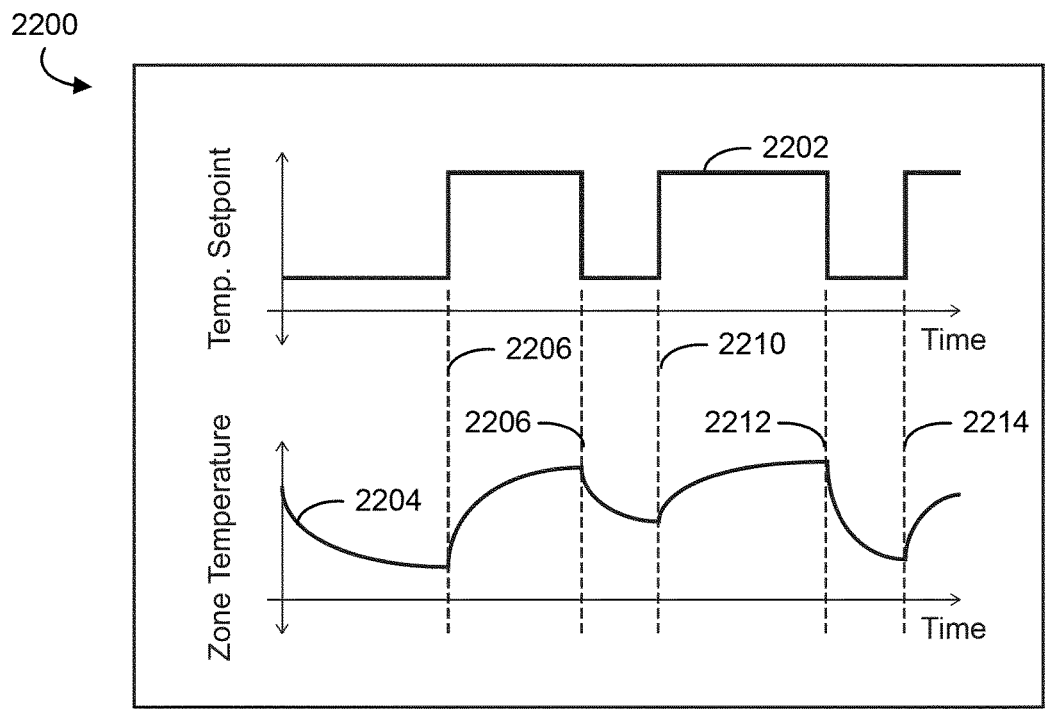
FIG. 22 is a graph illustrating a relationship between temperature setpoint values and a temperature of a zone over time, according to some embodiments.

Referring now to FIG. 22, a graph 2200 illustrating a relationship between a manipulated input variable u and performance variables y during an excitation experiment performed on a zone is shown, according to some embodiments. Graph 2200 is shown to include a series 2202 and a series 2204. Series 2202 can illustrate values of a manipulated input variable u over time as generated by equipment controller 416. Values of series 2202 are shown to change at times 2206-2214. In graph 2200, temperature setpoint values (i.e., values of the manipulated input variable u) are shown to be one of two values for ease of explanation. It should be understood that a temperature setpoint value determined by equipment controller 416 may be any value determined to maintain occupant comfort and optimize (e.g., reduce) costs.

Series 2204 can illustrate values of performance variables y over time due to changes in values of the manipulated input variable u. Series 2204 is shown to include inflection points at each time 2206-2214. At each time 2206-2214, values of series 2204 are shown to switch from decreasing to increasing or increasing to decreasing due to changes in series 2202. Actual temperature values of the zone (e.g., zone 200) indicated by series 2204 are shown to gradually increase/decrease as the actual temperature of the zone may take an amount of time to react to a change in the temperature setpoint. For example, after the first temperature setpoint increase shown in graph 2200, a heater of HVAC equipment 210 may be operated to increase a temperature in the zone. However, heated air produced by the heater may take an amount of time to raise the temperature in the zone to a particular value. As the temperature of the zone may not immediately reach a desired temperature based on building equipment (e.g., HVAC equipment 210), temperature setpoints indicated by series 2202 may need to be determined by accounting for a time delay to adjust the zone temperature.

Values of series 2202 and series 2204 can be utilized as training data for generating a predictive model. Particularly, the predictive model can be generated based on how changes in values of the manipulated variable u affect performance variables y including temperature of the zone. The relationship between 2202 and series 2204 can ensure the predictive model accurately captures system dynamics regarding how operation of building equipment (e.g., HVAC equipment 210) is expected to affect conditions of the zone.

Processes for Estimating a Heat Load Disturbance

Figure 23:
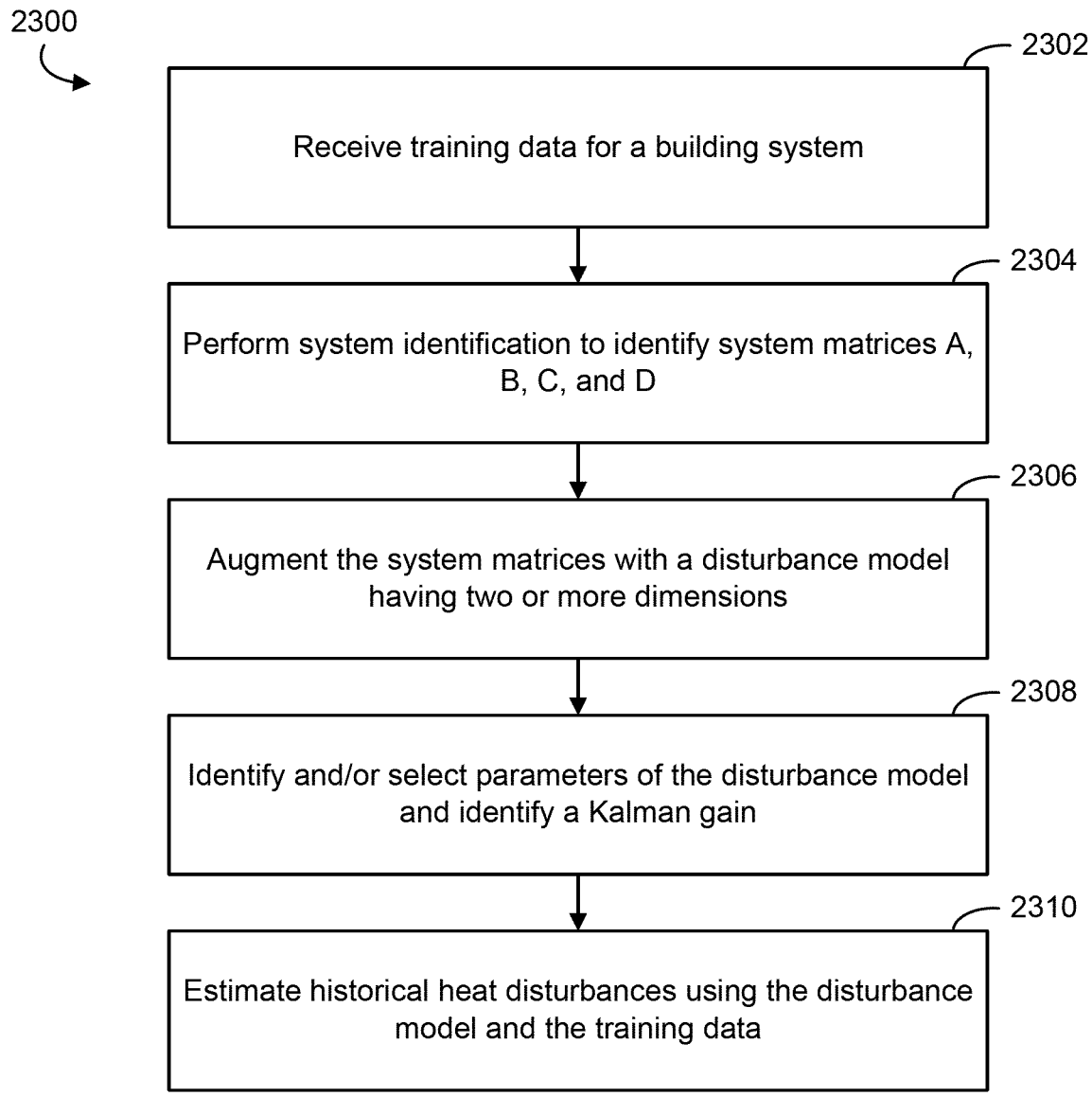
FIG. 23 is a flow diagram of a process for estimating historical heat disturbance, according to some embodiments.
Figure 24:
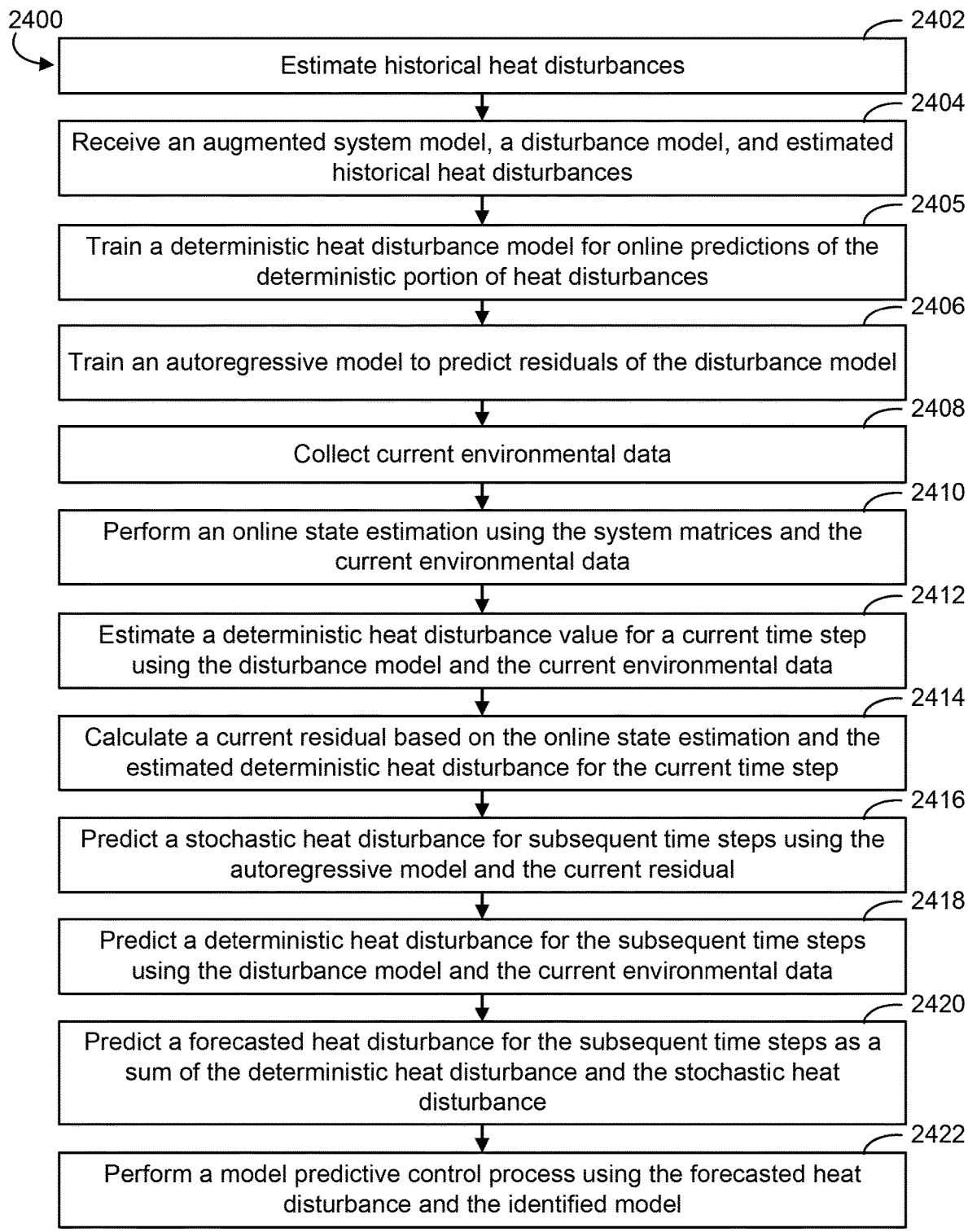
FIG. 24 is a flow diagram of a process for predicting a forecasted heat disturbance and performing model predictive control based on the forecasted heat disturbance, according to some embodiments.
Figure 25:
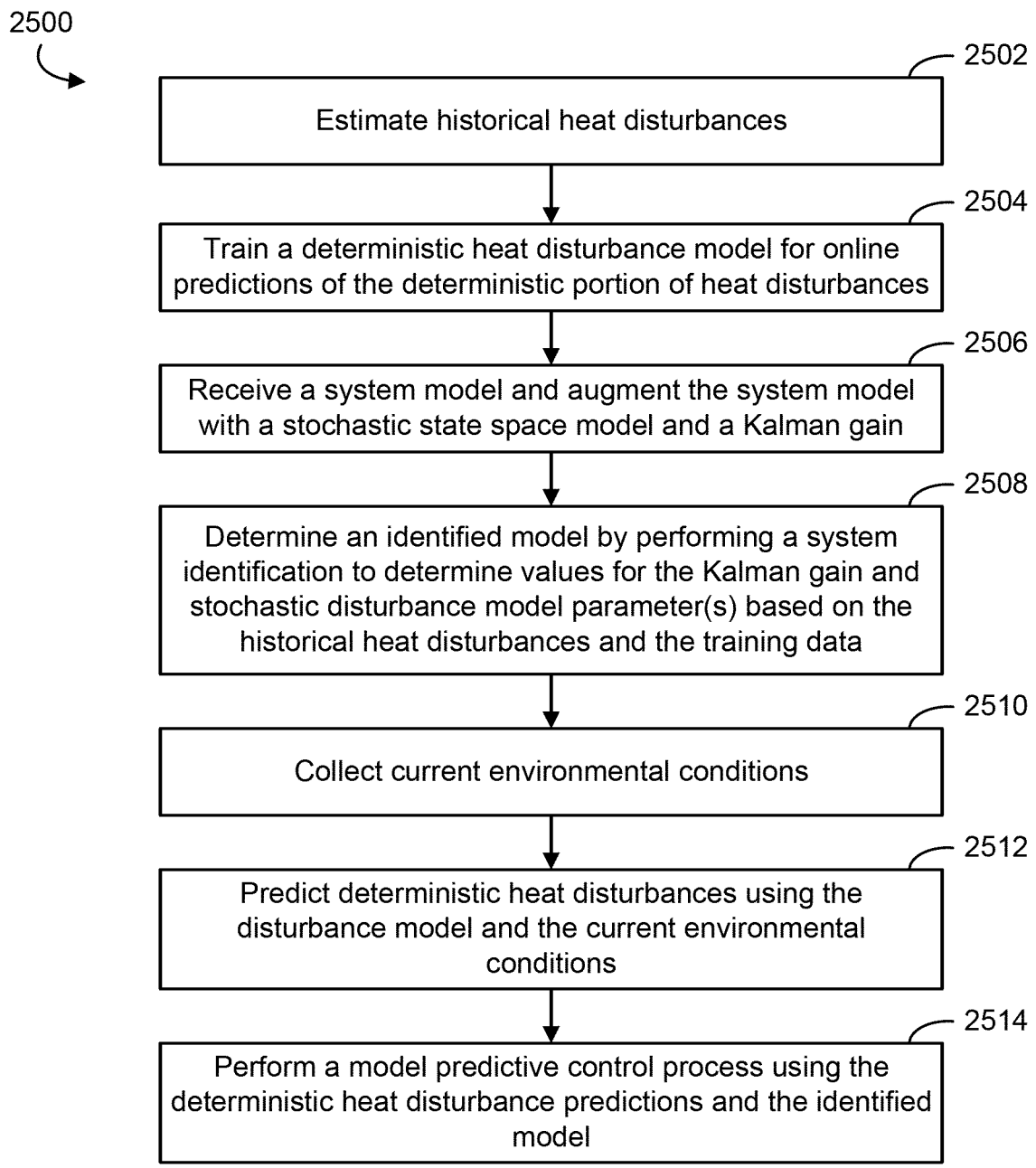
FIG. 25 is a flow diagram of a process for determining a deterministic heat disturbance and performing a model predictive control process based on the deterministic heat disturbance, according to some embodiments.

Referring generally to FIGS. 23-25, methods for estimating heat disturbance $Q_{other}$ are shown, according to some embodiments. Heat disturbance refers to heat in a building (or any space) that originates from sources beyond measurement and/or control of an environmental control system of the building. For example, heat disturbance may result from sunlight, heat radiating from electrical equipment, body heat radiation, etc. Accurately estimating heat disturbance can increase accuracy of estimations made during a model predictive control process. Without estimations of heat disturbance, a significant source of heat in a building may go unaccounted for, thus reducing accuracy of model predictive control and increasing energy usage and/or occupant discomfort.

As explained in greater detail below, heat disturbance can be modeled as a summation of a deterministic heat disturbance prediction and a stochastic heat disturbance prediction. The deterministic heat disturbance can describe a piece of a total heat disturbance that can be determined based on parameter values and initial conditions of a heat disturbance estimation problem. In some embodiments, the deterministic heat disturbance is calculated using a process for estimating deterministic load as described in U.S. patent application Ser. No. 14/717,593 filed May 20, 2015, incorporated by reference herein in its entirety. However, determining the stochastic heat disturbance, a piece of the total heat disturbance that describes some inherent randomness of the heat disturbance, can be difficult to calculate.

In some embodiments, the deterministic heat disturbance model is obtained using a pattern recognition and linear regression strategy as described in U.S. patent application Ser. No. 14/717,593 filed May 20, 2015, incorporated by reference herein in its entirety. In some embodiments, the stochastic heat disturbance model is obtained through identification of an autoregressive (AR) model separate from a system state space model used in model predictive control (MPC). In some embodiments, the stochastic heat disturbance model is obtained through identification of a model that is part of an overall state space model used in estimation and prediction during an MPC process.

Referring now to FIG. 23, a process 2300 for estimating historical heat disturbance is shown, according to some embodiments. By estimating historical heat disturbance based on prior data, a model can be trained to predict current and future heat disturbances for use in performing model predictive control. The historical heat disturbance can be used to train a model for determining how heat disturbance affects a space (e.g., a zone in a building). In some embodiments, some and/or all steps of process 2300 are performed by controller 212 described with reference to FIG. 2.

Process 2300 is shown to include receiving training data for a building system (step 2302), according to some embodiments. The training data for the building system may describe measurements of various environmental information taken at previous time steps and control inputs of the system, for example as described above with reference to training data generator 408 and training data database 410. For example, the measurements may include information such as building temperature measurements, building humidity measurements, occupancy measurements, electrical usage measurements, time of day, day of week, external weather conditions, etc. As heat disturbance can originate from many sources, large amounts of training data may be necessary to properly estimate historical heat disturbance. In some embodiments, the training data received in step 2302 includes time-series data. Time-series data can further indicate how heat disturbance changes over time. For example, in the middle of a day when occupants are present in the building system, a higher heat disturbance due to thermal radiation of people may be present than in the middle of the night when fewer occupants are present. In some embodiments, the training data is refined using a saturation detection and removal process. System and methods for saturation detection and removal suitable for use to refine the training data are described in U.S. patent application Ser. No. 15/900,459, filed Feb. 20, 2018, incorporated by reference herein in its entirety. In some embodiments, step 2302 is performed by controller 212.

Process 2300 is shown to include performing system identification to identify system matrices A, B, C, and D (step 2304), according to some embodiments. Based on the system matrices A, B, C, and D, a system model determined via the system identification can be used when estimating heat disturbance. In some embodiments, the system identification performed in step 2304 to identify the system model is similar to and/or the same as the system identification process as described in U.S. patent application Ser. No. 16/240,028, filed Jan. 4, 2019, incorporated by reference herein in its entirety. By identifying the system matrices, a system model can be captured to be used in determining heat disturbance. In general, the system matrices describe dynamics of the system. In step 2304, the system model identified can illustrate dynamics (e.g., thermal dynamics) of the building system based on the training data. In some embodiments, step 2304 is similar to and/or the same as process 600 described with reference to FIG. 6. In some embodiments, step 2304 is performed by controller 212.

Process 2300 is shown to include augmenting the system matrices with a disturbance model having two or more dimensions (step 2306), according to some embodiments. In general, an augmented system of the system identified in step 2304 is given by the following state space representation:

$$\begin{bmatrix} \dot{x}(t) \\ \dot{d}(t) \end{bmatrix} = \begin{bmatrix} A_c & B_d \\ 0 & A_d \end{bmatrix} \begin{bmatrix} x(t) \\ d(t) \end{bmatrix} + \begin{bmatrix} B_c \\ B_{dd} \end{bmatrix} u(t); \quad \text{(Eq. N)}$$

$$y(t) = [C_c \ C_d] \begin{bmatrix} x(t) \\ d(t) \end{bmatrix} + D_c u(t); \quad \text{(Eq. O)}$$

where $A_d$, $B_d$, $B_{dd}$, and $C_d$ are matrices characterizing the disturbance model and the parameters $A_c$, $B_c$, $C_c$, and $D_c$ are the matrices A, B, C, D identified in step 2304. In some embodiments, the disturbance model is a parameterized model such that the parameterized model can generate accurate models of heat disturbance over repeated usages of the model given various parameters.

In some embodiments, the disturbance model is determined based on a known higher order disturbance model. The disturbance model is described in greater detail in Eq. T and Eq. U below with reference to step 2308. If the disturbance model is determined based on a known higher order disturbance model, an augmented system of the system identified in step 2304 may have the following form:

$$\begin{bmatrix} \dot{T}_{ia} \\ \dot{T}_m \\ \dot{I} \\ \dot{d}_1 \\ \dot{d}_2 \end{bmatrix} = \begin{bmatrix} \frac{1}{C_{ia}}\left(-K_p - \frac{1}{R_{mi}} - \frac{1}{R_{oi}}\right) & \frac{1}{C_{ia}R_{mi}} & \frac{K_I}{C_{ia}} & \frac{1}{C_{ia}} & 0 \\ \frac{1}{C_m R_{mi}} & -\frac{1}{C_m R_{mi}} & 0 & 0 & 0 \\ -1 & 0 & 0 & 0 & 0 \\ 0 & 0 & 0 & 0 & 1 \\ 0 & 0 & 0 & -w^2 & -2\gamma \end{bmatrix} \quad \text{(Eq. P)}$$

$$\begin{bmatrix} T_{ia} \\ T_m \\ I \\ d_1 \\ d_2 \end{bmatrix} + \begin{bmatrix} \frac{K_p}{C_{ia}} & \frac{1}{C_{ia}R_{oi}} \\ 0 & 0 \\ 1 & 0 \\ & B_{dd} & \end{bmatrix} \begin{bmatrix} T_{sp} \\ T_{oa} \end{bmatrix};$$

$$\begin{bmatrix} T_{ia} \\ \dot{Q}_{HVAC} \end{bmatrix} = \begin{bmatrix} 1 & 0 & 0 & 0 & 0 \\ -K_p & 0 & K_I & 0 & 0 \end{bmatrix} \begin{bmatrix} T_{ia} \\ T_m \\ I \\ d_1 \\ d_2 \end{bmatrix} + \begin{bmatrix} 0 & 0 \\ K_p & 0 \end{bmatrix} \begin{bmatrix} T_{sp} \\ T_{oa} \end{bmatrix}; \quad \text{(Eq. Q)}$$

where $d_1$ is a disturbance state that can estimate (or calculate) values of heat disturbance, $d_2$ is a disturbance state that can estimate (or calculate) a rate of change in values of the heat disturbance, w is a frequency tuning parameter, y is a damping tuning parameter, $B_{dd}$ is a matrix mapping a forcing input, $T_{sp}$ is an indoor air temperature setpoint, and $T_{oa}$ is an outdoor air temperature, and all other variables are defined as in Eq. E and Eq. F above. In the above augmented system, $d_1$ includes the entirety of $\dot{Q}_{other}$ such that $\dot{Q}_{other}$ is not explicitly identified in the augmented system. As such, if $d_1$ is identified, $\dot{Q}_{other}$ may inherently be identified as well. Similarly, if the disturbance model is determined based on the identified disturbance model, the system identified in step 2304 may have the following form:

$$\begin{bmatrix} \dot{T}_{ia} \\ \dot{T}_m \\ \dot{I} \\ \dot{d}_1 \\ \dot{d}_2 \end{bmatrix} = \begin{bmatrix} \frac{1}{C_{ia}}\left(-K_p - \frac{1}{R_{mi}} - \frac{1}{R_{oi}}\right) & \frac{1}{C_{ia}R_{mi}} & \frac{K_I}{C_{ia}} & \frac{1}{C_{ia}} & 0 \\ \frac{1}{C_m R_{mi}} & -\frac{1}{C_m R_{mi}} & 0 & 0 & 0 \\ -1 & 0 & 0 & 0 & 0 \\ 0 & 0 & 0 & \theta_1 & \theta_2 \\ 0 & 0 & 0 & \theta_3 & \theta_4 \end{bmatrix} \quad \text{(Eq. R)}$$

$$\begin{bmatrix} \dot{T}_{ia} \\ \dot{T}_m \\ \dot{I} \\ \dot{d}_1 \\ \dot{d}_2 \end{bmatrix} + \begin{bmatrix} \frac{K_p}{C_{ia}} & \frac{1}{C_{ia}R_{oi}} \\ 0 & 0 \\ 1 & 0 \\ \theta_5 & \theta_6 \\ \theta_7 & \theta_8 \end{bmatrix} \begin{bmatrix} T_{sp} \\ T_{oa} \end{bmatrix};$$

$$\begin{bmatrix} T_{ia} \\ \dot{Q}_{HVAC} \end{bmatrix} = \begin{bmatrix} 1 & 0 & 0 & 0 & 0 \\ -K_p & 0 & K_I & 0 & 0 \end{bmatrix} \begin{bmatrix} T_{ia} \\ T_m \\ I \\ d_1 \\ d_2 \end{bmatrix} + \begin{bmatrix} 0 & 0 \\ K_p & 0 \end{bmatrix} \begin{bmatrix} T_{sp} \\ T_{oa} \end{bmatrix}; \quad \text{(Eq. S)}$$

where $\theta_1$ through $\theta_8$ are parameters that can be identified or set to a prospected value, and all other variables being the same as above. In general, the augmented system model can be used for determining historic heat disturbances. In some embodiments, step 2306 is performed by controller 212.

Process 2300 is shown to include identifying and/or selecting parameters of the disturbance model and identifying a Kalman gain (step 2308), according to some embodiments. In some embodiments, the parameters are determined using a known higher order disturbance model. Using the known higher order disturbance model, a rate of change in estimated historical heat disturbance values can be captured. Further, periodic heat disturbances can be represented using the known higher order disturbance model. For example, solar irradiance may follow a periodic schedule with a peak around noon each day. In some embodiments, the known higher order disturbance model is a second order disturbance model of an oscillator system having two states, $d_1$ and $d_2$, where $d_1$ can estimate (or calculate) values of heat disturbance and $d_2$ can estimate (or calculate) a rate of change in values of the heat disturbance. In general, the oscillator system may have the following form:

$$\begin{bmatrix} \dot{d}_1(t) \\ \dot{d}_2(t) \end{bmatrix} = A_d \begin{bmatrix} d_1(t) \\ d_2(t) \end{bmatrix} + B_{dd} u(t) = \begin{bmatrix} 0 & 1 \\ -w^2 & -2\gamma \end{bmatrix} \begin{bmatrix} d_1(t) \\ d_2(t) \end{bmatrix} + B_{dd} \begin{bmatrix} T_{sp} \\ T_{oa} \end{bmatrix}; \quad \text{(Eq. T)}$$

or compactly as:

$$\begin{bmatrix} \dot{d}_1 \\ \dot{d}_2 \end{bmatrix} = A_d \begin{bmatrix} d_1 \\ d_2 \end{bmatrix} + B_{dd} u = \begin{bmatrix} 0 & 1 \\ -w^2 & -2\gamma \end{bmatrix} \begin{bmatrix} d_1 \\ d_2 \end{bmatrix} + B_{dd} \begin{bmatrix} T_{sp} \\ T_{oa} \end{bmatrix}; \quad \text{(Eq. T)}$$

where w is a frequency tuning parameter, $\gamma$ is a damping tuning parameter, $B_{dd}$ is a matrix mapping a forcing input, $T_{sp}$ is an indoor air temperature setpoint, and $T_{oa}$ is an outdoor air temperature. For example, the values of w and y can be selected to provide a user-selected period or frequency for the oscillator system, for example a period of one day that reflects oscillations in solar irradiance as described above. As such, the tuning parameters can be set to $$w = \frac{2\pi}{24 \times 3600}, \gamma = 0,$$

and the matrix that maps the forcing input $B_{dd}$ can be set to zeroes (i.e., $$\left(\text{i.e., } B_{dd} = \begin{bmatrix} 0 & 0 \\ 0 & 0 \end{bmatrix}\right).$$

In this example, a pure oscillator system with zero damping and a frequency corresponding to a one-day period is achieved.

In some embodiments, the disturbance model is determined via a system identification using the training data received in step 2302. Similar to using the known higher order disturbance model, two disturbance states, $d_1$ and $d_2$, represent values of heat disturbance and a rate of change in the values of the heat disturbance respectively. In general, the disturbance model determined via system identification has the following form:

$$\begin{bmatrix} \dot{d}_1(t) \\ \dot{d}_2(t) \end{bmatrix} = A_d \begin{bmatrix} d_1(t) \\ d_2(t) \end{bmatrix} + B_{dd} u(t) = \begin{bmatrix} \theta_1 & \theta_2 \\ \theta_3 & \theta_4 \end{bmatrix} \begin{bmatrix} d_1(t) \\ d_2(t) \end{bmatrix} + \begin{bmatrix} \theta_5 & \theta_6 \\ \theta_7 & \theta_8 \end{bmatrix} \begin{bmatrix} T_{sp} \\ T_{oa} \end{bmatrix}; \quad \text{(Eq. U)}$$

or compactly as:

$$\begin{bmatrix} \dot{d}_1 \\ \dot{d}_2 \end{bmatrix} = A_d \begin{bmatrix} d_1 \\ d_2 \end{bmatrix} + B_{dd} u = \begin{bmatrix} \theta_1 & \theta_2 \\ \theta_3 & \theta_4 \end{bmatrix} \begin{bmatrix} d_1 \\ d_2 \end{bmatrix} + \begin{bmatrix} \theta_5 & \theta_6 \\ \theta_7 & \theta_8 \end{bmatrix} \begin{bmatrix} T_{sp} \\ T_{oa} \end{bmatrix}; \quad \text{(Eq. U)}$$

where $\theta_1$ through $\theta_8$ are parameters that can be identified or set to a prospected value, and all other variables being the same as above. During step 2308, a Kalman gain for the augmented system is determined (or identified). The Kalman gain and the augmented system matrices can be used together to estimate historical heat disturbance values. In some embodiments, step 2308 is performed by controller 212.

Process 2300 is shown to include estimating historical heat disturbances using the disturbance model and the training data (step 2310), according to some embodiments. To estimate the historical heat disturbance, the disturbance model including the augmented system matrices as well as the Kalman gain can use the training data as input. In general, accuracy of the estimated historical heat disturbance hinges on accuracy of the system identification in step 2304 and parameters of the disturbance model identified/selected in step 2308. Accordingly, one result of process 2300 is a set of estimated historical heat disturbance values that includes a heat disturbance value for a plurality of time steps for which training data is available. In some embodiments, step 2310 is performed by controller 212.

Referring now to FIG. 24, a process 2400 for predicting a forecasted heat disturbance $\hat{Q}_{other_{forecast}}$ and performing model predictive control based on the forecasted heat disturbance is shown, according to some embodiments. Process 2400 uses an autoregressive (AR) model to model a stochastic heat disturbance. In some embodiments, the AR model is used online (i.e., while the system is operating) to correct predictions of a deterministic heat disturbance by accounting for residuals (i.e., prediction errors), thereby predicting the stochastic heat disturbance of $Q_{other}$. In some embodiments, some and/or all steps of process 2400 are performed by controller 212.

Process 2400 is shown to include estimating historical heat disturbance (step 2402), according to some embodiments. In some embodiments, step 2402 is accomplished by performing process 2300 described with reference to FIG. 23. Process 2400 may require the system matrices, the disturbance model, the Kalman gain, and the estimated historic heat disturbance as determined in process 2300 to estimate $\hat{Q}_{other_{forecast}}$. In some embodiments, step 2402 is performed by controller 212.

Process 2400 is shown to include receiving an augmented system model, a disturbance model, and estimated historical heat disturbances (step 2404), according to some embodiments. In general, the disturbance model and the estimated historical heat disturbances are as determined in step 2402. In some embodiments, step 2404 is performed by controller 212.

Process 2400 is shown to include training a deterministic heat disturbance model for online predictions of the deterministic portion of heat disturbances (step 2405), according to some embodiments. In some embodiments, the deterministic heat disturbance model uses a linear regression and data fitting and/or pattern recognition to estimate the deterministic heat disturbance value similar to and/or the same as a deterministic load as described in U.S. patent application Ser. No. 14/717,593 filed May 20, 2015, incorporated by reference herein in its entirety. The disturbance model can be trained using the training data of process 2300 and the estimated historical heat disturbance so that the disturbance model can properly estimate deterministic heat disturbance values based on environmental conditions, a time of day, a day of the week, etc. In some embodiments, step 2405 is performed by controller 212.

Process 2400 is shown to include training an autoregressive (AR) model to predict residuals of the disturbance model (step 2406), according to some embodiments. In some embodiments, the AR model is trained using the estimated historical heat disturbances gathered in step 2402. In some embodiments, the AR model is a first order model that captures the stochastic part of the heat disturbance $Q_{other}$. In some embodiments, the AR model is a higher order model. The AR model can be determined off-line and may not be part of a state space model used during a model predictive control process. In general, a first order AR model can have the following form:

$$\hat{e}(k+1) = a_1 e(k) \qquad (Eq.\ V);$$

where $$e(k) = Q_{other_{measured}}(k) - \hat{Q}_{other_{deterministic}}(k)$$

where k is a time step, $\hat{e}(k+1)$ is a residual for a next time step, $a_1$ is a constant, $Q_{other_{measured}}(k)$ is measurement of the heat disturbance for time step k, and $\hat{Q}_{other_{deterministic}}(k)$ is the deterministic heat disturbance for time step k. As $Q_{other_{measured}}(k)$ cannot be directly obtained, $Q_{other_{measured}}(k) = d_1(k)$ as estimated in Eq. P and Eq. R. As a result, a residual can be determined for a current time step and estimated for future time steps by the AR model. In some embodiments, the AR model trained to predict residuals is similar to and/or the same as an autoregressive model to predict residuals as described in U.S. patent application Ser. No. 14/717,593, filed Nov. 5, 2015, incorporated by reference herein in its entirety. In some embodiments, step 2406 is performed by controller 212.

Process 2400 is shown to include collecting current environmental data (step 2408), according to some embodiments. The current environmental data can include, for example, temperature measurements, humidity measurements, external weather conditions, air quality, etc. The current environmental data can be collected by various sensors in a building, a weather service, and/or any device/system capable of collecting and communicating environmental data to controller 212. For example, temperature sensor 214 and temperature sensor 216 may collect and communicate an indoor air temperature and an outdoor air temperature to controller 212 respectively. The current environmental data may also include information that can result in a heat disturbance such as, for example, occupancy in a building, current electrical consumption, time of day, etc. In some embodiments, step 2408 is performed by controller 212 and various devices/services capable of collecting and communicating environmental data (e.g., temperature sensor 214).

Process 2400 is shown to include performing an online state estimation using the system matrices and the current environmental data (step 2410), according to some embodiments. In step 2410, the five state model described in Eq. P and Eq. R can be converted to discrete time. Further, a state estimation can be conducted using the Kalman gain identified for the model. For each time step k, a state vector of the following form can be calculated:

$$\begin{bmatrix} T_{ia}(K) \\ T_m(k) \\ I(k) \\ d_1(k) \\ d_2(k) \end{bmatrix}$$

where all variables are the same as described in Eq. P and Eq. R for each time step k. In some embodiments, step 2410 is performed by controller 212.

Process 2400 is shown to include estimating a deterministic heat disturbance value for a current time step using the disturbance model and the current environmental data (step 2412), according to some embodiments. Specifically, the current environmental data can be applied to the disturbance model to obtain the estimation of the deterministic heat disturbance value. In some embodiments, step 2412 is performed by controller 212.

Process 2400 is shown to include calculating a current residual based on the online state estimation and the estimated deterministic heat disturbance for the current time step (step 2414), according to some embodiments. In general, the current residual can be calculated by the following equation:

$$e(k) = d_1(k) - \hat{Q}_{other_{deterministic}}(k) \qquad (Eq.\ W);$$

where e(k) is the current residual, $d_1(k)$ is a value of heat disturbance for the current time step determined based on the online state estimation performed in step 2410, and $\hat{Q}_{other_{deterministic}}(k)$ is the deterministic heat disturbance estimated in step 2412. The current residual can illustrate the inaccuracy of $\hat{Q}_{other_{deterministic}}(k)$ due to the stochastic heat disturbance. In general, a large value (negative or positive) of the current residual indicates $\hat{Q}_{other_{deterministic}}(k)$ is inaccurate while values of the current residual close to 0 indicate $\hat{Q}_{other_{deterministic}}(k)$ is more accurate. If the current residual is equal to 0, the stochastic heat disturbance may have no effect on heat disturbance. In some embodiments, step 2414 is performed by controller 212.

Process 2400 is shown to include predicting a stochastic heat disturbance for subsequent time steps using the autoregressive (AR) model and the current residual (step 2416), according to some embodiments. As the current residual can indicate a stochastic heat disturbance for a current time step, the current residual can be used as input to the AR model for predicting the stochastic heat disturbance for the subsequent time steps (i.e., the model trained at step 2406). Based on a magnitude of the stochastic heat disturbance, the AR model can determine an accuracy of the estimated deterministic heat disturbance for the current time step. As the magnitude of the stochastic heat disturbance grows, additional correction may be necessary by the AR model to predict an accurate stochastic heat disturbance for the subsequent time steps. In some embodiments, the stochastic heat disturbance for a next time step is described $\hat{Q}_{other_{deterministic}}(k+1)$ where k+1 is the next time step (i.e., the time step after time step k). Similarly, the stochastic heat disturbance for any subsequent time steps can be described as $\hat{Q}_{other_{deterministic}}(k+n)$ for some $n^{th}$ subsequent time step. In some embodiments, step 2416 is performed by controller 212.

Process 2400 is shown to include predicting a deterministic heat disturbance for the subsequent time steps using the disturbance model and the current environmental data (step 2418), according to some embodiments. The disturbance model can be configured to estimate future deterministic heat disturbances based on current data. As such, the current environmental data can be used as input to the disturbance model such that the disturbance model can output the predicted deterministic heat disturbance for the subsequent time steps. When predicting the deterministic heat disturbance for the subsequent time steps, the disturbance model may not use the stochastic heat disturbance for the subsequent time steps predicted in step 2416. As such, step 2418 may be similar to step 2412 for the subsequent time steps. In general, the deterministic heat disturbance for a next time step is described as $\hat{Q}_{other_{deterministic}}(k+1)$ where k+1 is the next time step. Similarly, the deterministic heat disturbance for any subsequent time step can be described as $\hat{Q}_{other_{deterministic}}(k+n)$ for some $n^{th}$ subsequent time step. In some embodiments, step 2418 is performed by controller 212.

Process 2400 is shown to include predicting a forecasted heat disturbance for the subsequent time steps as a sum of the deterministic heat disturbance and the stochastic heat disturbance (step 2420), according to some embodiments. The forecasted heat disturbance $\hat{Q}_{other_{forecast}}(k+1)$ is an estimated value of total heat disturbance for the next time step k+1. In general, $\hat{Q}_{other_{forecast}}(k+1)$ can be predicted by the following equation:

$$\hat{Q}_{other_{forecast}}(k+1) = \hat{Q}_{other_{deterministic}}(k+1) + \hat{Q}_{other_{stochastic}}(k+1) \quad \text{(Eq. X)};$$

or as:

$$\hat{Q}_{other_{forecast}}(k+1) = \hat{Q}_{other_{deterministic}}(k+1) + \hat{e}(k+1) \quad \text{(Eq. Y)};$$

where all variables are as defined above. If $\hat{Q}_{other_{forecast}}(k+1)$ is a positive value, the predicted heat disturbance for the next time step may be adding additional heat into a space (e.g., building 10). If $\hat{Q}_{other_{forecast}}(k+1)$ is a negative value, the predicted heat disturbance for the next time step may be taking heat out of the space. $\hat{Q}_{other_{forecast}}$ can similarly be determined for other subsequent time steps based on $\hat{Q}_{other_{deterministic}}$ and $\hat{Q}_{other_{stochastic}}$ for each subsequent time step. In some embodiments, step 2420 is performed by controller 212.

Process 2400 is shown to include performing a model predictive control process to control building equipment using the forecasted heat disturbance and the identified model (step 2422), according to some embodiments. By taking into account the forecasted heat disturbance, the model predictive control process can further optimize (e.g., reduce) costs related to operation of building equipment. For example, if the forecasted heat disturbance is positive and a building zone requires heating to maintain occupant comfort, the model predictive control process may determine that a heater is not required to be operated as the heat disturbance will increase a temperature of the building zone regardless. Without accounting for the forecasted heat disturbance, the model predictive control process may otherwise make control decisions that do not maintain occupant comfort and/or do not optimize costs. In some embodiments, step 2422 is performed by controller 212.

Referring now to FIG. 25, a process 2500 for determining a deterministic heat disturbance and performing a model predictive control process based on the deterministic heat disturbance is shown, according to some embodiments. Process 2500 utilizes multistep system identification to determine a Kalman gain and a stochastic disturbance model that is part of a state space system. In process 2500, the heat disturbance predictions from the deterministic heat disturbance model can be used as input for determining overall heat disturbance. Further, the Kalman gain and the stochastic disturbance model can be identified to account for inaccuracy in prediction of the deterministic heat disturbance due to inherent randomness, thereby allowing a stochastic heat disturbance to be calculated. In some embodiments, some and/or all steps of process 2400 are performed by controller 212.

Process 2500 is shown to include estimating historical heat disturbance (step 2502), according to some embodiments. In some embodiments, step 2502 is accomplished by performing process 2300 described with reference to FIG. 23. In some embodiments, step 2502 is performed by controller 212.

Process 2500 is shown to include training a deterministic heat disturbance model for online predictions of the deterministic portion of heat disturbances (step 2504), according to some embodiments. In some embodiments, the deterministic heat disturbance model uses a linear regression and data fitting and/or pattern recognition to estimate the deterministic heat disturbance value similar to and/or the same as a deterministic load as described in U.S. patent application Ser. No. 14/717,593 filed May 20, 2015, incorporated by reference herein in its entirety. The disturbance model can be trained using the training data of process 2300 and the estimated historical heat disturbance so that the disturbance model can properly estimate deterministic heat disturbance values based on environmental conditions. In some embodiments, step 2504 is performed by controller 212.

Process 2500 is shown to include receiving a system model and augmenting the system model with a stochastic state space model and a Kalman gain (step 2506), according to some embodiments. Specifically, the stochastic state space model used to augment the system model can be a new disturbance model $A_{d_e}$ that captures the stochastic piece of the heat disturbance. In general, the augmented system model can have the following form:

$$\begin{bmatrix} \dot{T}_{ia} \\ \dot{T}_m \\ \dot{I} \\ \dot{d}_e \end{bmatrix} = \begin{bmatrix} \frac{1}{C_{ia}}\left(-K_p - \frac{1}{R_{mi}} - \frac{1}{R_{oi}}\right) & \frac{1}{C_{ia}R_{mi}} & \frac{K_I}{C_{ia}} & \frac{1}{C_{ia}} \\ \frac{1}{C_m R_{mi}} & -\frac{1}{C_m R_{mi}} & 0 & 0 \\ -1 & 0 & 0 & 0 \\ 0 & 0 & 0 & A_{d_e} \end{bmatrix} \quad \text{(Eq. Z)}$$

-continued $$\begin{bmatrix} T_{ia} \\ T_m \\ I \\ d_e \end{bmatrix} + \begin{bmatrix} \frac{K_p}{C_{ia}} & \frac{1}{C_{ia}R_{oi}} & \frac{1}{C_{ia}} \\ 0 & 0 & 0 \\ 1 & 0 & 0 \\ 0 & 0 & 0 \end{bmatrix} \begin{bmatrix} T_{sp} \\ T_{oa} \\ \hat{Q}_{other_{determinmistic}} \end{bmatrix};$$

$$\begin{bmatrix} T_{ia} \\ \dot{Q}_{HVAC} \end{bmatrix} = \begin{bmatrix} 1 & 0 & 0 & 0 \\ -K_p & 0 & K_I & 0 \end{bmatrix}$$

(Eq. AA)

$$\begin{bmatrix} T_{ia} \\ T_m \\ I \\ d_e \end{bmatrix} + \begin{bmatrix} 0 & 0 & 0 \\ K_p & 0 & 0 \end{bmatrix} \begin{bmatrix} T_{sp} \\ T_{oa} \\ \hat{Q}_{other_{determinmistic}} \end{bmatrix};$$

where $A_{d_e}$ is the new disturbance model, $d_e$ is a disturbance state that captures the stochastic heat disturbance $\hat{Q}_{other_{deterministic}}$ is the deterministic heat disturbance, and all other variables are as defined above. For the augmented system model to be usable, values for the Kalman gain and $A_{d_e}$ must be identified as described in greater detail below in step 2508. In some embodiments, the disturbance states at each time step $d_e(k)$ only capture the stochastic heat disturbance as the deterministic heat disturbance is already accounted for. In some embodiments, the above four state model is used for both online estimations and online model predictive control (MPC) predictions. Further, the state space system above can be converted to a discrete time model to estimate heat disturbance at particular points in time over a time horizon. In some embodiments, step 2506 is performed by controller 212.

Process 2500 is shown to include determining an identified model by performing a system identification to determine values of the Kalman gain and stochastic disturbance model parameter(s) based on the historical heat disturbances and the training data (step 2508), according to some embodiments. Based on the historical heat disturbances, the Kalman gain can be determined such that the Kalman gain accounts for previous heat disturbances during previous time steps. By accounting for the historical heat disturbances, the Kalman gain (i.e., an adjustment for how inaccurate the deterministic heat disturbance is due to the stochastic heat disturbance) can be more precisely estimated to account for actual dynamics of the system. In step 2508, values of $A_{d_e}$ (i.e., values of the stochastic disturbance model parameter(s)) can also be determined as part of the performed system identification. In some embodiments, multi-step ahead prediction is utilized in identification of $A_{d_e}$ and the Kalman gain for improved estimation of the stochastic heat disturbance. In some embodiments, step 2508 is performed by controller 212.

Process 2500 is shown to include collecting an environmental condition forecast and/or a weather forecast (step 2510), according to some embodiments. The environmental condition forecast can include current and/or predicted environmental conditions for future times. The environmental condition forecast can include, for example, current/predicted temperature measurements, current/predicted humidity measurements, current/predicted external weather conditions, current/predicted air quality, etc. The environmental condition forecast can be collected by various sensors in a building, a weather service, and/or any device/system capable of collecting and communicating environmental data to controller 212. For example, temperature sensor 214 and temperature sensor 216 may collect and communicate an indoor air temperature and an outdoor air temperature to controller 212 respectively. The environmental condition forecast may also include information regarding factors that can result in a heat disturbance such as, for example, occupancy in a building, current electrical consumption, time of day, etc. The weather forecast collected in step 2510 can include predictions of external weather conditions at future times. The weather forecast can be obtained by, for example, requesting the weather forecast from an application programming interfaces (APIs) that provides weather forecasts to requesting services. The weather forecast can be utilized for estimating heat disturbances due to external conditions. In some embodiments, the environmental condition forecast and the weather forecast are part of a single forecast. In some embodiments, step 2510 is performed by controller 212 and various devices/services capable of collecting and communicating environmental data (e.g., temperature sensor 214).

Process 2500 is shown to include predicting deterministic heat disturbances using the disturbance model along with the environmental condition forecast and/or the weather forecast (step 2512), according to some embodiments. The deterministic heat disturbances may need to be estimated as the deterministic heat disturbance is used as input to the disturbance model for predicting the stochastic heat disturbances. In some embodiments, step 2512 is similar to and/or the same as step 2412 described with reference to FIG. 24. In general, the disturbance model can utilize the environmental condition forecast and/or the weather forecast as input and output a deterministic heat disturbance prediction. In some embodiments, the disturbance model utilizes the entirety of the environmental condition forecast and/or the weather forecast as input. In some embodiments, the disturbance model utilizes a portion of the environmental condition forecast and/or the weather forecast as input. In some embodiments, step 2512 is performed by controller 212.

Process 2500 is shown to include performing a model predictive control process to control building equipment using the deterministic heat disturbance predictions and the identified model (step 2514), according to some embodiments. Based on results of step 2512, the deterministic heat disturbance predictions can be used as input to the identified model to predict the stochastic heat disturbances. The deterministic heat disturbance predictions and the stochastic heat disturbance predictions can be used to determine a total heat disturbance to be considered during the model predictive control process. By taking into account the total heat disturbance, the model predictive control process can further optimize (e.g., reduce) costs related to operation of building equipment operable to heat or cool a building. For example, if the total heat disturbance is positive and a building zone requires heating to maintain occupant comfort, the model predictive control process may determine that a heater is not required to be operated as the heat disturbance will increase a temperature of the building zone regardless. Without accounting for the total heat disturbance, the model predictive control process may otherwise make control decisions that do not maintain occupant comfort and/or do not optimize costs. In some embodiments, step 2514 is performed by controller 212.

Automatic Scheduling of System Identification Experiments

Figure 26:
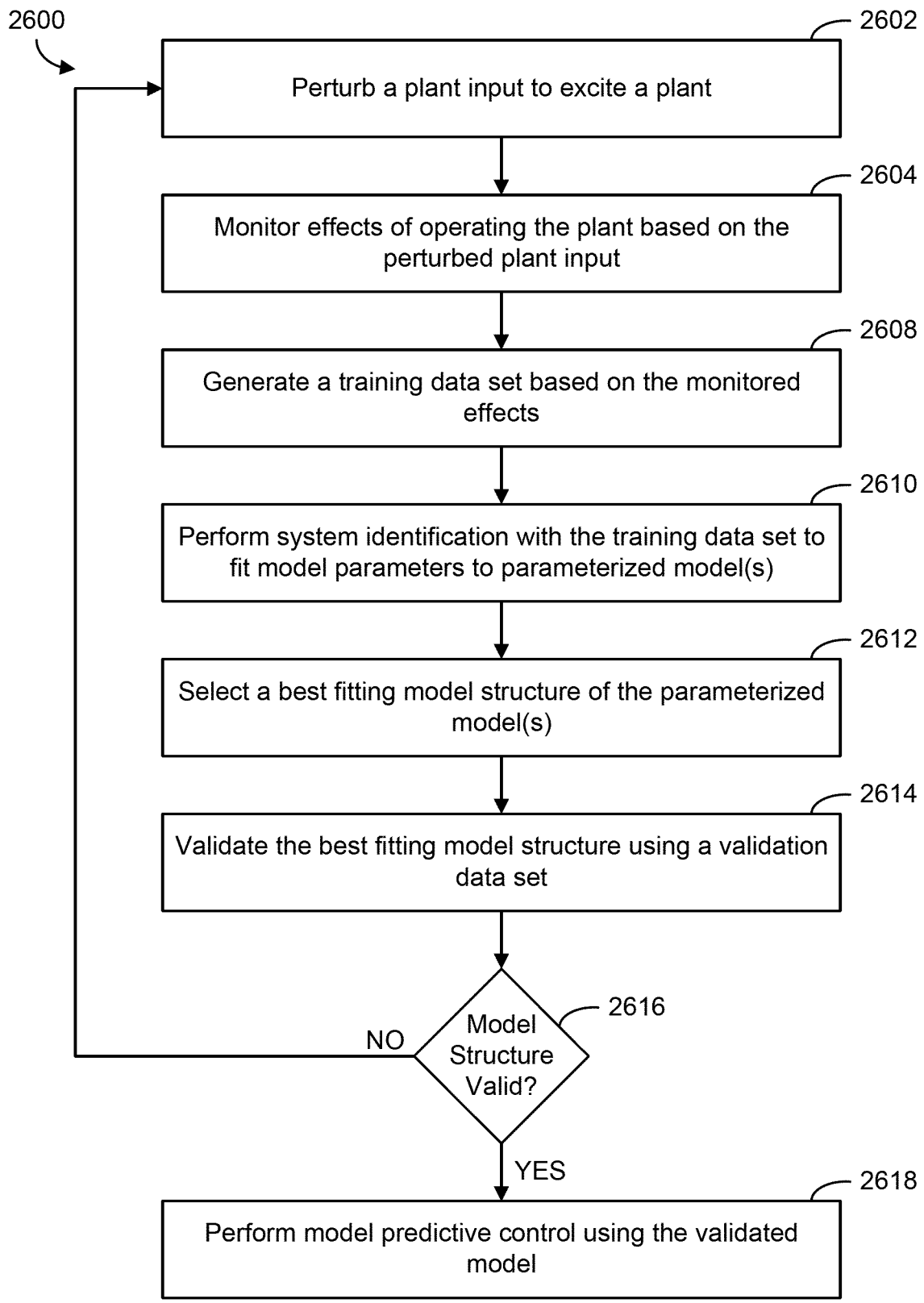
FIG. 26 is a flow diagram of a process for generating a predictive model for use in model predictive control, according to some embodiments.

Referring now to FIG. 26, a process 2600 for generating a predictive model for use in MPC is shown, according to some embodiments. In some embodiments, process 2600 is performed if a predictive model does not exist and/or to replace a current predictive model with a new predictive model. The predictive model generated in process 2600 can be useful for generating cost-optimal decisions for operating building equipment in a building while maintaining occupant comfort. In some embodiments, some and/or all steps of process 2600 are performed by automatic system identification controller 1900.

Process 2600 is shown to include perturbing a plant input to excite a plant (step 2602), according to some embodiments. The plant can include any type of plant such as, for example, a chiller plant, a steam plant, a heat plant, etc. By perturbing the plant input, environmental conditions (e.g., temperature, humidity, air quality, etc.) of a space of a building may be affected. The space of the building may be, for example, a zone of the building, a room, a hallway, etc. Specifically, to perturb the plant, a setpoint fed to the plant as input can be changed. The setpoint changed in step 2602 may be any setpoint to which building equipment can be operated to achieve. For example, the setpoint may be a temperature setpoint, a humidity setpoint, an air quality setpoint, etc., depending on what plant is receiving the setpoint. In some embodiments, the setpoint is changed over time with a step input to excite the plant. If the plant is operated to achieve the setpoint, the environmental condition of the space may change. For example, if a current temperature of the space is 70° F. and the plant is operated to achieve a temperature setpoint of 75° F., the temperature of the space may increase. In some embodiments, step 2602 is performed by training data generator 1910 and/or equipment controller 416.

Process 2600 is shown to include monitoring effects of operating the plant based on the perturbed plant input (step 2604), according to some embodiments. In step 2604, environmental conditions of the space and/or occupants may be monitored for effects resulting from operation of the plant to achieve the plant input (i.e., a setpoint). For example, if a heating plant is operated to achieve a temperature setpoint higher than a current temperature in the space, the temperature of the space can be monitored over time to determine how it changes based on operation of the plant. Similarly, occupants can also be monitored to determine how they respond to changes in temperature (or other environmental conditions). For example, the temperature setpoint to which the plant is operated may be too cold, and as such occupants may display signs of discomfort. How occupants react to setpoints can be useful in determining information such as, for example, if a current setpoint maintains occupant comfort. In some embodiments, step 2604 also includes measuring/recording/monitoring other information such as, for example, state changes of HVAC equipment (or other building equipment), fan commands, HVAC mode, etc. In some embodiments, step 2604 is performed by training data generator 1910.

Process 2600 is shown to include generating a training data set based on the monitored effects (step 2608), according to some embodiments. In some embodiments, all information collected in step 2606 is included in the training data set. In some embodiments, only some of the information collected in step 2606 is included in the training data set. In some embodiments, one or more determinations are made regarding what information collected in step 2606 is relevant for generating a predictive model. For example, if multiple copies of the same data is present, a determination can be made that only one copy of duplicate data is necessary and that additional copies should not be included in the training data. As such, the training data set can be constructed based on what information is determined to be relevant. In some embodiments, step 2608 is performed by training data generator 1910.

Process 2600 is shown to include performing system identification with the training data set to fit model parameters to parameterized model(s) (step 2610), according to some embodiments. The system identification performed in step 2610 can result in one or more parameterized models being generated based on the training data set. Each parameterized model may be a possible representation of the space as defined by system matrices (i.e., the model parameters) identified during the system identification. Depending on requirements of MPC, the system identification may be performed for various aspects of a building/building system. For example, the system identification may identify a model of an entire plant and a control system. As another example, the system identification may identify a model of the dynamic response of the plant. The specific needs of MPC may be provided while/prior to performing process 2600, may be predetermined (e.g., hard-coded), etc. In some embodiments, step 2610 is performed by model identifier 412.

Process 2600 is shown to include selecting a best fitting model structure of the parameterized model(s) (step 2612), according to some embodiments. The best fitting model structure selected in step 2612 can be identified by determining which of the parameterized model(s) best captures actual dynamics of the system. For example, if occupants generally prefer a temperature of the space to be 72° F., a parameterized model indicating that the temperature of the zone is most comfortable around 71° F. may be more accurate than a parameterized model indicating that the temperature of the zone is most comfortable around 65° F. Step 2612 can include performing various comparisons to determine which of the parameterized model(s) best fits the space to which the model is to be applied to. For example, step 2612 can include determining certain quality of fit metrics such as a root mean squared prediction of each model to select the best fitting model structure. In some embodiments, step 2612 is performed by model identifier 412.

Process 2600 is shown to include validating the best fitting model structure using a validation data set (step 2614), according to some embodiments. In step 2614, outputs of the best fitting model structure can be compared against the validation data set to determine if the best fitting model structure is adequate for use in MPC. If the outputs of the best fitting model structure for various situations (e.g., various environmental conditions, various occupant preferences, various external weather conditions, etc.) are similar to and/or the same as indicated by the validation data set, the best fitting model structure may be adequate. If the outputs of the best fitting model structure do not closely resemble results indicated by the validation data set, the best fitting model structure may be determined to not be adequate for use in MPC. In some embodiments, the best fitting model structure is validated based on various quality of fit metrics such as a root mean squared prediction error. In some embodiments, the validation data set is collected similarly to the training data set. However, the validation data set may be required to be a different data set than the training data set. If the validation data set is the same as the training data set, no useful validation metrics can be gathered in step 2614. In some embodiments, step 2614 is performed by model validator 1912.

Process 2600 is shown to include a determination of whether the best fitting model structure is valid (step 2616), according to some embodiments. If the best fitting model structure is determined to be valid (step 2616, "YES") based on the validation performed in step 2614, process 2600 can proceed to step 2618. If the best fitting model structure is determined to not be valid (step 2616, "NO"), process 2600 may proceed to step 2602 in order to determine a new best fitting model structure for use in MPC. In some embodiments, step 2616 is performed by model validator 1912.

Process 2600 is shown to include performing model predictive control using the validated model (step 2618), according to some embodiments. In step 2618, the validated model (i.e., the predictive model referred to above) can be used in MPC to generate control decisions. As the validated model is determined in step 2616 to adequately model dynamics of the space, the control decisions generated in MPC using the validated model may maintain occupant comfort and optimize (e.g., reduce) costs. In some embodiments, step 2618 is performed by model predictive controller 414.

Figure 27:
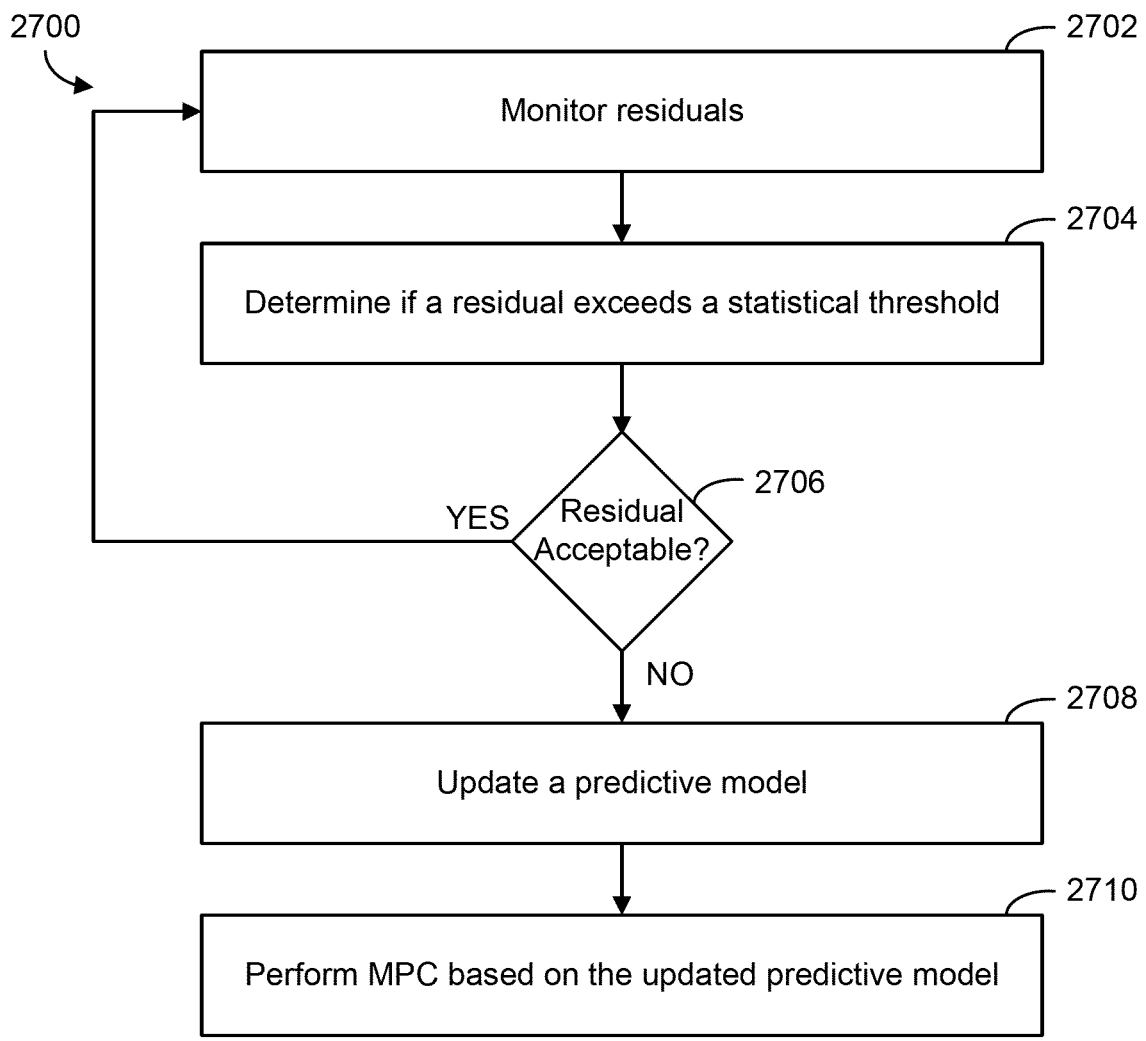
FIG. 27 is a flow diagram of a process for updating a predictive model based on a determination that a value of a residual exceeds a threshold, according to some embodiments.

Referring now to FIG. 27, a process 2700 for updating a predictive model based on a determination that a value of a residual exceeds a threshold is shown, according to some embodiments. In some embodiments, process 2700 is used in conjunction with process 2600 to determine if/when the validated model of process 2600 needs to be updated. The residuals referred to in process 2700 can refer to any residuals useful for determining an accuracy of a current predictive model being used in MPC. For example, the residuals can include heat disturbance residuals, prediction error residuals, or any other residuals useful for determining the accuracy of the current predictive model. In some embodiments, some and/or all steps of process 2700 are performed by model update controller 2000.

Process 2700 is shown to include monitoring residuals (step 2702), according to some embodiments. As described above, the residuals monitored can include any residuals relevant for determining an accuracy of a predictive model used in MPC. To monitor values of the residuals, various outputs from MPC can be monitored. For example, a prediction error residual can be determined by monitoring a difference between prediction values for multiple time steps in the future as compared to actual measured outputs for each time step. In some embodiments, step 2702 is performed by residual monitor 2010.

Process 2700 is shown to include determining if a residual exceeds a statistical threshold (step 2704), according to some embodiments. In step 2704, various statistical thresholds can be monitored for the residual. For example, step 2704 can include determining whether a variance of the residual, a standard deviation of the residual, an overall quality of fit metric, etc. exceed an associated threshold value. If a statistical threshold is exceeded, the predictive model may be determined to not accurately model a related system. In some embodiments, more than one statistical threshold is required to be exceeded for the predictive model to be determined to be inaccurate. For example, a residual may be required to exceed three statistical thresholds (e.g., standard deviation, moving average, and variance) for the residual to be determined to be inaccurate. Step 2704 can ensure predictive models are accurate for use in MPC to ensure generated control decisions are cost effective and/or maintain occupant comfort. In some embodiments, step 2704 is performed by residual monitor 2010.

Process 2700 is shown to include a determination of whether the residual is acceptable (step 2706), according to some embodiments. If the residual is determined to be acceptable ("YES"), process 2700 can proceed to step 2702 such that the residuals can continue to be monitored. If the residual is determined to not be acceptable ("NO"), process 2700 can proceed to step 2708. In some embodiments, step 2706 is performed by residual monitor 2010.

Process 2700 is shown to include updating a predictive model (step 2708), according to some embodiments. If step 2708 is reached, the predictive model being used in MPC is determined to not be accurate as the residuals exceeded some threshold value(s). In some embodiments, a determination is made in step 2708 regarding whether the predictive model should be retrained with new training data or if a new predictive model should be generated. If a new predictive model is to be generated, step 2708 may include performing some and/or all of process 2600 in order to generate the new predictive model. If the predictive model is required to be retrained, the predictive model can be updated with new training data to more accurately reflect dynamics of the system. To retrain the predictive model, new training data can be gathered and applied to the predictive model. For example, if the predictive model is a neural network model, the new training data can be used to retrain the predictive model to more accurately associate various inputs with particular outputs. As another example, if the predictive model is a mathematical equation, constants applied to variables can be retrained based on the new training data. In some embodiments, step 2708 is performed by model updater 2012.

Process 2700 is shown to include performing MPC based on the updated predictive model (step 2710), according to some embodiments. In some embodiments, step 2710 is similar to and/or the same as step 2618 of process 2600. By performing MPC based on the updated predictive model, MPC can generate setpoints that are more cost-effective and/or better maintain occupant comfort as compared to the predictive model before being updated. In some embodiments, step 2710 is performed by model predictive controller 414.

Automated System Identification in Equipment Manufacturing

Figure 28:
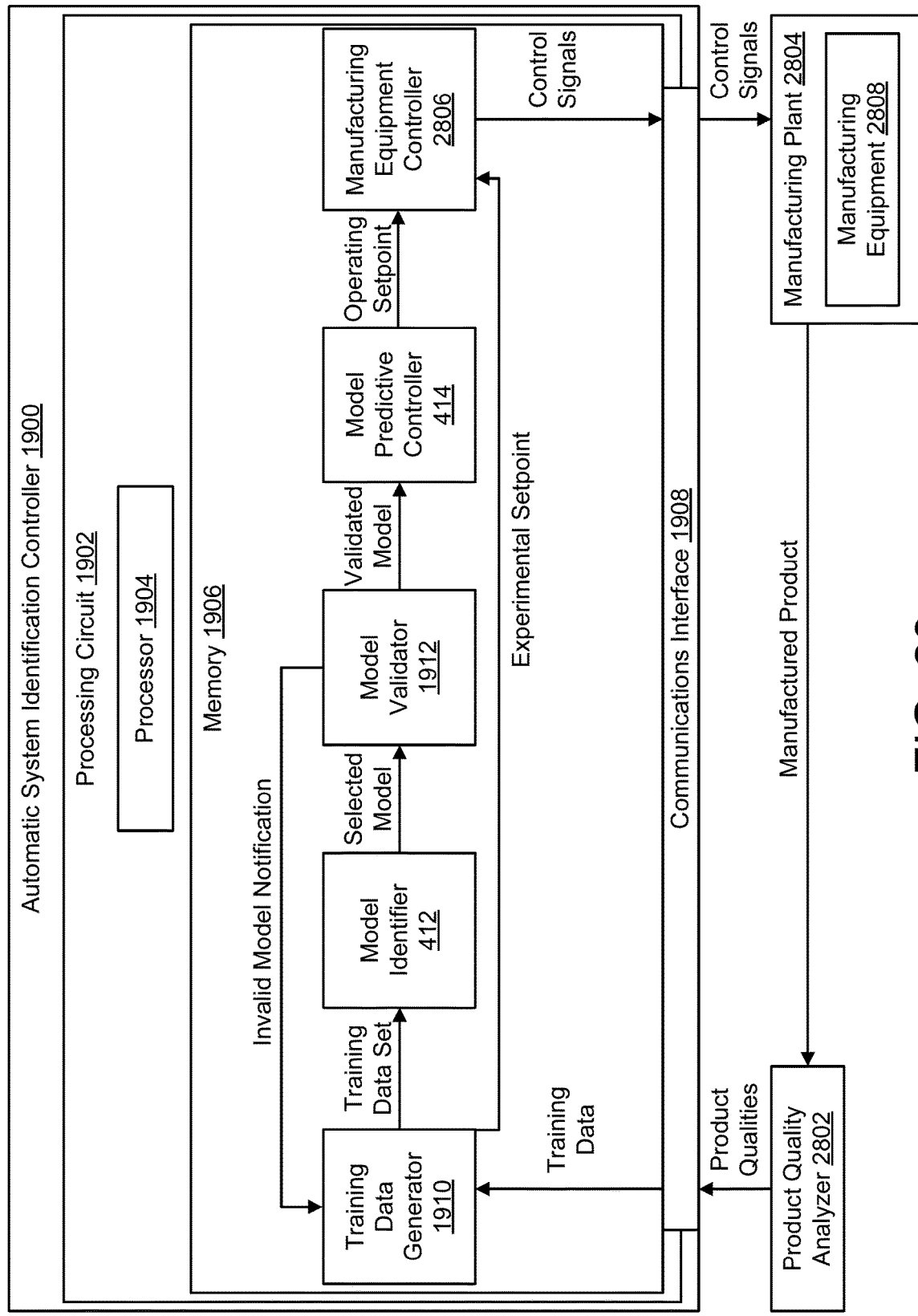
FIG. 28 is a block diagram of the automatic system identification controller of FIG. 19, according to an alternative embodiment.
Figure 29:
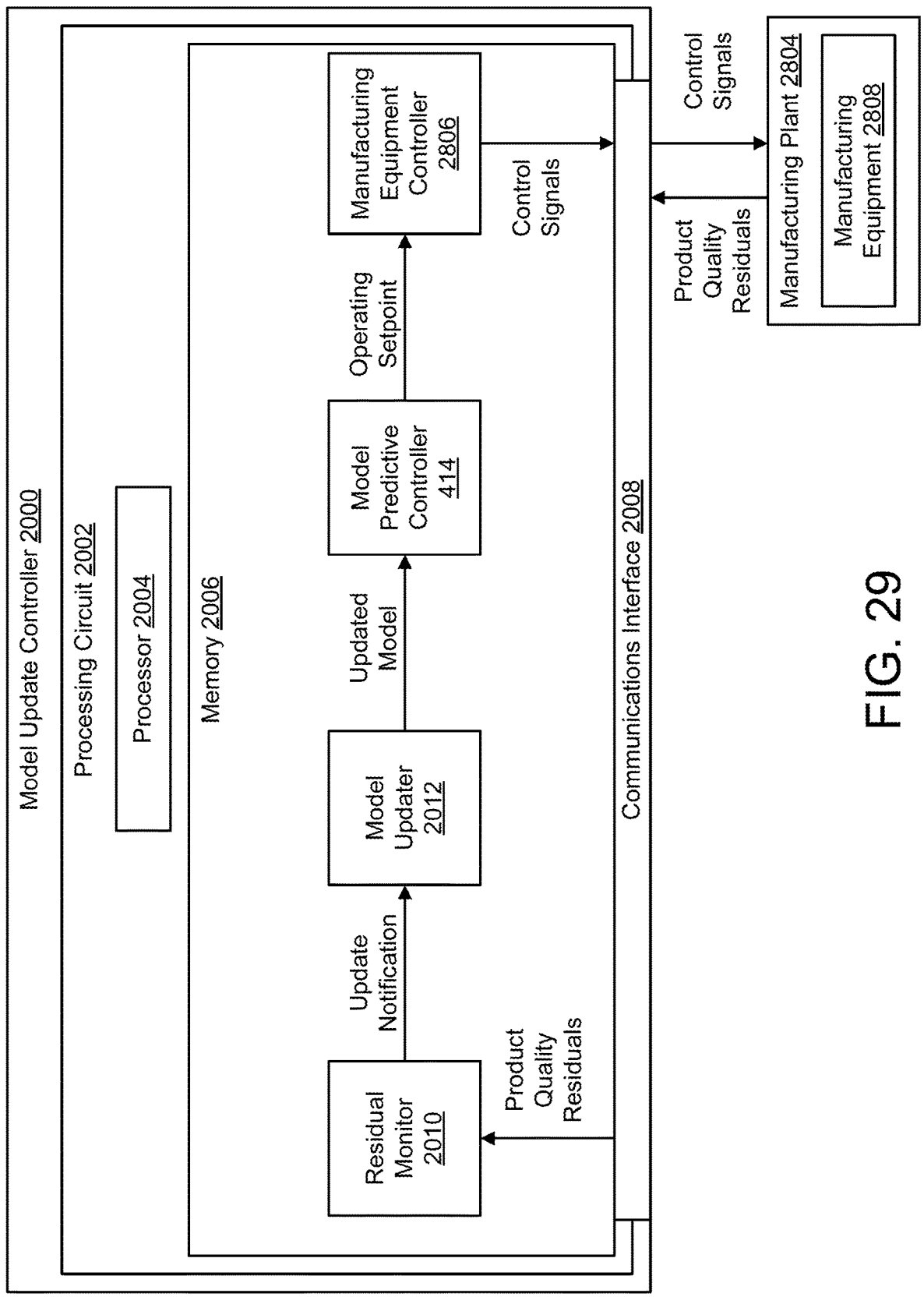
FIG. 29 is a block diagram of the model update controller of FIG. 20A, according to an alternative embodiment.

Referring generally to FIGS. 28 and 29, alternative use cases for automated system identification are shown, according to some embodiments. Particularly, FIGS. 28 and 29 illustrate automated system identification as used in equipment manufacturing. In an equipment manufacturing process, a various manufacturing equipment can be operated to produce equipment components, commercial products, etc. Integration of MPC in the manufacturing process can help manufacturing equipment (e.g., 3D printers, chemical vats, presses, equipment casters, etc.) to operate to produce a product. However, the accuracy of the predictive model used in the manufacturing process may degrade over time, thereby resulting in products that have incorrect dimensions, density, and/or any other intended properties of the products. As such, automated system identification can be used to determine if the predictive model is inaccurate and should be retrained and/or if a new predictive model should be generated.

Referring now to FIG. 28, automatic system identification controller 1900 is shown, according to an alternative embodiment. In some embodiments, automatic system identification controller 1900 as shown in FIG. 28 can be used to generate a predictive model for use in a manufacturing process. To begin an automated system identification process, training data generator 1910 can generate experimental setpoints to provide to manufacturing equipment controller 2806. In some embodiments, a setpoint in the context of equipment manufacturing indicates how manufacturing equipment can be operated to produce an aspect of a certain product (e.g., a length of the product, a density of the product, a color of the product, etc.). As such, the experimental setpoints can be generated by training data generator 1910 to test various settings/configurations of manufacturing equipment 2808 of a manufacturing plant 2804. Based on the experimental setpoints, manufacturing equipment controller 2806 can generate control signals to provide to manufacturing plant 2804 and/or to manufacturing equipment 2808 via communications interface 1908.

Using the control signals generated based on the experimental setpoints, manufacturing plant 2804 can perform the manufacturing process to generate a particular product or result. For example, manufacturing plant 2804 can generate a computer chip based on operating manufacturing equipment 2808 based on the provided control signals. In some embodiments, multiple components of manufacturing equipment 2808 receive control signals from manufacturing equipment controller 2806 to generate a product (e.g., the computer chip). For example, a silicon purifier of manufacturing equipment 2808 can receive control signals related to silicon purification whereas a fabricator of manufacturing equipment 2808 can utilize the purified silicon to produce the computer chip. It should be appreciated that the computer chip is used purely for sake of example and that manufacturing plant 2804 and manufacturing equipment 2808 therein can be utilized to generate any product of manufacture.

Based on operation of the control signals, manufacturing plant 2804 can produce a manufactured product. A product quality analyzer 2802 can analyze various qualities of the manufactured product. For example, product quality analyzer 2802 can analyze qualities such as dimensions (e.g., length, width, height), density, weight, acidity, shape, etc. of the manufactured product. The product qualities determined by product quality analyzer 2802 can be provided to training data generator 1910. Based on the product qualities, training data generator 1910 can determine how the experimental setpoints affected the manufactured product as compared to anticipated specifications of the manufactured product. For example, if a length of the manufactured product is 2 feet while an expected length of the manufactured product is 2 feet and 1 inch as defined by a manufacturer, training data generator 1910 can determine one or more of the experimental setpoints resulted in the manufactured product being shorter than expected. Further experimental setpoints can be tested if needed until training data generator 1910 determines an adequate training data set is gathered.

Training data generator 1910 can provide the training data set to model identifier 412 which can generate one or more candidate models. To generate the one or more candidate models, model identifier 412 can perform a system identification process using the training data set provided by training data generator 1910. In some embodiments, qualities/measurements (e.g., dimensions, coloration, weight, etc.) of manufactured products are used as system states in the system identification process. A measurement of a manufactured product can be used to identify a current state of the system to determine if manufacturing plant 2804 and/or manufacturing equipment 2808 is producing equipment that satisfies predetermined specifications. The qualities/measurements can be tracked over time to determine how the system evolves over time and can indicate if a current predictive model being used in MPC is reflective of a current state of the system or if the current predictive model should be updated.

In some embodiments, accuracy of candidate models can be determined based on outputs of each candidate model. For example, the outputs of each candidate model can be used to predict a manufactured product from manufacturing plant 2804. In some embodiments, other metrics of each candidate model are determined in order to determine an overall accuracy of each candidate model. Model identifier 412 can select one of the candidate models with a highest estimated accuracy of the one or more candidate models.

If a model is selected by model identifier 412, model identifier 412 can provide the selected model to model validator 1912. As described in greater detail above with reference to FIG. 19, model validator 1912 can utilize a validation data set to determine if the selected model is accurate enough for use in MPC. If model validator 1912 determines the selected model is not valid, an invalid model notification can be provided to training data generator 1910 to restart the automated system identification process. If model validator 1912 determines the selected model is valid, the selected model can be provided as a validated model to model predictive controller 414.

In the context of equipment manufacturing, model predictive controller 414 can perform MPC to generate operating setpoints to provide to manufacturing equipment controller 2806. The operating setpoints can define how manufacturing equipment 2808 and/or manufacturing plant 2804 should operate to produce products that have accurate specifications (e.g., dimensions, appearance, weight, etc.). To generate the operating setpoints, model predictive controller 414 can use the predictive model with desired specifications of a manufactured product as input. For example, a manufacturer can define a desired weight of a product to be 10 kilograms, a length of the product to be 2 feet, and a width of the product to be 3 feet. Based on the desired qualities as input, the predictive model can determine operating setpoints and provide said operating setpoints to manufacturing equipment controller 2806. As a predictive model used by model predictive controller 414 is validated by model validator 1912 for accuracy, the operating setpoints provided to manufacturing equipment controller 2806 can be sufficient for generating control signals that result in manufacturing plant 2804 producing products that adhere to specifications for said products. In particular, the predictive model can account for any issues with manufacturing equipment 2808 (e.g., inaccurate calibration) in determining the operating setpoints to ensure manufactured products are in accordance with associated specifications.

In some embodiments, model identifier 412 identifies multiple predictive models for various aspects of a manufacturing process. For example, model identifier 412 can identify a predictive model for each component of manufacturing equipment 2808 if multiple components are utilized in the manufacturing process. As another example, model identifier 412 can identify a predictive model for each step of the manufacturing process. If multiple predictive models are identified, model validator 1912 can validate each identified model and model predictive controller 414 can utilize some and/or all of the validated models if performing MPC. In some embodiments, if multiple predictive models are used in MPC, outputs of one predictive model are utilized as inputs to a next predictive model. For example, outputs of a predictive model related to a first step in the manufacturing process can be used as input to a predictive model related to a second step in the manufacturing process. In this way, each facet of the manufacturing process can be modeled by a separate predictive model to ensure manufactured products adhere to associated specifications for the manufactured products.

Referring now to FIG. 29, model update controller 2000 is shown, according to an alternative embodiment. As shown in FIG. 29, residual monitor 2010 can receive product quality residuals from manufacturing plant 2804 and/or manufacturing equipment 2808. In some embodiments, the product quality residuals are provided by product quality analyzer 2802 and/or a separate controller or device. The product quality residuals can be used to determine whether a predictive model utilized by model predictive controller 414 for performing a manufacturing process should be updated and/or whether a new predictive model should be generated. The product quality residuals can be determined based on a difference between expected qualities of manufactured equipment and measured values of the qualities once a product is produced. For example, after a product is produced, a length of the product, a width of the product, a density of the product, etc. can be compared against expected values of said qualities defined by a manufacturer. Discrepancies between measured and expected values of the qualities can define the product quality residuals.

Residual monitor 2010 can monitor the product quality residuals to determine if an update of the predictive model is necessary and/or if a new predictive model should be generated. Based on a detection that the predictive model should be updated and/or that a new predictive model should be generated, model update controller 2000 can begin a model update process and/or a system identification process as described in greater detail above with reference to FIG. 20. By monitoring the product quality residuals, model update controller 2000 of FIG. 29 can ensure quality of manufactured products is maintained over time automatically.

It should be appreciated that process 2600 and process 2700 as described with reference to FIGS. 26 and 27 respectively can be applied in the context of equipment manufacturing. Instead of measuring environmental variables and/or residuals associated with said environmental conditions, variables related to equipment manufacturing and associated residuals can be monitored instead. As such, process 2600 can be performed by automatic system identification controller 1900 in the context of equipment manufacturing. Similarly, process 2700 can be implemented by model update controller 2000 of FIG. 29 in the context of equipment manufacturing.

CONFIGURATION OF EXEMPLARY EMBODIMENTS

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A controller for performing automated system identification, the controller comprising:
   one or more processors; and
   one or more non-transitory computer-readable media storing instructions that, when executed by the one or more processors, cause the one or more processors to perform operations comprising:
      generating a predictive model to predict one or more system dynamics of a space of a building based on one or more environmental condition inputs;
      performing a validation of the predictive model by assessing a variance of internal parameters of the predictive model or comparing the internal parameters of the predictive model to bounds for the internal parameters of the predictive model without requiring inputs to the predictive model or outputs of the predictive model to be used when performing the validation;
      performing an optimization of a cost function of operating building equipment over a time duration to determine a setpoint for the building equipment, wherein the optimization is performed based on the predictive model; and
      operating the building equipment based on the setpoint to affect a variable state or condition of the space.

2. The controller of claim 1, further comprising determining a multi-step-ahead prediction error of the predictive model by comparing predicted values of one or more variables generated by the predictive model for multiple time steps subsequent to a given time step to actual values of the one or more variables at the multiple time steps subsequent to the given time step, wherein the predicted values for the multiple time steps subsequent to the given time step are generated by the predictive model without requiring the actual values for any of the multiple time steps subsequent to the given time step.

3. The controller of claim 1, wherein generating the predictive model comprises:
   perturbing the setpoint of the space or a heat duty of the building equipment to excite one or more dynamics of the space;
   monitoring one or more effects of perturbing the setpoint or the heat duty; and
   generating a set of training data comprising values of the one or more effects.

4. The controller of claim 1, wherein generating the predictive model comprises:
   generating one or more candidate models; and
   selecting one of the one or more candidate models based on an estimated accuracy of each of the one or more candidate models.

5. The controller of claim 4, wherein generating the predictive model comprises:
   determining whether the selected candidate model is suitable for use in performing the optimization;
   in response to a determination that the selected candidate model is not suitable, generating one or more new candidate models and selecting a new candidate model of the one or more new candidate models; and
   in response to a determination that the selected candidate model is suitable, providing the selected candidate model as the predictive model for use in performing the optimization.

6. The controller of claim 1, wherein the operations further comprise monitoring one or more prediction error metrics by:
   calculating one or more statistical characteristics of each of the one or more prediction error metrics;
   determining whether any of the one or more statistical characteristics of each of the one or more prediction error metrics exceeds a predetermined threshold value for each of the one or more statistical characteristics; and
   triggering a model update process in response to at least one of the one or more statistical characteristics exceeding the predetermined threshold value.

7. The controller of claim 6, wherein the one or more statistical characteristics comprise at least one of:
   a variance;
   a moving average; or
   a moving standard deviation.

8. A controller for performing automated system identification, the controller comprising:
   one or more processors; and
   one or more non-transitory computer-readable media storing instructions that, when executed by the one or more processors, cause the one or more processors to perform operations comprising:
      generating a predictive model to predict one or more system dynamics of a system based on one or more measured inputs;
      performing a validation of the predictive model by assessing a variance of internal parameters of the predictive model or comparing the internal parameters of the predictive model to bounds for the internal parameters of the predictive model without requiring outputs of the predictive model to be used when performing the validation; and
      in response to the validation indicating that the predictive model is valid, performing an optimization of a function of operating equipment over a time duration to determine a setpoint for the equipment, wherein the optimization is performed based on the predictive model;

operating the equipment based on the setpoint to affect a variable state or condition of the system;

monitoring one or more prediction error metrics over time; and updating the predictive model in response to one or more of the prediction error metrics exceeding a threshold value.

9. The controller of claim 8, wherein the equipment comprises manufacturing equipment for producing one or more products, the operations further comprising determining a first prediction error metric of the one or more prediction error metrics based on a difference between expected product quality predicted by the predictive model and actual product quality.

10. The controller of claim 8, wherein generating the predictive model comprises:

perturbing the setpoint over time to excite the one or more system dynamics;

monitoring one or more effects of perturbing the setpoint; and generating a set of training data comprising values of the one or more effects.

11. The controller of claim 8, wherein generating the predictive model comprises:

generating one or more candidate models;

selecting one of the one or more candidate models based on an estimated accuracy of each of the one or more candidate models.

12. The controller of claim 8, wherein monitoring the one or more prediction error metrics comprises:

calculating one or more statistical characteristics of each of the one or more prediction error metrics;

determining whether any of the one or more statistical characteristics of each of the one or more prediction error metrics exceeds a predetermined threshold value for each of the one or more statistical characteristics; and triggering a model update process in response to at least one of the one or more statistical characteristics exceeding the predetermined threshold value.

13. The controller of claim 12, wherein the one or more statistical characteristics comprise at least one of:

a variance;

a moving average; or a moving standard deviation.

14. A method for triggering an update of a predictive model for use in performing automated system identification, the method comprising:

generating the predictive model to predict one or more system dynamics of a space of a building based on one or more environmental condition inputs;

performing an assessment of an internal property of the predictive model, the internal property comprising a stability, observability, controllability, or condition number of the predictive model without requiring inputs to the predictive model to be used when performing the assessment and without requiring outputs of the predictive model to be used when performing the assessment;

determining whether to use or update the predictive model based on a result of the assessment; and in response to determining to use the predictive model, performing an optimization of a cost function of operating building equipment over a time duration to determine a setpoint for the building equipment, wherein the optimization is performed based on the predictive model;

operating the building equipment based on the setpoint to affect a variable state or condition of the space;

monitoring one or more prediction error metrics over time; and updating the predictive model in response to one or more of the prediction error metrics exceeding a threshold value.

15. The method of claim 14, wherein the one or more prediction error metrics comprise at least one of:

a temperature residual;

a humidity residual;

an air quality residual;

one or more environmental condition residuals; or a heat load residual.

16. The method of claim 14, wherein generating the predictive model comprises:

perturbing the setpoint of the space or a heat duty of the building equipment to excite one or more dynamics of the space;

monitoring one or more effects of perturbing the setpoint or the heat duty; and generating a set of training data comprising values of the one or more effects.

17. The method of claim 14, wherein generating the predictive model comprises:

generating one or more candidate models;

selecting one of the one or more candidate models based on an estimated accuracy of each of the one or more candidate models.

18. The method of claim 17, wherein generating the predictive model comprises:

determining whether the selected candidate model is suitable for use in performing the optimization;

in response to a determination that the selected candidate model is not suitable, generating one or more new candidate models and selecting a new candidate model of the one or more new candidate models; and in response to a determination that the selected candidate model is suitable, providing the selected candidate model as the predictive model for use in performing the optimization.

19. The method of claim 14, wherein monitoring the one or more prediction error metrics comprises:

calculating one or more statistical characteristics of each of the one or more prediction error metrics;

determining whether any of the one or more statistical characteristics of each of the one or more prediction error metrics exceeds a predetermined threshold value for each of the one or more statistical characteristics; and triggering a model update process in response to at least one of the one or more statistical characteristics exceeding the predetermined threshold value.

20. The method of claim 19, wherein performing the assessment comprises assessing the observability or the condition number of the predictive model.

* * * * *